United States Patent
Minor et al.

(10) Patent No.: US 10,408,390 B2
(45) Date of Patent: *Sep. 10, 2019

(54) MULTIPLE-LASER LIGHT SOURCE

(71) Applicant: MTT INNOVATION INCORPORATED, Vancouver (CA)

(72) Inventors: Johannes Minor, Vancouver (CA); Gerwin Damberg, Vancouver (CA); Raveen Kumaran, Burnaby (CA); Anders Ballestad, Vancouver (CA); Eric Jan Kozak, Burnaby (CA); Gil Rosenfeld, North Vancouver (CA); Eran Elizur, Vancouver (CA)

(73) Assignee: MTT Innovation Incorporated, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,717

(22) Filed: Jan. 5, 2018

(65) Prior Publication Data

US 2018/0292053 A1 Oct. 11, 2018

Related U.S. Application Data

(63) Continuation of application No. 15/418,505, filed on Jan. 27, 2017, now Pat. No. 9,874,319, which is a
(Continued)

(51) Int. Cl.
*G02B 27/10* (2006.01)
*G02B 26/00* (2006.01)
(Continued)

(52) U.S. Cl.
CPC .................. *F21K 9/60* (2016.08); *F21K 9/61* (2016.08); *F21V 29/90* (2015.01);
(Continued)

(58) Field of Classification Search
CPC .. G02B 27/145; G02B 3/0056; G02B 3/0062; G02B 27/30; G02B 27/0961;
(Continued)

(56) References Cited

U.S. PATENT DOCUMENTS

| 8,547,641 B2 | 10/2013 | Capolla |
| 9,874,319 B2 | 1/2018 | Minor et al. |

(Continued)

FOREIGN PATENT DOCUMENTS

| CA | 2088497 | 2/1992 |
| CA | 2443494 | 3/2005 |

(Continued)

OTHER PUBLICATIONS

Canadian Intellectual Property Office International Searching Authority, International Search Report and Written Opinion, PCT Application No. PCT/CA2015/050778, filed Aug. 14, 2015, Applicant: MTT Innovation Incorporated, dated Nov. 24, 2015, 10 pages.

*Primary Examiner* — Dawayne Pinkney
(74) *Attorney, Agent, or Firm* — Perkins Coie LLP

(57) ABSTRACT

A light source includes a plurality of laser diodes or other light emitters. Beams of light from the light emitters are steered to provide n array of parallel beams that illuminate a target area with an array of patches of light. In some embodiments the parallel beams are de-magnified to form the array of patches of light. Such a light source has application in illuminating dynamically-addressable focusing elements such as phase modulators, deformable mirrors and dynamically addressable lenses. Light projectors for a wide variety of applications may combine a light source as described herein with a dynamically-addressable focusing element to project defined patterns of light.

41 Claims, 36 Drawing Sheets

Related U.S. Application Data continuation of application No. PCT/CA2015/050778, filed on Aug. 14, 2015.

(60) Provisional application No. 62/037,543, filed on Aug. 14, 2014.

(51) Int. Cl.

| | | |
|---|---|---|
| *G02F 1/03* | (2006.01) | |
| *G02B 17/00* | (2006.01) | |
| *G02B 5/08* | (2006.01) | |
| *F21K 9/60* | (2016.01) | |
| *G02B 26/08* | (2006.01) | |
| *F21V 29/90* | (2015.01) | |
| *F21K 9/61* | (2016.01) | |
| *F21Y 115/30* | (2016.01) | |
| *F21Y 115/10* | (2016.01) | |

(52) U.S. Cl.
CPC ....... *G02B 26/0833* (2013.01); *F21Y 2115/10* (2016.08); *F21Y 2115/30* (2016.08)

(58) Field of Classification Search
CPC .... G02B 5/045; G02B 3/0012; G02B 27/126; G02B 17/086; G02B 17/08; G02B 27/144; G02B 27/1013; G02B 27/283; G02B 26/0841; G02B 26/001; G02B 26/105; G02B 6/2766; B60R 1/12; B60R 1/082; Y02E 10/47; F24J 2/145; B82Y 20/00; H04N 9/3197; G02F 1/015; G02F 1/0133; G02F 1/315; G02F 1/31; G02F 1/29
USPC ........ 359/618–625, 627, 726–727, 839, 850, 359/853, 867, 638–641, 495, 290–292, 359/223–225, 245, 260–263, 298, 198, 359/301–303, 317–318, 237, 242, 295

See application file for complete search history.

(56) References Cited

U.S. PATENT DOCUMENTS

| | | |
|---|---|---|
| 2003/0019854 A1 | 1/2003 | Gross et al. |
| 2004/0104902 A1 | 6/2004 | Fujii et al. |
| 2005/0058175 A1* | 3/2005 | Gross .................. B23K 26/067 372/98 |
| 2009/0001272 A1 | 1/2009 | Hajjar |
| 2009/0116520 A1 | 5/2009 | Oozeki |
| 2009/0141242 A1 | 6/2009 | Silverstein et al. |
| 2011/0037953 A1 | 2/2011 | Nizani et al. |
| 2013/0077308 A1 | 3/2013 | Svensen et al. |
| 2013/0170007 A1 | 7/2013 | Kurashige et al. |
| 2013/0182322 A1 | 7/2013 | Silverstein |
| 2014/0043352 A1 | 2/2014 | Damberg et al. |

FOREIGN PATENT DOCUMENTS

| | | |
|---|---|---|
| CA | 2956844 | 2/2016 |
| CN | 106662753 | 5/2017 |
| EP | 3180652 | 4/2018 |
| JP | 2017527111 | 9/2017 |
| WO | 2015054797 | 4/2015 |
| WO | 2015172236 | 11/2015 |
| WO | 2015184549 | 12/2015 |
| WO | 2016015163 | 2/2016 |
| WO | 2016023133 | 2/2016 |

\* cited by examiner

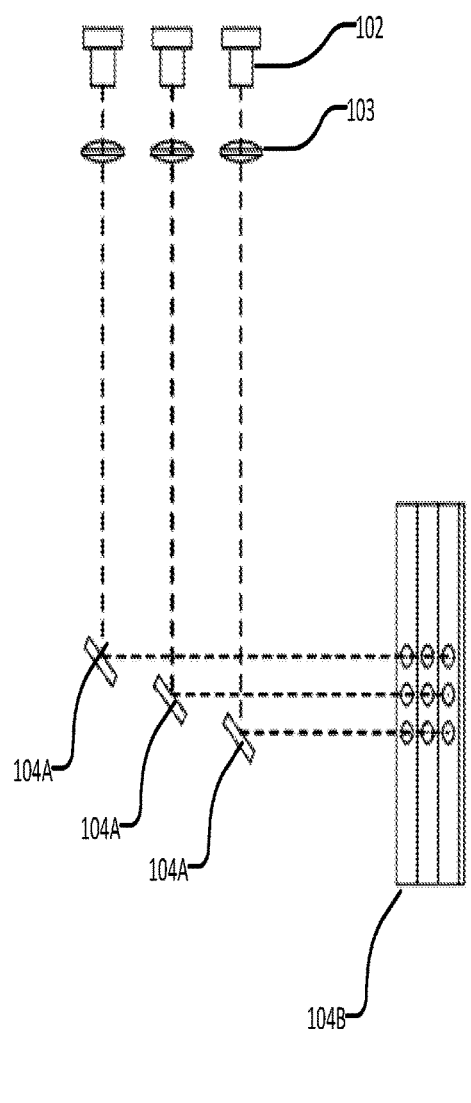
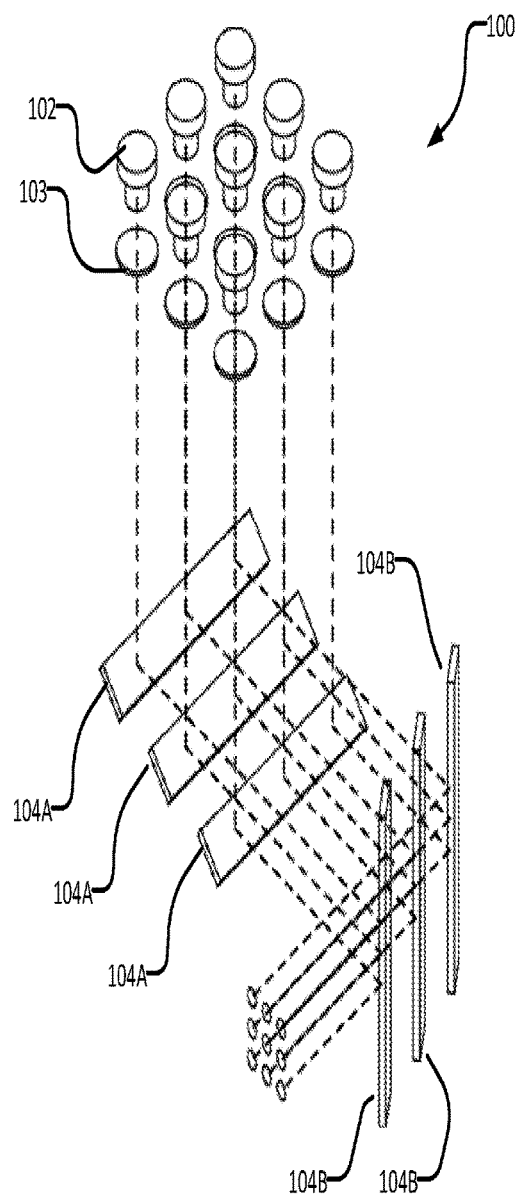
FIG. 1A
FIG. 1B

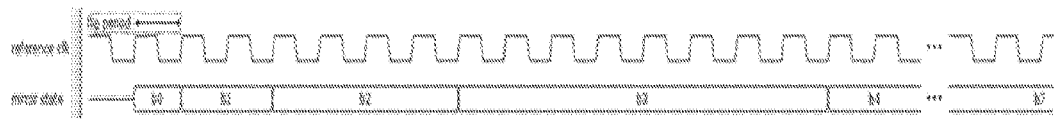
FIG. 8
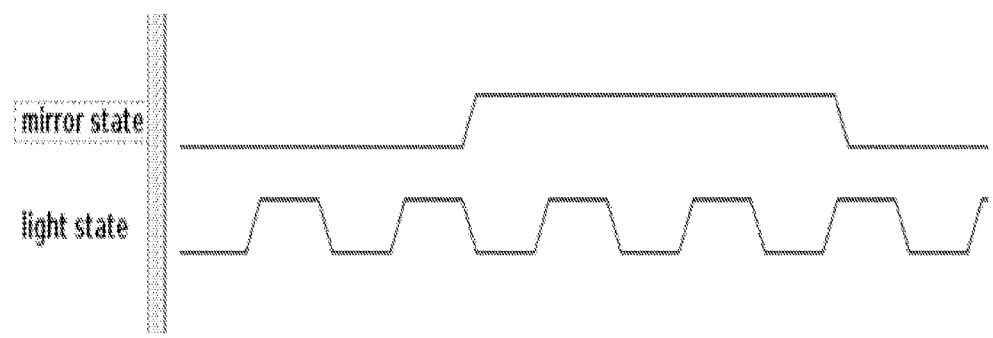
FRAME 1  FIG. 9A
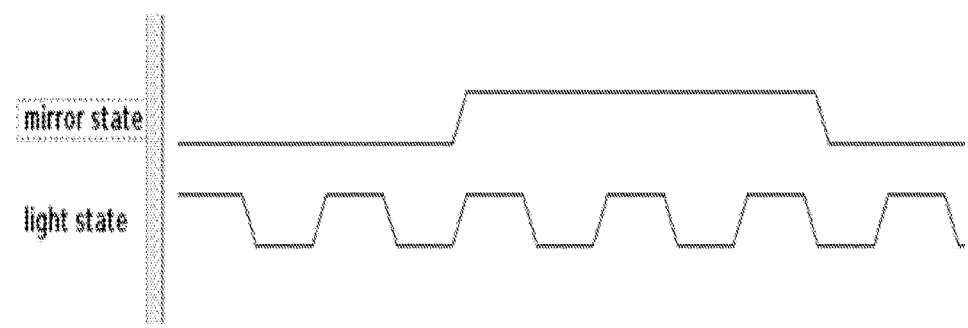
FRAME 2  FIG. 9B

FRAME 1

FRAME 2

MULTIPLE-LASER LIGHT SOURCE

CROSS-REFERENCE TO RELATED APPLICATIONS

This application is a continuation of U.S. application Ser. No. 15/418,505, filed Jan. 27, 2017, which is a continuation of PCT International Application No. PCT/CA2015/050778, filed 14 Aug. 2015 which claims priority to and the benefit of U.S. Application No. 62/037,543, filed 14 Aug. 2014, all of which are incorporated herein by reference for all purposes.

TECHNICAL FIELD

This invention relates to light projectors. Some embodiments may be applied to project images for viewing. Other embodiments may be applied to create structured light for illumination or other purposes. Embodiments have example application in digital cinema, TV and home theater, portable and personal projection (military, mobile, etc.), indoor and outdoor personal and large screen advertising and information dissemination, signs/advertising/billboards/outdoor advertising, large-venue and live performance, medical imaging, virtual reality, computer gaming, office presentations and collaborative work, head-up displays in cars and other vehicles, smart illumination such as adaptive car head-lights, theatre spotlights, security/architectural lighting, high contrast planetarium projectors, indoor and outdoor general illumination systems, street-lighting, road-lighting, aviation lighting systems, high-contrast simulation displays such as flight simulators, and small-scale structured lighting for 2D and 3D printing, and laser micro-machining.

BACKGROUND

There are many situations where it is desired to create a light field that has a specified luminance profile. Light projection systems have a very wide range of applications from architectural lighting to the display of lifelike images. The projected light patterns can be dynamic (e.g. video), static (used for static images or static applications like the beams of typical car headlights projected through a lens onto the road, made by arbitrarily shaped optical surfaces, etc.). Light may be projected onto a wide range of screens and other surfaces which may be flat or curved. Such surfaces may be fully reflective (like a canvas used in a cinema, a wall or a building) or partially reflective (such as the windshield of a vehicle). Screens may be low-gain or high-gain, Lambertian or highly directional, high-contrast or lower in contrast. Light may be projected onto solid objects or onto a medium in a volume (such as fog).

Markets for and applications of light projectors include digital cinema, in-door and out-door advertising, medical imaging (both for display of images, as well as capture by a smart light source), large venue and live events or performances, automotive heads up displays, car head-lights and rear-lights, automotive entertainment and information displays, home-theatre, portable business projection, television and displays for consumer applications, military applications, aviation applications (like cockpit displays, smart landing-assistance, individual passenger entertainment displays), structured light sources for industrial applications, automotive headlights and other applications. Structured light may also be used for high precision applications, such as curing ink or other material for 2D or 3D printing, or steering light for laser micro-machining.

Various devices may be used to spatially modulate light. These may be called spatial light modulators (SLMs). Most SLMs provide a 2D array of independently and individually addressable pixels. Some examples of SLMs are reflective SLMs such as digital micro-mirror devices (DMDs), liquid crystal on silicon (LCoS) devices and transmissive SLMs such as LCD panels, transmissive LCD chips such as high-temperature polysilicon (HTPS) or low-temperature polysilicon (LTPS); and partially reflective/partially transmissive SLMs such as micro-electro-mechanical systems (MEMS) based systems in which some of incident light is transmitted and some of incident light is reflected. Most readily available spatial light modulation technologies are subtractive. These SLM technologies operate by absorbing or removing undesired light.

Other types of devices may controllably alter the nature and/or distribution of light using techniques that are not primarily subtractive. For example, the light redistributor may exploit interference of electro-magnetic waves (light), to modulate the distribution of light by controlling its phase characteristics and/or modulate the frequency of the light in order to change the apparent colour of light. Both of these examples show how light can be changed without converting energy from the light into wasted heat by absorbing the light.

Examples of dynamically-addressable focusing elements include: transmissive 2D arrays of controllable liquid crystal compartments with the property that the compartments can be controlled to selectively retard the phase of light, effectively causing a change in path-length. Devices that can controllably adjust the phase of light of different areas are called Phase Modulating Devices (PMD). PMDs may be transmissive or reflective. Some PMDs can individually control phase in a 2D array made up of a large number of pixels. A dynamically-addressable focusing element may also affect the polarization of light. Some devices may alter several light properties simultaneously.

Other types of dynamically-addressable focusing element comprise one or more scanning mirrors, such as a 2D or 3D microelectromechanical system (MEMS); and/or. one or more deformable lenses or mirrors or other optical elements. A dynamically-addressable focusing element may also or in the alternative comprise one or more optical switches.

Various sources can be used for illuminating SLMs, PMDs, imaging chips, or any other light re-distributing device, including arc lamps, light-emitting diodes (LEDs), LEDs plus phosphor, lasers, lasers plus phosphors. Each light source may emit light of different shapes, intensities and profiles. Traditional approaches to combining multiple light sources into a single higher-powered source include coupling light into optical fibres, and knife edge mirror beam combining, relaying into an integration rod, or some other optical averaging device.

However, in some cases, the useful characteristics of individual low-powered light sources are not preserved when combined using the traditional approaches, and higher-powered single-emitters are either not available, or have a prohibitively high cost per watt of light. For example, when light from multiple laser diodes is combined some of the characteristics affected are:

Coherence: When coupling light from multiple discrete laser diodes or laser diode bars into a multi-mode fibre, or combining multiple laser beams into a single beam using a knife edge mirror array plus lens, coherence is lost.

Polarization: The light at the output of a multi-mode fibre is no longer polarized, so some polarization recovery techniques must be used for applications that require polarized light.

There is a need for light sources and projectors that effectively combine light from multiple light sources. There is a particular need for cost-effective light sources and projectors in which light from multiple light sources can be manipulated to yield desired light patterns having desired optical characteristics.

SUMMARY

This invention has a number of aspects. One aspect provides light sources that combine light from a plurality of individual lower-powered light emitters (which, in some non-limiting embodiments comprise laser diodes or other laser light sources and in other embodiments comprise non-laser light sources-which are solid-state light sources in some embodiments). The light sources may emit light in the form of arrays of discrete, collimated, non-overlapping patches. In some embodiments, optical paths provided by the light source cause the individual patches to have desired optical characteristics such as desired polarizations and/or coherence. Another aspect provides methods for illuminating a dynamically-addressable focusing element. Another aspect provides light projectors incorporating light sources as described herein.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIGS. 1A and 1B illustrate a light source comprising a fixed diode array with multiple mirrors.

FIG. 8 illustrates a DMD control scheme.

FIGS. 9A and 9B illustrate a possible effect of asynchronous modulation of a light source and operation of a DMD.

DETAILED DESCRIPTION

Figures 2A, 2B:
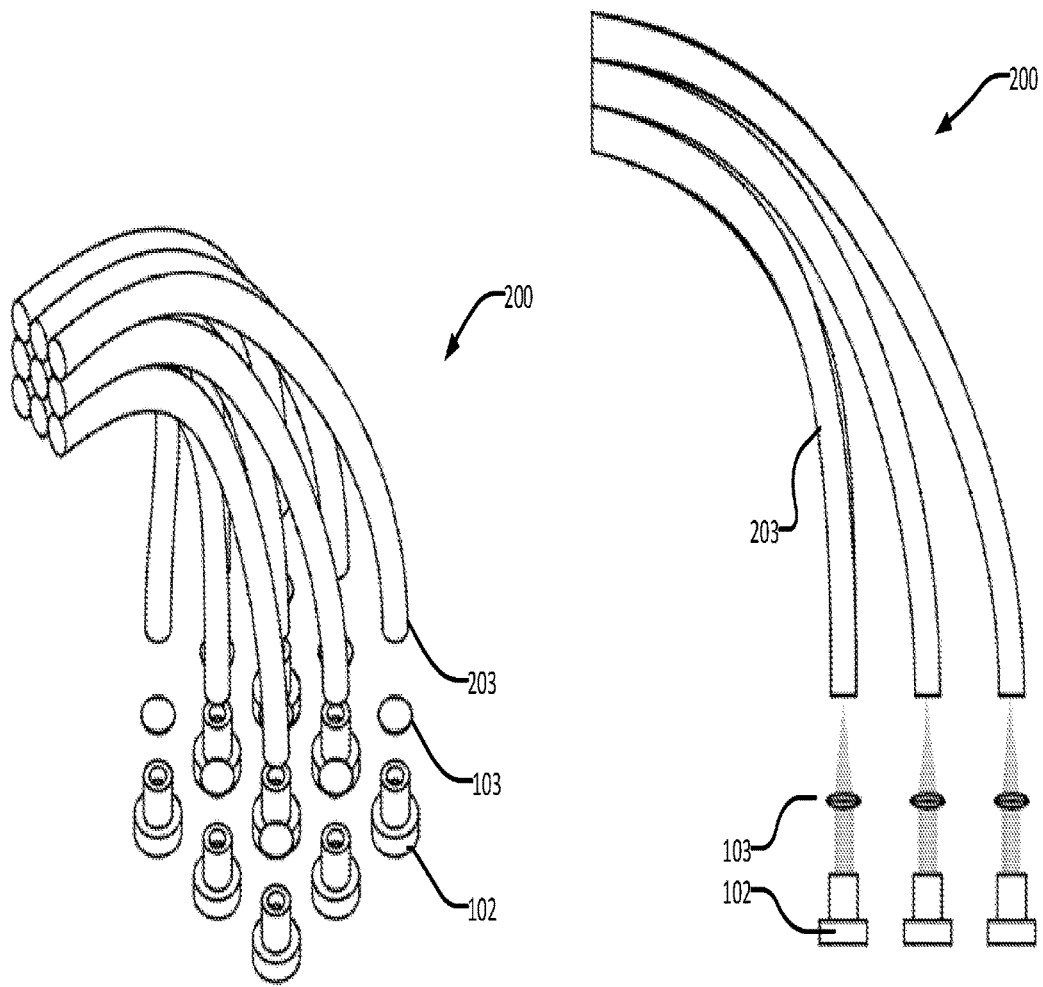
FIGS. 2A and 2B illustrate a light source comprising a fibre coupled diode array.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Several novel approaches have been devised for tiling light from multiple sources in a parallel, collimated fashion. It is advantageous in some applications that the tiled light patches have minimal overlap with one another. In any of these approaches the light patches may be arrayed on a surface of a dynamically-addressable focusing element such as a phase modulator (PMD).

Adjustable Diode Array, Fixed Mirrors

A two-stage array of knife-edge mirrors can be used to tile a two dimensional array of lower-powered light sources, such as LEDs or laser diodes, to cover the active area of an imaging chip with discrete, non-overlapping patches of light. Each discrete laser diode (or other light emitter) is mounted in a holder with built-in X, Y and angular adjustment, and a lens for capturing and collimating the light. The holders each comprise a two-axis stage, and a holder with a tip/tilt adjustment in some embodiments.

This limits the compactness of the light source arrangement, so two arrays of knife edge mirrors are used, oriented 90 degrees to each other. FIGS. 1A and 1B show an example light source 100 which applies this type of approach. Light source 100 includes light emitters 102, lenses 103, knife-edge mirrors 104A and 104B. Mirrors 104A and 104B are arranged at 90 degrees to one another.

If space or design constraints force more complex geometry, two knife edge arrays can be combined in other orientations to achieve closely spaced parallel beams.

The knife edge mirrors serve to reduce the spacing of the individual beams, and clip the edges to minimize overlap and maximize coverage. Each beam may diverge slightly, and to different degrees along the long and short axis, so the mirror assembly is kept compact. The distance from the output of the mirror assembly to the imaging chip is kept as small as is practical.

Fixed Diode Array with Adjustable Mirrors

In another example embodiment, a 2-dimensional grid of light emitters (e.g. laser diodes) is fit into a fixed mount machined to tight manufacturing tolerances, with inset collimating lenses. Light beams emitted by the array of light emitters are directed at a two-stage array of knife-edge mirrors. In this embodiment the light emitters remain fixed and alignment is achieved by moving the mirrors. Once alignment has been achieved the mirrors may be permanently set, such that the output of the opto-mechanical system is a two-dimensional array of discrete, non-overlapping patches of light. This embodiment may otherwise be very similar or the same as the embodiment illustrated in FIGS. 1A and 1B.

This adjustment can be achieved by mounting each mirror on a pivot joint, which can be set with an adhesive once adjusted, or a flexible structure that can be shimmed into place.

In some embodiments knife edge mirrors are split into segments for each source, with individual tip-tilt control. This facilitates de-coupling individual sources from a row or column. Adjustable segments may be adjusted to apply any corrections to the direction or divergence of the individual beams.

Some embodiments provide adjustments to the positions and/or orientations of light emitters 102 as well as to the angles of mirrors 104.

Fibre-Couple Each Diode

FIGS. 2A and 2B illustrate another embodiment wherein the outputs of laser diodes 102 or other light emitters are guided by optical fibers 203 to create a desired array of light patches. For example, the light patches may be arrayed on a surface of a dynamically-addressable focusing element such as a phase modulator (PMD). In this design an array of light emitters 102 each has an associated lens 103 that captures the emitted light, and couples it into a single-mode optical fiber 203. Fibers 203 are bundled, and the output of the bundle is relayed onto the imaging chip (e.g. a PMD). This approach can be used to transform a source array into any shape, spacing, or configuration. A single-mode fibre will maintain polarization and coherence of laser light, but this same approach can be implemented with multi-mode optical fibers, with optimal diameter and geometry for increasing coupling efficiency without significant losses in coherence or excessive divergence.

"Christmas Tree" Mirror Mount

Figure 3A:
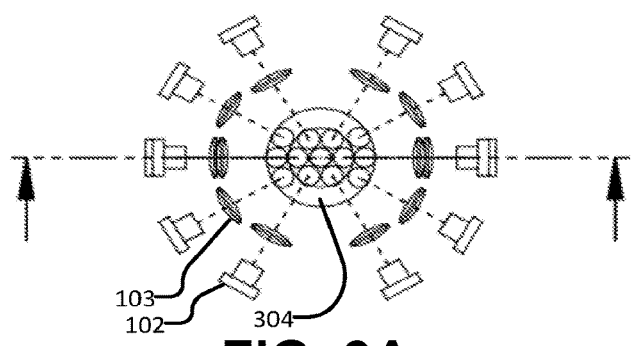
FIGS. 3A to 3C illustrates a light source comprising a "Christmas Tree" mirror.
Figure 3C:
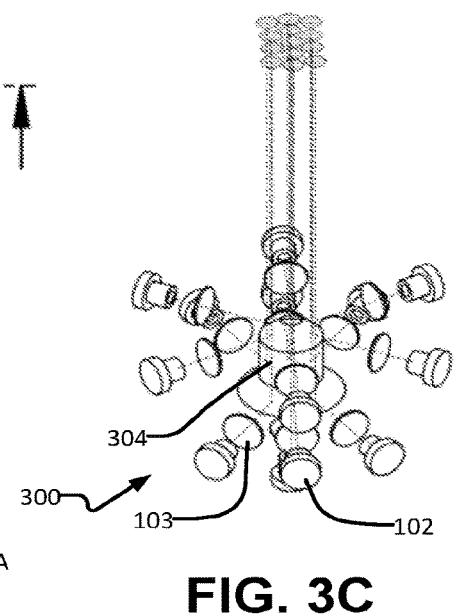
Figure 3B:
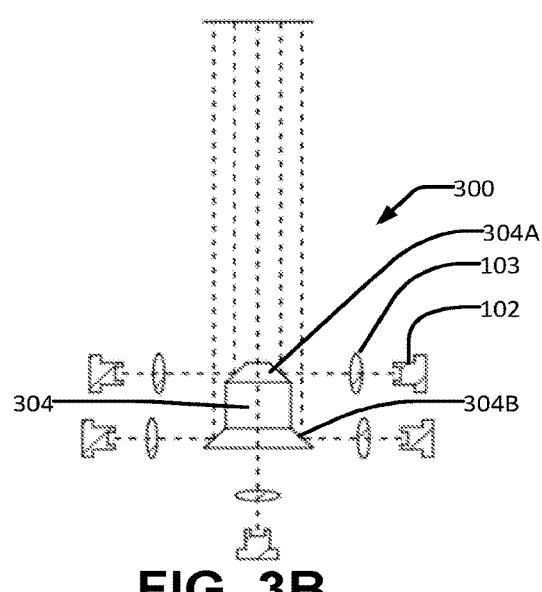

Instead of tiling patches in a rectangular pattern as shown, for example, in FIGS. 1A and 2A, a radial pattern of light patches can be achieved by using a mirror having a generally conical "Christmas tree" design. One potential configuration 300 is illustrated in FIGS. 3A to 3C. In this embodiment, light emitters 102 are mounted radially facing inward toward a Christmas tree mirror 304. In the illustrated embodiment, mirror 304 comprises a plurality of generally conical axially spaced-apart mirror surfaces 304A and 304B. The approach exemplified by FIGS. 3A to 3C can also be expanded, by machining lens curvature into the mirror surfaces 304A and 304B to collimate the beams, reduce the spacing, and aperture the beams in a single step.

A large source spacing may be used to improve alignment at the expense of the overall size of the opto-mechanical system.

If consistent polarization is required, angles may be taken into account to maintain consistent polarity in each beam as it hits the imaging chip or other destination.

Parabolic Mirror for Combining Radial Beams

Figure 3D:
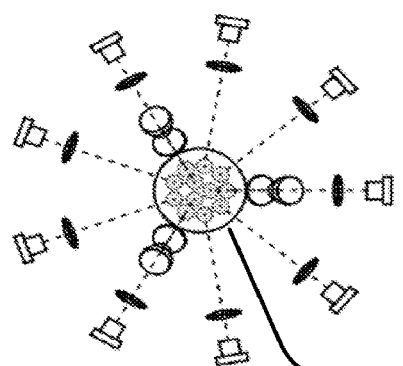
FIGS. 3D to 3F illustrates a light source comprising a parabolic mirror.
Figure 3E:
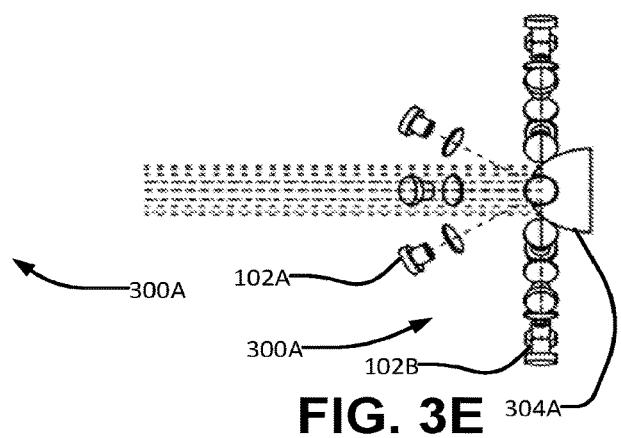
Figure 3F:
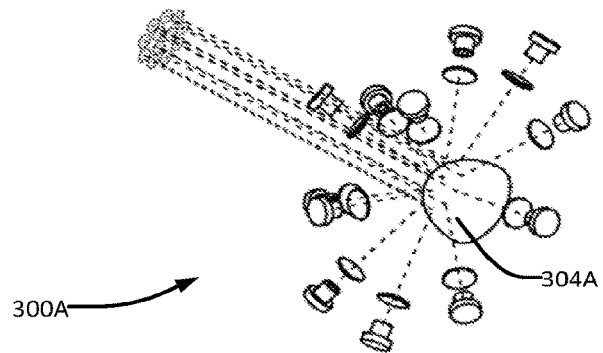

FIGS. 3D, 3E and 3F show an arrangement 300A which is similar to arrangement 300 but uses a parabolic lens 304A to deflect beams from a radial arrangement of light emitters 102A, 102B into a parallel, closely spaced arrangement. In the illustrated embodiment, the emitters include light emitters 102A which direct beams at mirror 304A at a first angle to the axis of symmetry of mirror 304A and light emitters 102B which direct light beams at mirror 304A at a second angle to the axis of symmetry of mirror 304. This concept is similar to the "Christmas Tree" approach illustrated in FIGS. 3A to 3C, but without the aperturing effect of mirror edges.

De-Magnification of Over-Sized Beam Grid

The target illumination area, such as an imaging chip, SLM, or PMD, may be small compared to an array of sources. Any of the above approaches, including the knife-edge mirror approach described with reference to FIGS. 1A and 1B can be used to create a tiled pattern of non-overlapping patches of light (i.e. an array of parallel light beams) on a scale that is larger than the target area. In some embodiments, the scale of the patches of light is a factor of 2 or more times larger than the target area (e.g. the patches of light cover an area 4 or more times that of the target area in some embodiments). An optical system can be used to reduce the area of the resulting cluster of beams by demagnifying the light beams such that the array of patches of light is adjusted to the size required.

Figure 4A:
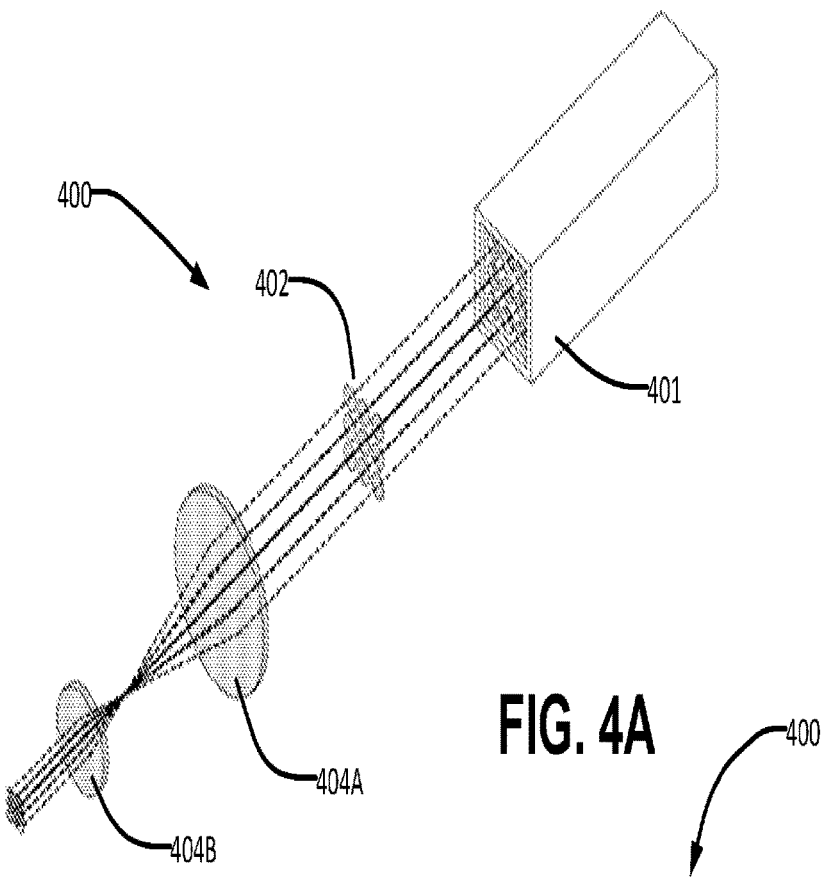
FIGS. 4A and 4B illustrate light profile resizing.
Figure 4B:
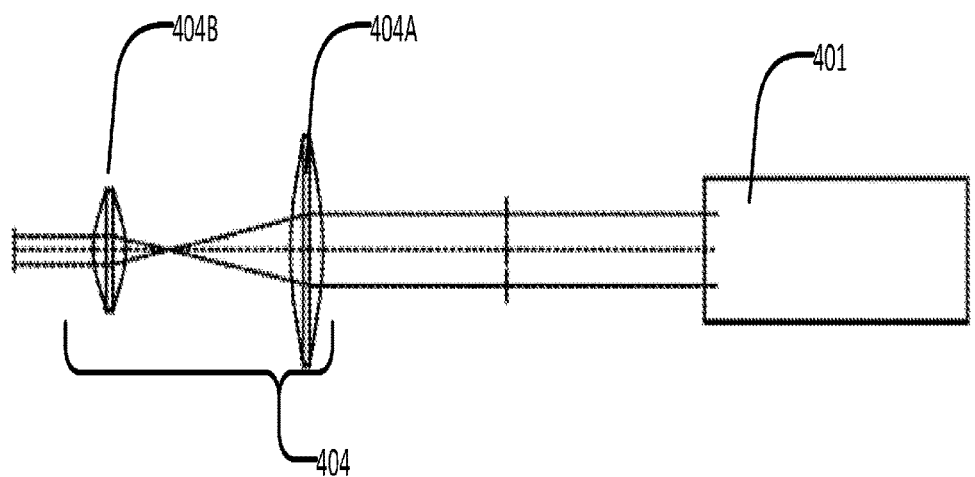

An example arrangement 400 is shown in FIGS. 4A and 4B. An optical system 401 (for example any of the systems described above) creates an array of beams 402. An optical system 404, in this example comprising lenses 404A and 404B de magnifies the array of beams.

Gaps may be maintained between the parallel beams, so divergence or distortion in the de-magnified light profile may be avoided.

Cascading Knife-Edge Mirror Stages

In some embodiments Individual modules each comprising a plurality of light emitters as described above can be produced in configurations which each yield an array of light patches (for example a 3×3 or 3×2 configuration). Beams output by two or more of such modules may be de-magnified as illustrated in FIGS. 4A and 4B, and tiled using an adjustable mirror technique, as described above (e.g. using arrays of tiltable mirrors arranged as shown in FIG. 1A).

Figures 5A, 5B:
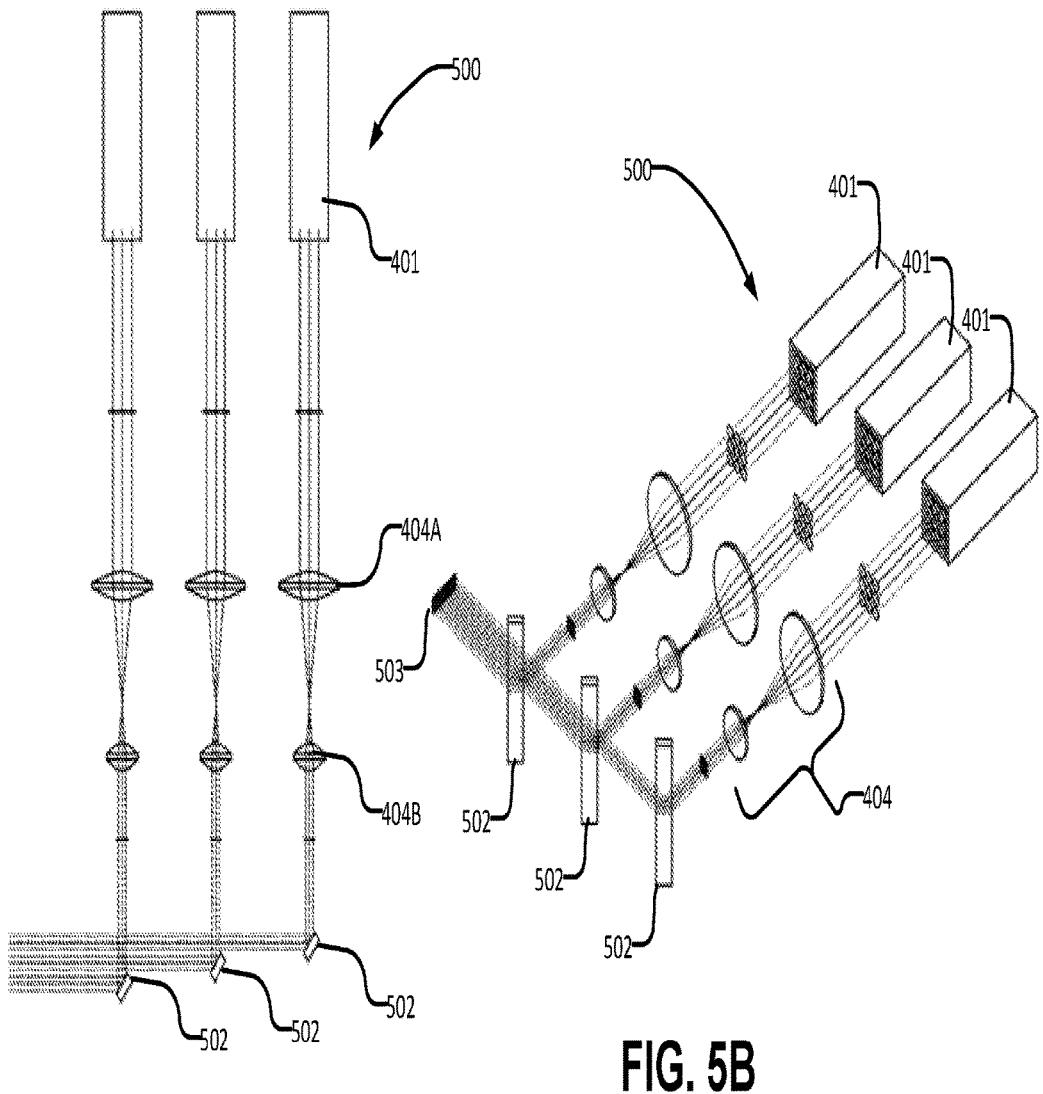
FIGS. 5A and 5B illustrate combining arrays of light beams from several light sources to yield a larger array of light beams.

FIG. 5 illustrates an example system 500 in which light output by three modules 401 is deflected by mirrors 502 to form an array 503 of patches of light. Light from any suitable number of modules 401 may be combined in this manner. Array 503 may combine arrays from modules 401 in a linear manner, as shown, or may combine arrays from modules 401 to yield an output array 503 that is larger in each of two dimensions than the arrays of patches of light from individual modules 401. For example, the arrays of patches of light from modules 401 may be arranged to make a composite array having plural rows and columns of arrays from individual modules 401.

Light Emitters

Any of a wide variety of light emitters may be used in the embodiments described above. for example, the light emitters may comprise lasers. Solid state lasers such as laser diodes are practical for a range of applications. Other examples of light emitters include solid-state light emitters such as light emitting diodes (LEDs); plasma light emitters; cold cathode light emitters; lamps, etc. In some embodiments the light emitters emit coherent light. In some embodiments the light emitters emit polarized light.

Light emitters may be provided in the form of discrete devices or may be packaged together in packages combining plural light emitters. For example, light emitters in embodiments as described above may be provided using systems comprising multiple light emitters, such as diode bars, with appropriate emitter count and spacing. Such embodiments may be advantageous for reducing the number of separately-mounted components in a light source.

Some light emitters may emit light in a form which is advantageously corrected to yield a beam with desired properties (e.g. a beam that is well collimated and directed in a desired direction). Custom optics may be provided for beam conditioning and correction for beam path in some embodiments.

Figure 6:
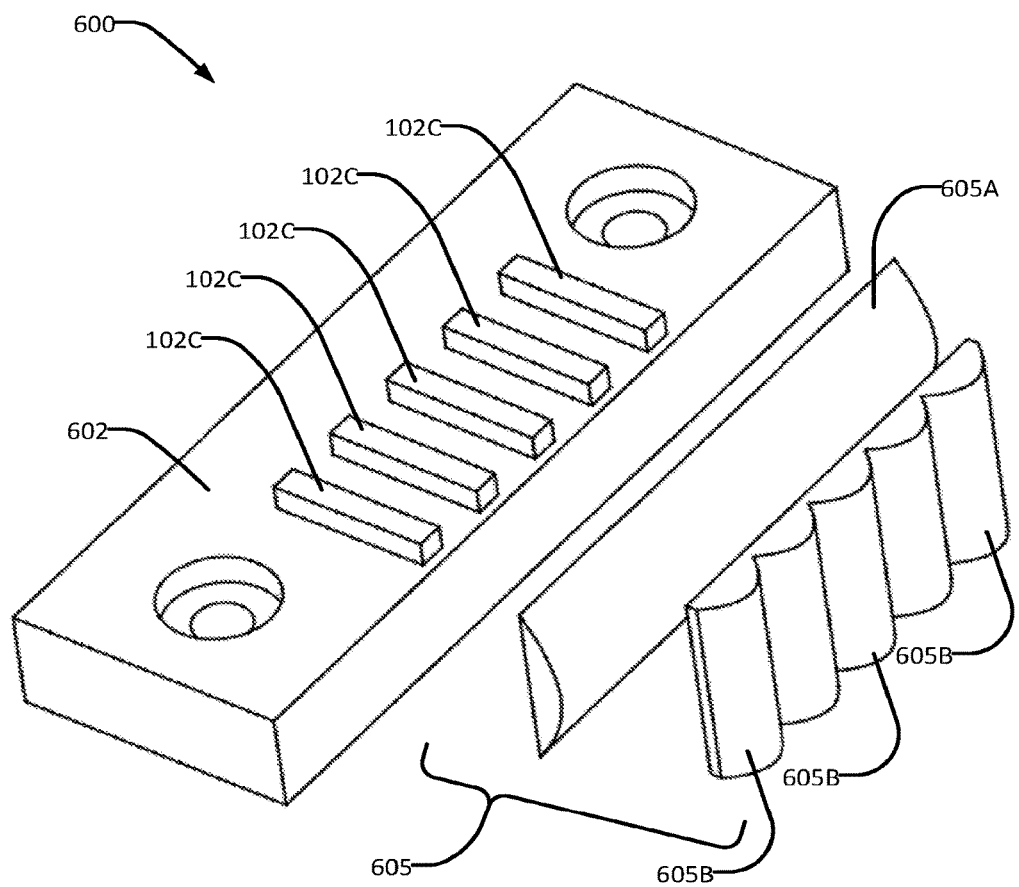
FIG. 6 illustrates an example optical arrangement for collimating light beams from light emitters having a fast and a slow axis.

FIG. 6 shows an example apparatus 600 comprising an edge-emitting diode array 602 which provides a plurality of individual light emitters 102C. Each light emitter 102C has a fast and slow axis. Apparatus 600 includes collimating optics 605 which includes a lens 605A for collimating in one axis and a plurality of lenses 605B for collimating in a second axis to yield a line of collimated output light beams. Two or more sets of apparatus 600 may be stacked to provide a two dimensional array of emitters.

Especially where an off-the-shelf diode bar is used for array 602, some conditioning and "smile correction" may be provided in the optical system in the case that the line of emitters has some curvature. An aperture, or reverse knife edging may be provided to increase the separation between beams. This can facilitate substantial elimination of overlap between adjacent beams.

Dealing with Path Length and Divergence

Most light emitters do not emit perfectly collimated beams of light. A beam of light from a light emitter will generally exhibit some divergence. It is desirable to reduce the effect of such divergence. In cases where divergence of the beams from different emitters can be substantially eliminated, an output array of patches of light may have the patches spaced very close to one another without any significant overlap between the patches. Some light emitters emit light that diverges differently in different directions. A direction in which the divergence is large may be called the fast axis. A direction in which divergence is smaller may be called a slow axis. Where a light emitter has a fast and a slow axis, a single symmetrical lens can approximately collimate a beam from the light emitter along the fast or slow axis, but the beam will continue to diverge in the other axis.

Pairs of Mirrors to Fix Path Length

Some embodiments equalize path length from the light emitters to the corresponding patches at the target area. Making path lengths equal for all beams is advantageous at least in part because beam divergence can differ for different path lengths. Where the path lengths are equal, divergence of all of the beams may be approximately equal.

Figure 7:
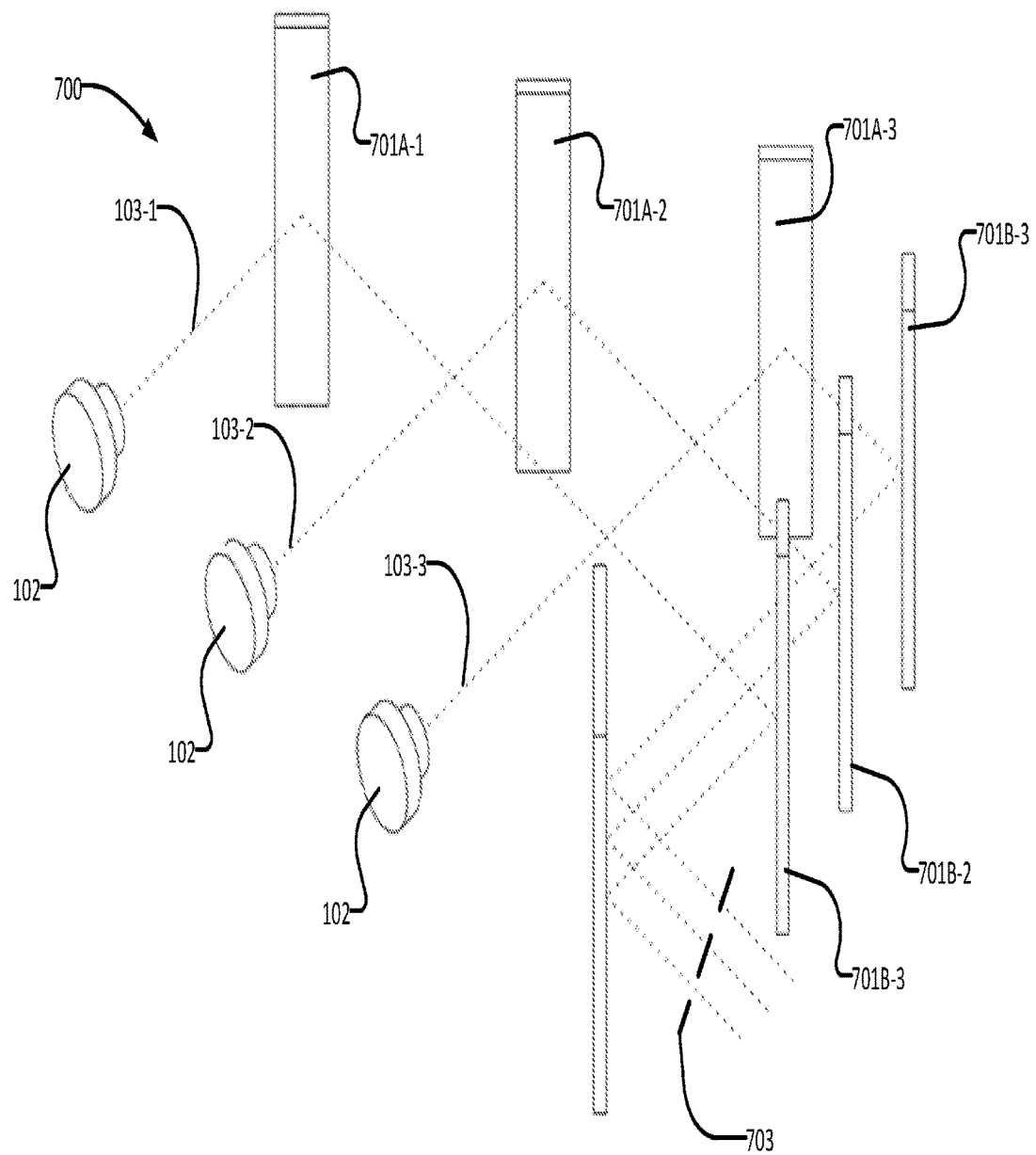
FIG. 7 illustrates path length equalization with multiple mirrors.

Mirrors can be used to fold the light path to equalize the path length across all beams, as shown in apparatus 700 of FIG. 7. Using multiple mirror stages, the path length for each beam can be identical without complex geometry. Apparatus 7 includes light emitters 102 that emit light beams 103-1, 103-2 and 103-3. Each beam interacts with a pair of mirrors that fold its path. the mirrors are spaced so that the path lengths from each light emitter 102 to output beams 703 are equal. Apparatus 700 includes mirror pair 701A-1 and 701B-1 which acts on beam 103-1; mirror pair 701A-2 and 701B-2 which acts on beam 103-2; and mirror pair 701A-3 and 701B-3 which acts on beam 103-3.

Asymmetrical Lenses

Light profiles of source light beams may not be radially symmetrical, either in terms of shape, or rate of divergence. For example, the fast and slow axis of a laser diode have different rates of divergence. This can be corrected by introducing a lens that is not circularly symmetrical in the beam direction (e.g. a cylindrical lens) in the light path.

Some embodiments provide an array of cylindrical lenses to correct the divergence along the slow axis of beams from a plurality of light emitters such as laser diodes. This approach is well-suited for the case where diode bars or a diode bar stack provide the light emitters. This approach may also be applied to an array of discrete diodes or other light emitters. An example is illustrated in FIG. 6.

Various possible optical arrangements to correct divergence of beams having a fast and a slow axis include using pairs of cylindrical lenses for each axis, using a single shared spherical lens and a cylindrical lens for each axis and so on.

Long Geometry

As described above, the effects of divergence can be mitigated by designing the source array such that distance from the source array to the mirrors which guide the light into parallel beams (e.g. knife edge mirrors as shown in FIG. 1A) is large, relative to the distance between the knife-edge mirrors and the target area (e.g. a dynamically addressable focusing element or other imaging chip). In some embodiments the distance from the light emitters to the mirrors is at least 3, 5, 10 or 18 times larger than the distance from the mirrors to the imaging chip.

With this approach, increasing the distance from the light emitters to the mirrors makes any relative differences in path lengths for different beams smaller. The mirrors may be close enough to the imaging chip that the amount of divergence between the mirrors and the imaging chip is small, such that no undesirable overlap occurs at the imaging chip.

Desired Light Source Characteristics for Freespace Laser Projector Using Phase and Amplitude Modulation In a traditional digital projector, it is important that the amplitude SLM (DLP, LCD, LCoS) which is imaged onto the projection screen via the projection lens is illuminated uniformly.

In some embodiments a light source illuminates a dynamically-addressable focusing element non-uniformly. In such embodiments dynamically-addressable focusing element (e.g. a phase modulator) may be controlled to provide structured illumination (which varies from location to location in a known way) on an amplitude SLM. While it remains beneficial to illuminate the phase modulator uniformly (even heat dissipation, uniform light profile on SLM when a flat phase is addressed or in case the phase SLM fails), intensity variation across the phase SLM can be accounted for and the lensing pattern can be adjusted to 'correct' for it (for example to provide uniform illumination on the amplitude SLM when desired).

Alignment Example

A light source for a particular application desirably achieves specifications required by the application for beam quality and stability in a package that is simple and compact. Ideally the light source may be installed as a single module which can be aligned at time of manufacture using adjustments that facilitate rapid accurate alignment (e.g. orthogonal adjustments such that adjustment of one beam property does not change other beam properties).

In some embodiments alignment is performed in a 'bottom-up' approach in which light beams from individual light emitters are centered and collimated, the light emitters are assembled into banks, the alignment of the beams is adjusted, and then beam shrinking optics are adjusted to deliver the output light to a desired target area (in some embodiments the target area is a few mm per side, for example 12×7 mm). After each alignment step the adjustment may be fixed using a settable material such as a suitable epoxy, glue, solder or the like.

Table I provides three sets of example design specifications. Some of these specifications are achieved in some embodiments. One or more of these sets of specifications are achieved in some embodiments.

TABLE I

Example Design Specifications

| Priority | Feature | Good specs | Better specs | Best specs | Unit | Comments/Metrics |
|---|---|---|---|---|---|---|
| 1 | Z-Parallelism | 500 | 210 | 0.5 | arc sec | Fast axis, measure on optical axis at .1 m, .5 m and 5 m distance 6.4 um resolution, 300 mm away |
| 2 | XY Parallelism (in-plane tilt) | 15 | 2 | 0.5 | Degrees | |
| 3 | XY-Shifting (tiling) | 50 | 10 | 0.1 | px (LETO) | |
| 4 | Divergence (fast axis) | | | | mrad | |
| | Divergence (slow axis) | | | | mrad | |
| 5 | Fill-factor on LETO | 40 | 95 | 99 | % LETO area | Fill factor is a function of beam size and diode count. Need to modify one or the other |
| 6 | Intensity uniformity on LETO | 40 | 75 | 95 | % relative to peak | |
| 7 | Measurement port | absent | Present, removable | absent | | |
| 8 | Beam stability over time | unknown | quantified | constrained | % variation | Meet 1, 2, 3 after 1 h, 6 h, 24 h |
| 9 | Beam stability over temperature | unknown | quantified | constrained | % variation | Meet 1, 2, 3 at 20 C., 40 C., 60 C. |
| 10 | Beam stability over power | unknown | quantified | constrained | % variation | (Profile, Centre Location, Intensity) Consistency & predictability over various modulation approaches, PWM, current control, etc. |
| 11 | Throughput | 60 | 75 | 90 | % | |

Example Light Source Block

In this example, eight laser diodes, each with a corresponding collimating lens, are positioned in an array, with 10 mm separation distance. Each diode is pressed into a copper block with integrated cooling fins, and attachment features. Eight lenses are mounted in a fixed block with 10 mm spacing. A jig holds the fixed lens array stationary relative to an alignment pattern some arbitrarily large distance away, in the far field. This alignment pattern includes reference lines indicating desired beam positions, with 10 mm spacing.

A single diode block is held in a three-, four-, five-, or six-axis positioning stage, and positioned such that the emitter is centered with respect to the corresponding lens, the output beam is collimated (neither diverging or converging in the far-field), oriented so that the polarization is consistent with the light source specification, and directed such that the beam is coincident with the corresponding position indicated on the alignment pattern.

The z-axis position of the diode emitter (parallel to the beam direction) controls the divergence of the beam. The x- and y-axis position of the diode emitter control the x- and y-location of the laser spot on the alignment pattern. Rotation about the z-axis controls the polarization orientation. The x- and y-axis position of the diode emitter can be adjusted to correct for distortions in the beam shape.

When the diode is suitably positioned, it is fixed to the lens block. This mechanical connection can be achieved in a number of ways such as:

1. The diode block has tabs that are soldered to pads on the lens block
2. The diode block remains in the jig, and an adhesive such as epoxy or a suitable UV-curing adhesive or a suitable thermal curing adhesive is applied to fix the diode position,
3. The diode block is spot welded to lens block,
4. The diode block is initially aligned coarsely and is precisely deformed in the jig for fine alignment.

Techniques for Improving Alignment Precision

With a printed alignment mask on the example system described, collimation and parallelism accuracy is limited to on the order of +/−1 mm at a distance of 3 m, or 0.015 degrees.

For improved accuracy, more advanced techniques can be implemented. Some examples are:

1. A diffraction grating can be positioned in the light path, to produce larger alignment patterns with diffractive imaging, and magnified for increased measurement accuracy.
   The collimation can be adjusted to achieve the optimal point spread function to a much higher precision.
   The parallel beam alignment precision can be improved by registering two alignment patterns rather than attempting to centre an amorphous beam dot on an alignment grid visually.
2. A dynamic diffractive optical element, such as a phase-only Spatial Light Modulator, can also be used to improve alignment precision, by dynamically changing the diffractive alignment pattern for a multi-step alignment approach.
   Sets of alignment patterns can be generated, starting with coarse patterns, and moving to progressively finer alignment.
   Different patterns may be better suited to achieving different aspects of alignment. For example, horizontal lines for XZ-plane alignment, vertical lines for YZ-plane alignment, a suitable horizontally and vertically symmetrical pattern for collimation adjustment, or for optimizing the beam angle about the optical axis etc.

Automation of Light Source Alignment

The alignment process can be automated, diode-by-diode, using computer-controlled 4-, 5-, or 6-axis alignment stages, and either a machine vision camera directed at a screen, or by relaying the output beams onto an optical sensor, such as a CCD, or CMOS. The following is an example algorithm that may be applied for automated or semi-automated alignment. The algorithm begins with a fixed block of lenses, mounted to an alignment jig. For the duration of the alignment procedure, the lens array may remain fixed relative to the all other elements, excluding the diodes. The alignment jig holds the lens array block, pointed at a dynamic diffractive optical element (e.g. a phase modulator). Light output from the phase modulator is resized using standard optics, and relayed onto an optical sensor, or projected onto a screen and captured by a machine vision camera. The diffractive optical element and screen or optical sensor are placed at a distance that is very large compared to the focal length of the lenses in the fixed array.

1. Begin
2. Position the light emitter (e.g. a laser diode) in approximate alignment with the corresponding lens and clamp the laser emitter in a jig, providing 4-, 5-, or 6-axis micro-positioning. The jig may comprise a stage, and a holding device.
3. Proceed with the automated alignment procedure:
   a. Apply a flat phase pattern to the dynamic diffractive optical element, and adjust the focus by moving the light emitter so that the beam neither converges nor diverges. This can be achieved by sampling the beam profile at several distances along the optical axis and adjusting the distance between the laser diode and the lens until all samples are the same width. This can also be achieved using a beam splitter and a phase sensor, and adjusting the position of the laser emitter until the beam profile is maximally flat.
   b. Insert a polarizer into the light path (if the dynamic diffractive optical element is not polarized, or if it is not polarized in the desired direction). Adjust the angle of the light emitter about the optical axis, holding all other adjustments constant, until the beam reaches maximum brightness.
   c. Apply alignment patterns to the dynamic diffractive element and adjust the position of the light emitter position until the patterns are registered optimally. This process can be repeated for various aspects of alignment, including XZ-plane parallelism, YZ-plane parallelism, rotations about the X or Y axes.
   d. This alignment procedure can be repeated in multiple steps, from coarse to fine alignment
4. When sufficiently precise alignment is achieved for the light emitter-lens pair, fix the light emitter to the lens block using one of the methods described above.
5. Repeat the above steps for each additional light emitter adjusting for beam characteristics as above and also ensuring that the beam is parallel to the beams of previously-aligned light emitters added to the block.

Combined System

Once a block of light-emitter-lens pairs has been aligned to yield collimated, parallel beams, with identical polarization orientation the block may be combined with other elements which function to create a more compact beam array, and to shape and resize the combined light profile to cover an imaging chip. Such a system might comprise:

a mount to hold the array of diode-lens pairs;

an array of knife-edged mirrors arranged to decrease the spacing between adjacent beams;

one or more lenses or mirrors for expanding or contracting the beam to suit the desired application;

mirrors for folding the light path to achieve a compact footprint and/or to equalize path lengths or different beams;

cooling for the heat-generating elements (e.g. suitable heat sinks and/or active coolers such as Peltier elements); and control electronics for the light emitters.

Some embodiments also include monitoring sensors such as temperature sensors attached to measure operating temperatures of the light emitters and/or other elements and/or measurement ports at which beam profiles may be evaluated.

In an example embodiment the light emitters comprise 500 mW laser diodes such as the model ML501P73 laser diodes available from Mitsubishi electric. these laser diodes output light at 638 nm. An example display includes 6 to 20 such laser diodes.

Control Electronics

It is not always desired to have light emitters running at full brightness at all times due to the fact that some images do not contain much light. It is possible to steer unneeded light into a dump area (e.g. through suitable control of a dynamically-addressable focusing element), but it would be more ideal to reduce the light output of the light emitters and reduce energy consumption and heat output. Reducing the output of the light emitters for darker images may also improve black level by reducing scattered light.

Laser diodes can be dimmed by reducing the amount of current passing through them and or turning them off and on at a sufficiently rapid speed to not be noticeable by a human observer—known as pulse width modulation (PWM). It is more difficult to achieve precise intensity control by controlling the current than by PWM.

When using PWM control a duty cycle (% of the time that a light emitter is ON) can be thought of as controlling the output light intensity. For example one way to implement 8 bit control over light intensity is to clock a counter at 256xx the PWM frequency such that an output is held in a state corresponding to the light emitter being ON until the counter value reaches the 8 bit intensity value. The output would be in a state corresponding to the light emitter being OFF at other times during each PWM cycle.

In some projectors Digital Light Processing (DLP) devices are used to create the final image. It is desirable to provide a light source as described herein which is compatible with downstream DLP devices. In a DLP device a binary modulator flips a micro mirror back and forth between an "on" state where it sends light to the screen and an "off" state where it sends light to a "dump" area. Each pixel has a corresponding micro mirror. The DLP creates greyscale by flipping the micro-mirror back and forth rapidly. The micro mirror is controlled to spend more time in the "on" state to make a brighter pixel or more time in the "off" state to make the pixel dimmer.

In an example DLP driving scheme, each pixel has an 8 bit (or more) greyscale drive value per frame of video (usually 60 fps), these are translated into 8 mirror flip periods, with one period for each bit. The period corresponding to the least significant bit is short. The period doubles for each bit and is longest for the most significant bit.

Whether a bit is set to 0 or a 1 determines whether the mirror is flipped to the "on" or the "off" position for the corresponding period. FIG. 8 shows that the shortest period that the mirror may be in the "on" or "off" state is for the lowest-order bit (b0). This shortest period may be called the "flip period".

Asynchronous Light Pulses

If a pulsed light source is used (for example to produce light at 50% of the maximum level), flickering will occur if the "off" and "on" pulses of the light emitter are asynchronous to the mirror flipping and the periods of "off" and "on" significantly differ from frame to frame on a static image due to a low pulse frequency for the light state.

Slow Asynchronous Light Pulses

This is illustrated in FIGS. 9A and 9B. In frame 1 of FIG. 9A the viewer perceives two light pulses during the time the DMD transmits light. In frame 2 of FIG. 9B the viewer perceives three light pulses during the same DMD open period. This 50% change in light intensity is due to the light pulses being asynchronous to the mirror flips.

Fast Asynchronous Light Pulses

If the "off" and "on" light source periods are short relative to the "mirror flip" period, the difference between "off" and "on" periods between static frames should be drastically reduced and be imperceptible to the human eye. For example, FIGS. 10A and 10B show an example in which the light emitter is modulated significantly faster than the DLP flip period.

Figure 10A:
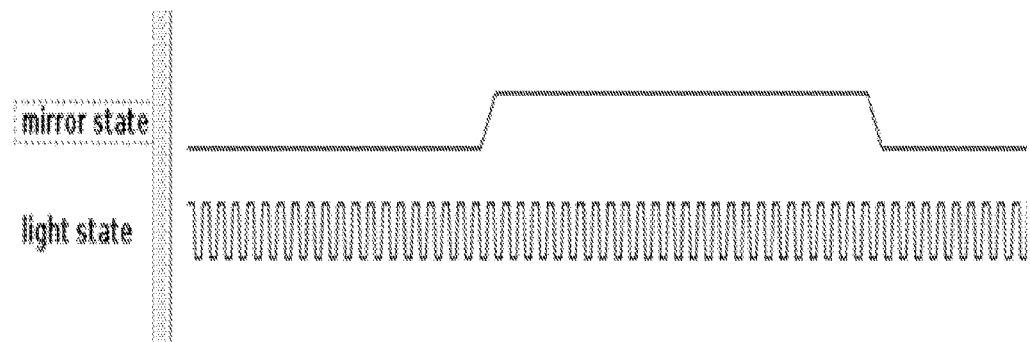
FIGS. 10A and 10B illustrate asynchronous modulation of a light source and operation of a DMD in a case where the light source is modulated at a high frequency relative to flip time of the DMD.
Figure 10B:
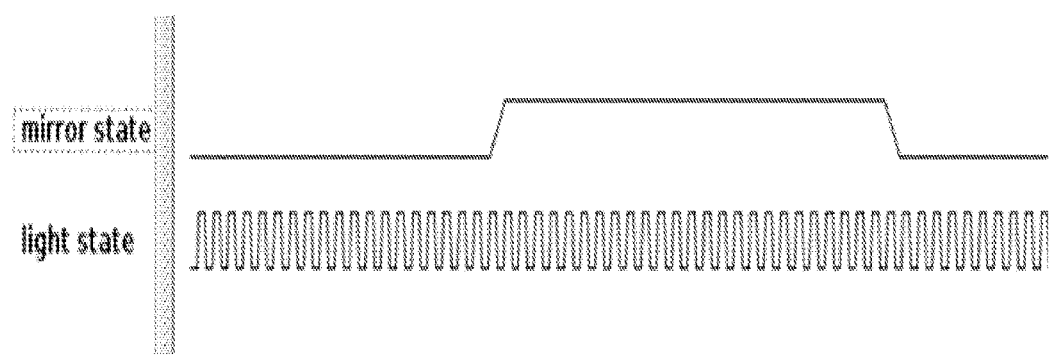

In FIGS. 10A and 10B only a single minimum width mirror flip is shown depicting a drive value of 1. The viewer perceives a light intensity corresponding to 27/54 in FIG. 10A and to 28/54 in FIG. 10B. A disadvantage of this solution is that a large amount of electromagnetic interference (EMI) can be produced by switching powerful lasers off and on very quickly. Also, tighter timing tolerances are required by the circuitry to minimize duty cycle distortion between lasers.

Synchronous Light Pulses

Figure 11:
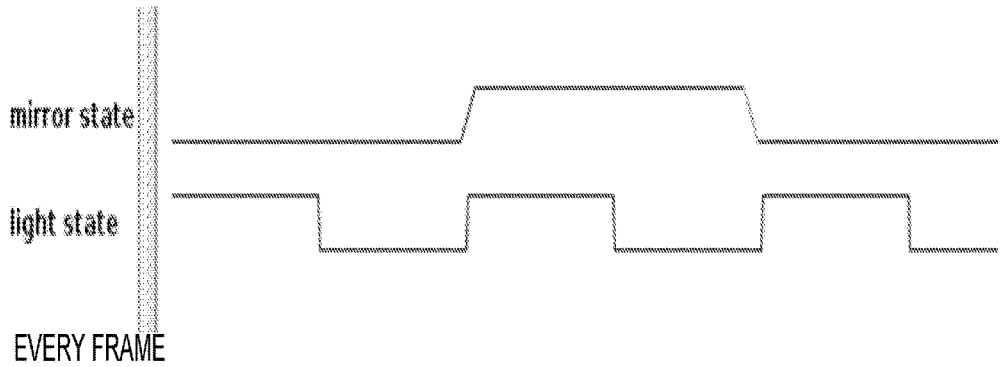
FIG. 11 illustrates synchronous modulation of a light source and operation of a DMD.

If the light emitter "off" and "on" periods are synchronous to mirror flips, there should be practically no difference between static frames and the light source pulse generator need only run at the period of the mirror flips, drastically reducing generated EMI and allowing for slacker timing considerations. FIG. 11 illustrates an example embodiment in which light output from a light emitter is synchronized to DLP flip cycles.

When a new frame arrives, the mirror flip logic for all pixels can be updated simultaneously via a double buffering scheme (or in blocks from top to bottom if desired).

Synchronizing the Light Source to the DLP

Some DLP driver chips provide a "trigger out" pin that indicates the start of a mirror flip cycle. In absence of this an independent "mirror timing recovery" circuit can be constructed. When the mirror is in the "off" state it sends light to a "dump" area. Placing a photoreceptor in the dump area will send a voltage back to the circuit when a mirror flips to the "off" state. During a "training mode" the lasers are constantly on and the DLP sends only the least significant bit to the dump area (i.e. drive level 254 for a DLP with 8 bit control). Using a high speed reference clock and counters the period of the shortest mirror flip can be determined and the timing of subsequent mirror flips can be predicted. Similar methods are employed in telecom applications for clock and data recovery from a single wire serial data stream. A jitter attenuator may be provided depending on the amount of error in the recovery system.

With the recovered mirror flip period, the light source can synchronize PWM for the light emitters to the mirror flip periods such that a deterministic light intensity can be produced for the shortest mirror flip period (and all longer periods). During longer mirror flip periods the PWM cycle could simply repeat (twice for bit 1, four times for bit 2, 8 times for bit 3 etc.), or to further reduce EMI the PWM cycle period could lengthen for each bit.

Figure 12:
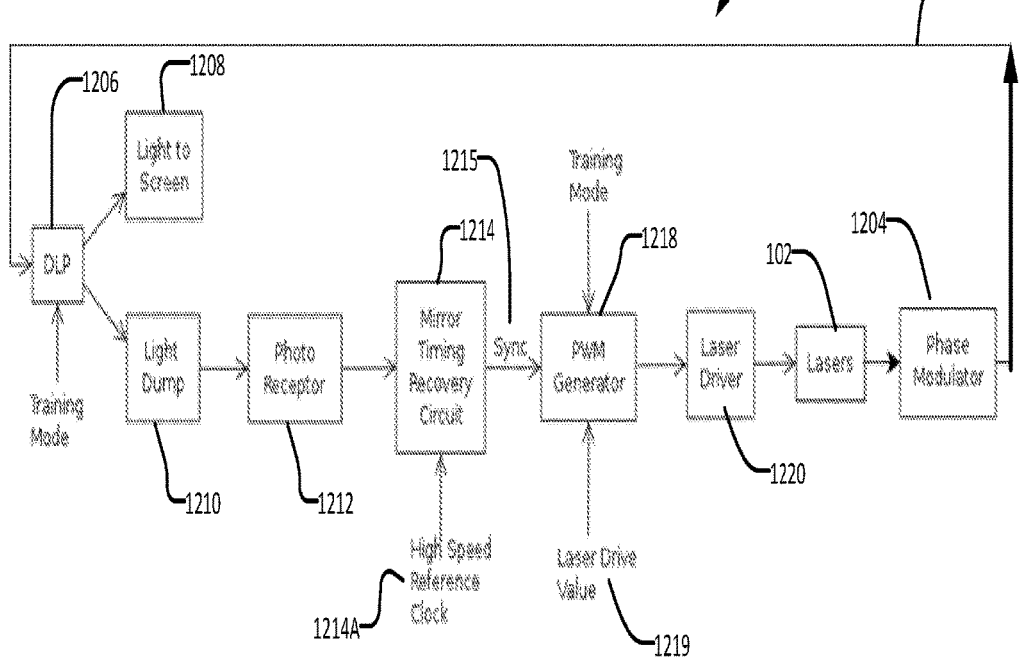
FIG. 12 is a block diagram of example apparatus for generating a DMD sync signal by analyzing light dumped by the DMD.

FIG. 12 illustrates an example system 1200 in which a light source 102 illuminates a PMD 1204 by way of an optical system (which may, for example, be as described in any embodiment discussed herein), Light 1205 is steered by PMD 1204 to illuminate an active area of a DMD (or DLP) 1206. Pixels of DMD 1206 are operable to direct light to a screen 1208 or a light dump 1210. A photo receptor 1212 measures the light incident at light dump 1210. Since this light is turned on and off at the times that micromirrors of the DMD 1206 flip, the output signal of photoreceptor 1212 is modulated. The output signal of photoreceptor 1212 is provided to a timing recovery circuit 1214 which also receives a reference clock signal 1214A. Timing recovery circuit determines the timing of the DMD mirror flip cycle through analysis of the signal from photoreceptor 1212 and generates a sync signal 1215 which is provided to PWM generator 1218. PWM generator 1218 receives light emitter drive values 1219 and generates PWM signals to cause light emitter driver 1220 to drive light sources 102 at appropriate levels. PWM generator 1218 synchronizes the PWM signals to sync signal 1215.

A further enhancement that may be added to reduce the maximum current draw from the laser power supply and somewhat reduce EMI is to shorten the PWM period slightly and stagger the turn on times for different light emitters.

Figure 13:
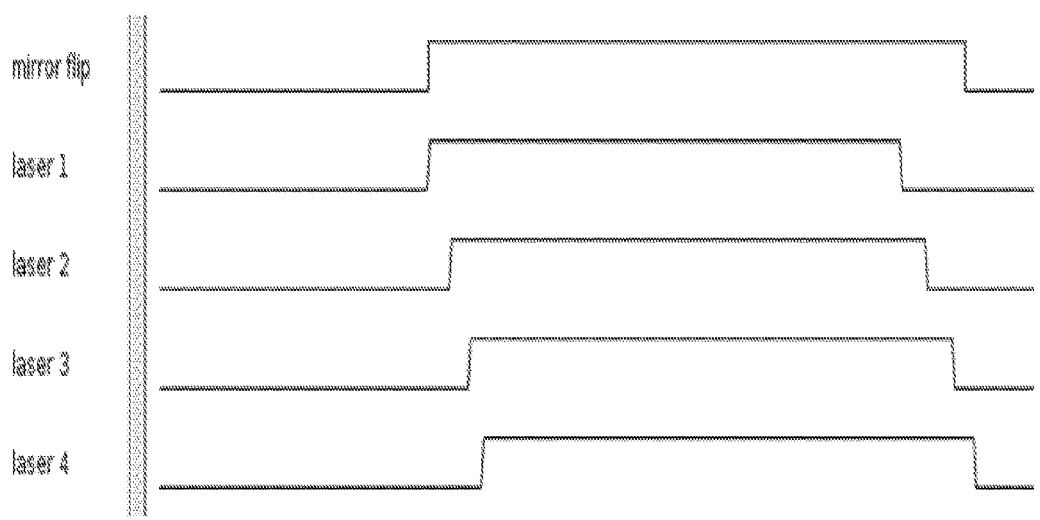
FIG. 13 illustrates an example staggered start of light emitters relative to a DMD cycle.

Staggering the laser turn on times requires less maximum current capacity from the laser power supply because only one laser turns on at any given time. This should also reduce EMI produced by the power supply. FIG. 13 illustrates staggered laser turn on times synchronized to a DMD mirror flip.

Light Emitter Temperature Control

The temperature of a laser diode affects the wavelength produced and the efficiency (lumens per watt). If laser output is attenuated to a low level for an extended period the laser may cool excessively and lumens output may deteriorate. Worse, the light output may become non-deterministic relative to the PWM drive level. To correct for this condition, the light source may be configured to drive the lasers harder when they are cool and to steer the excess light to a dump area to warm the lasers up. Alternatively, a Peltier element (and or another heater) can be used to warm or cool a laser that is operating outside of a desired temperature range. An optical feedback path can be implemented to detect light intensity in part of the beam to measure accuracy of lumens output in relation to laser drive levels and temperature.

Example Applications

Embodiments of this invention can be used to provide illumination for any of the applications or markets described above. A light profile made up of tiled, substantially non-overlapping patches of coherent, polarized laser light has multiple potential applications. An example application is providing illumination for creating a light field using a phase modulating device (PMD). Outputs of the lasers may be individually modulated if desired. In some embodiments, polarizations of the light patches is oriented to match a polarization preferentially passed by the PMD.

Example phase modulation devices include:

Spatial light modulators (SLM), for example a 1 D or 2D array of pixels, in which the drive level addressed at a pixel correlates to the phase delay applied to the light impinging on that pixel, for example the drive levels between 0 and 65535 may correspond to the range of phase delay between 0 and $2\pi$ radians (one cycle of the wavelength of the light).

Such a spatial modulator can simultaneously change the state of polarization of the light (an example is a transmissive liquid-crystal display, or a reflective liquid crystal-on-Silicon display (LCoS)). Alternatively, such an SLM can be designed to affect the phase delay of that pixel, but not its polarization.

An acousto-optical modulator (AOM; also called a Bragg cell) can affect deflection angle of the incoming light, its phase, frequency and polarization characteristics.

A grating light valve (GLV); currently, these devices are 1D addressable arrays where each pixel or element can vary the phase of the impinging light by mechanically varying the path length.

Deformable Mirrors; using either continuously deformable mirror surface with an array of control points, or arrays of discrete, individually modulated reflective pixels.

A phase modulation device can be used to create a desired light field. A lens in the classical sense is a variable thickness piece of transparent material such as glass that retards the phase of the incident light differently across the lens surface, resulting in a focused or de-focused spot of light depending on the curvature or shape of the lens. A similar effect can be achieved by retarding the phase of the incoming light beam using a phase modulating device (PMD). For example, the effect of a lens can be achieved by addressing a varying phase pattern on the PMD, with for example 27r phase retardation in the centre of the PMD, falling off to 0 phase retardation on the edges of the PMD. Stronger lenses (lenses with a shorter focal distance) can be achieved by controlling the PMD to provide phase modulation in a pattern like that of a Fresnel-lens (i.e. by phase wrapping the values applied to drive the PMD pixels).

A PMD may be controlled to simulate the effects of other optical elements, such as prisms and gratings in a similar fashion, for example by applying a slowly varying amount of phase delay in one direction on the PMD.

Different effects may be combined on the PMD. An example is a phase-pattern that both focuses and shifts the incoming light profile. This may be achieved by controlling the PMD to alter the phases of light in a pattern that superimposes (adds) the respective phase delay patterns for a lens and a prism.

Several lenses side-by-side or super-imposed on the PMD can coarsely approximate an image. By suitably controlling a PMD to emulate the action of a number of lenses one can create a situation where an image or parts of an image are in focus anywhere along the direction of light propagation, for example in several planes.

A PMD may be controlled to create any of an exceedingly broad range of output light fields. Determining what data to use to drive the PMD to yield a specific desired output light field may be done in a number of ways. In a more-computationally expensive but more exact mode one can apply a mathematical model of the inverse transformation provided by the entire optical system (including the PMD) to start with the desired output light field and calculate the PMD pixel settings corresponding to the desired output light field. A less-computationally intensive but less exact mode includes setting parameters for one or more discrete optical elements (lenses, prisms, etc.) that can be emulated by the PMD to yield an output light pattern that approximates the target light pattern. The parameters may, for example, include sizes, locations and optical strength.

Various approaches to controlling a PMD to cause a desired image or other light pattern to be displayed are described in PCTCA2014051013 published as WO2015054797 (reproduced below with figure numbers changed); PCTCA2015000324; PCTCA2015050515; and PCTCA2015050730; the disclosures of all of which are hereby incorporated herein by reference for all purposes.

TECHNICAL FIELD

This invention relates to light projectors. Some embodiments may be applied to project images for viewing. Other embodiments may be applied to create structured light for illumination or other purposes. Embodiments have example application in markets such as digital cinema, TV and home theater, portable and personal projection (military, mobile, etc.), indoor and outdoor personal and large screen advertising and information dissemination, signs/advertising/billboards/outdoor advertising, large-venue and live performance, medical imaging, virtual reality, computer gaming, office presentations and collaborative work, head-up displays in cars and other vehicles, smart illumination such as adaptive car head-lights, theatre spotlights, security/architectural lighting, high contrast planetarium projectors, indoor and outdoor general illumination systems, street-lighting, road-lighting, aviation lighting systems, and high-contrast simulation displays such as flight simulators

BACKGROUND

There are many situations where it is desired to create a light field that has a specified luminance profile. Light projection systems have a very wide range of applications from architectural lighting to the display of lifelike images. The projected light patterns can be dynamic (e.g. video), static (used for static images or static applications like the beams of typical car headlights projected through a lens onto the road, made by arbitrarily shaped optical surfaces, etc.). Light may be projected onto a wide range of screens and other surfaces which may be flat or curved. Such surfaces may be fully reflective (like a canvas used in a cinema, a wall or a building) or partially reflective (such as the windshield of a vehicle). Screens may be low-gain or high-gain, Lambertian or highly directional, high-contrast or lower in contrast. Light may be projected onto solid objects or onto a medium in a volume (such as fog).

Markets for and applications of light projectors include digital cinema, in-door and out-door advertising, medical imaging (both for display of images, as well as capture by a smart light source), large venue and live events or performances, automotive heads up displays, car head-lights and rear-lights, automotive entertainment and information displays, home-theatre, portable business projection, television and displays for consumer applications, military applications, aviation applications (like cockpit displays, smart landing-assistance, individual passenger entertainment displays), structured light sources for industrial applications, automotive headlights and other applications.

Various devices may be used to spatially modulate light. These may be called spatial light modulators (SLMs). Most SLMs provide a 2D array of independently and individually addressable pixels. Some examples of SLMs are reflective SLMs such as digital micro-mirror devices (DMDs), liquid crystal on silicon (LCoS) devices and transmissive SLMs such as LCD panels, transmissive LCD chips such as high-temperature polysilicon (HTPS) or low-temperature polysilicon (LTPS); and partially reflective/partially transmissive SLMs such as micro-electro-mechanical systems (MEMS) based systems in which some of incident light is transmitted and some of incident light is reflected. One problem is that most readily available spatial light modulation technologies are subtractive. These SLM technologies operate by absorbing or removing undesired light. This contributes to the more general problem that light projection and often general illumination technologies tend to have undesirably high energy consumption and may also have an undesirably limited peak luminance.

Additional considerations apply to light projectors that are applied to project images. For example, in such projectors raised black-levels, undesirably low contrast and limited colour-saturation can be concerns.

These limitations can mean that a dark viewing environment such as a cinema, a dark living room, or some other lighting-controlled environment, is needed to get the best out of projected imagery. This limits the possible applications for projectors.

In all fields of technology including light projection achieving a desired level of performance at a competitive cost can be an issue.

There is a general need for light projection systems that ameliorate one or more of the above-noted problems.

SUMMARY

This invention relates to systems that re-distribute light dynamically from a single or multiple light sources in order to achieve a desired light field (which may or may not comprise an image depending on the application) efficiently. Re-distribution of light involves taking light from one area within a light field and directing the light to another area within the light field. Some embodiments provide a controllable illumination system that can be used as a component in any of a wide range of lighting applications. Other aspects of the invention provide methods for creating light fields and light projectors which apply such methods.

A light field projection system according to some embodiments comprises a data processor, a computer software program, one or more light sources and a light control mechanism that includes one or more dynamically-addressable optical elements. The light control mechanism may also include one or more static optical elements such as lenses, mirrors, gaps, optical fibers, light guides and the like in an optical path. The software program, when executed by the processor may process data specifying one or more desired target light fields (which may, for example, comprise anything from desired headlight patterns to image frames in a movie) and may cause the one or more dynamically-addressable optical elements to redirect light to achieve the desired light fields.

Example embodiments of the invention provide light projectors, projection displays, methods for operating projection displays, media containing computer readable constructions which, when executed by a data processor, cause the data processor to execute a method according to the invention, methods for displaying images, methods for processing image data for display, methods for processing sequences of image data for display, among others.

Further aspects of the invention and features of an illustrative set of example embodiments are illustrated in the accompanying drawings and/or described in the following description.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 17:
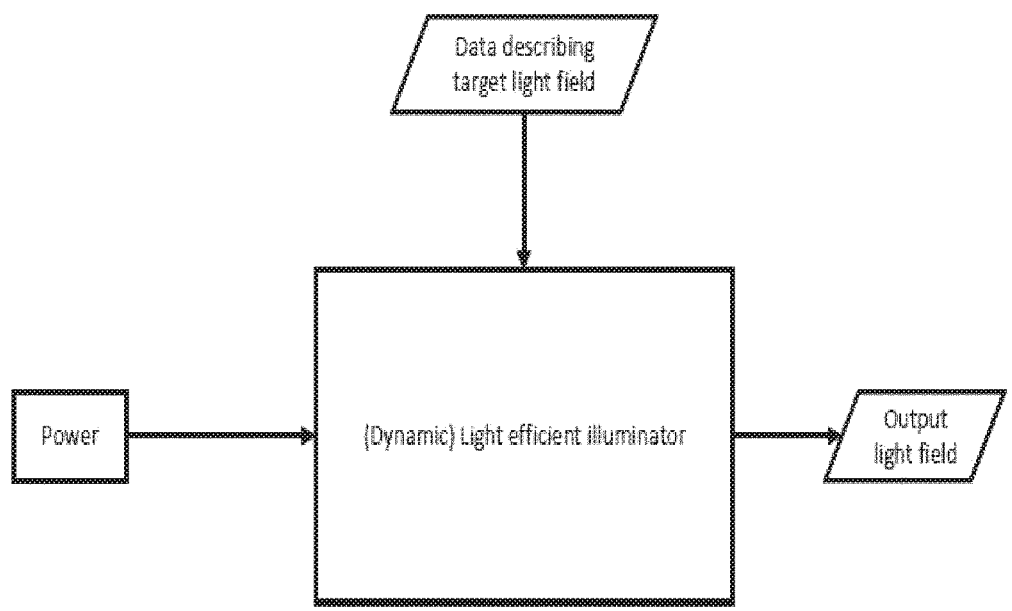
FIG. 17 is a block diagram of an example system (light efficient illuminator) at a high level.

FIG. 17 illustrates schematically an example system for generating a light field according to an example embodiment. The system is configured to receive data describing a target light field and to produce an output light field that closely matches the desired target light field by redirecting light. In some cases the output light field may require further optical or other treatment to produce the desired target output light field. Such treatment may be provided by one or more refinement stages as described herein. As described in more detail below, the system does this in an optically efficient manner, in which little light is wasted. The system includes one or more light generators (light sources) that can be operated to create light. In some embodiments the system operates the light generators to output light and then redirects the light to provide the output light field. The output of the light generators may be controlled to match the amount of output light to the amount of light required for the output light field. Most of the light generated by the light generator(s) may end up in the output light field.

Figure 18:
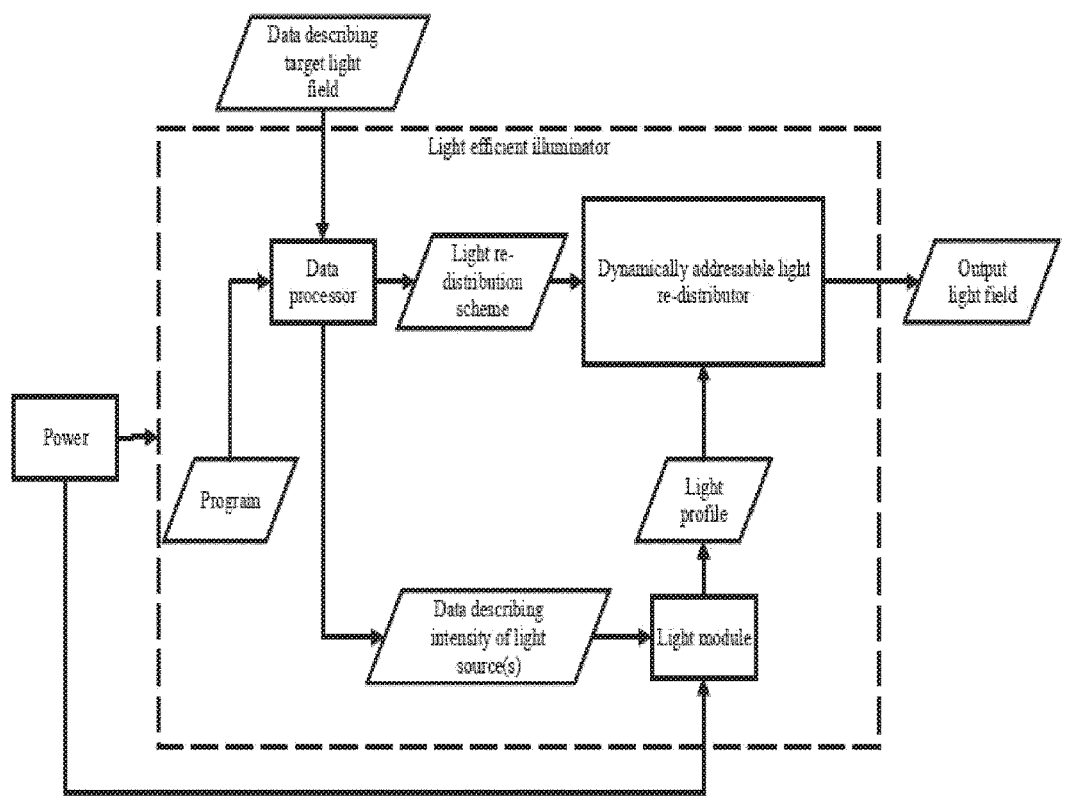
FIG. 18 is a block diagram of the system of FIG. 17 at a more detailed level showing basic components of a light efficient illuminator.

FIG. 18 depicts an example dynamic light-efficient illuminator in more detail. A program is executed on a data processor. The program receives data describing the target light field and computes a light redistribution scheme to be applied by a dynamically-addressable light re-distributor. The program also computes data describing the intensities for one or more light sources that generate light supplied to the light redistributor.

A data processor is not required in all embodiments. In some embodiments light redistribution schemes for a pre-determined set of light fields are determined in advance. In such embodiments data defining the light redistribution schemes corresponding to the light fields may be stored, embodied in fixed or configurable logic circuits or the like. Appropriate data can then be applied to control the light redistributor to generate a desired one of the light fields without the necessity for any computation.

The light module (comprising the light sources and light redistributor and associated optics) receives power, as well as data describing the intensities of one or several light sources and generates a light field having a desired light profile. An example light module is further illustrated in FIG. 19.

Figure 19:
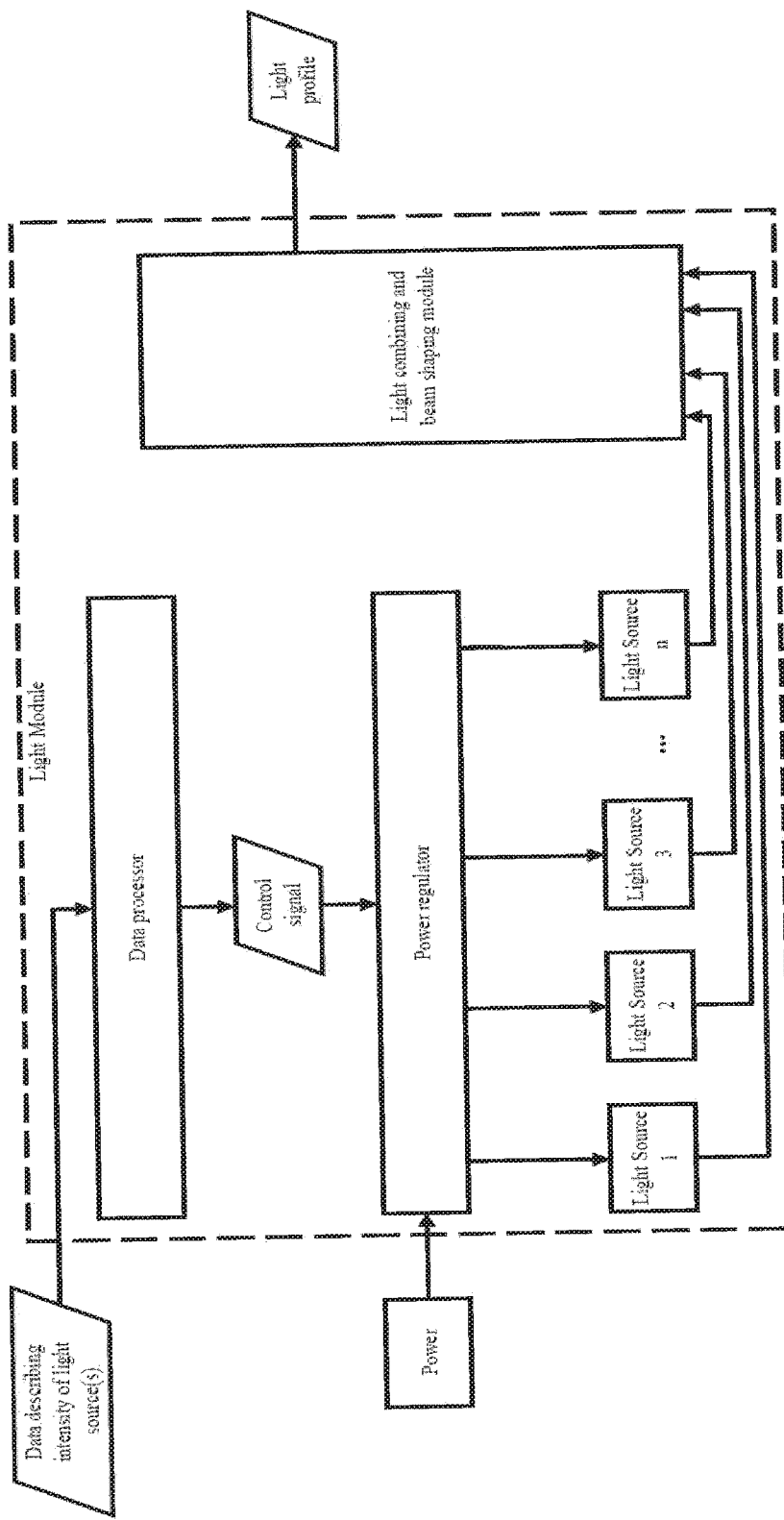
FIG. 19 is a block diagram detailing the components within the light module which is a component of the light efficient illuminator shown in FIG. 18.

FIG. 19 is a more detailed schematic view of an example light module. The light module comprises a data processor, a power regulator, one or many light sources, and a light combining and beam-shaping module.

The data processor receives data describing the intensity for the light source(s) and produces a control signal for the power regulator that in turn controls the amount and/or timing of power distributed to each light source. The power regulator may include a plurality of separate outputs and/or may include a plurality of independent power regulation circuits.

The light sources may be of any of a wide variety of types. One light module may optionally include light sources of a plurality of types. Some examples of light sources are: lasers, arc-lamps, LEDs, high-intensity lamps, etc.

Each light source may emit light of different shapes, intensities and profiles. An example light profile produced by a light source could be a uniform, rectangular intensity profile which could be produced using integrating rods or other optics. Another example of a light profile has a Gaussian or sum of Gaussians intensity profile. Another example is an array of rectangular uniform profiles (blocks) with different intensities. In another example, the light profile produced by the light module can take any desired shape.

The light from the light source(s) is then coupled to the input of the light redistributor. The coupling may involve spatially combining light from a plurality of light sources and/or shaping the light optically to yield light having the desired light profile for input to the dynamically-addressable light redistributor. The light combination and beam shaping may be done using common optical elements such as beam-splitters, polarizers, wave plates, multi-layer thin films, beam-combiners, micro-lens arrays, lenses, apertures and/or mirrors. These elements can be optimized for the nature of the light emitted by the light sources (e.g. narrow-band or broad-band light sources).

In one preferred embodiment, light from a plurality of light sources is coupled into a common optical fibre and at the output of the fiber the light is collimated using a set of lenses.

Data present within the system, for example the control signal or data describing the light profile incident on the Dynamically-addressable Light Re-Distributor may be provided to external components or systems, for example in the form of metadata.

Figure 20:
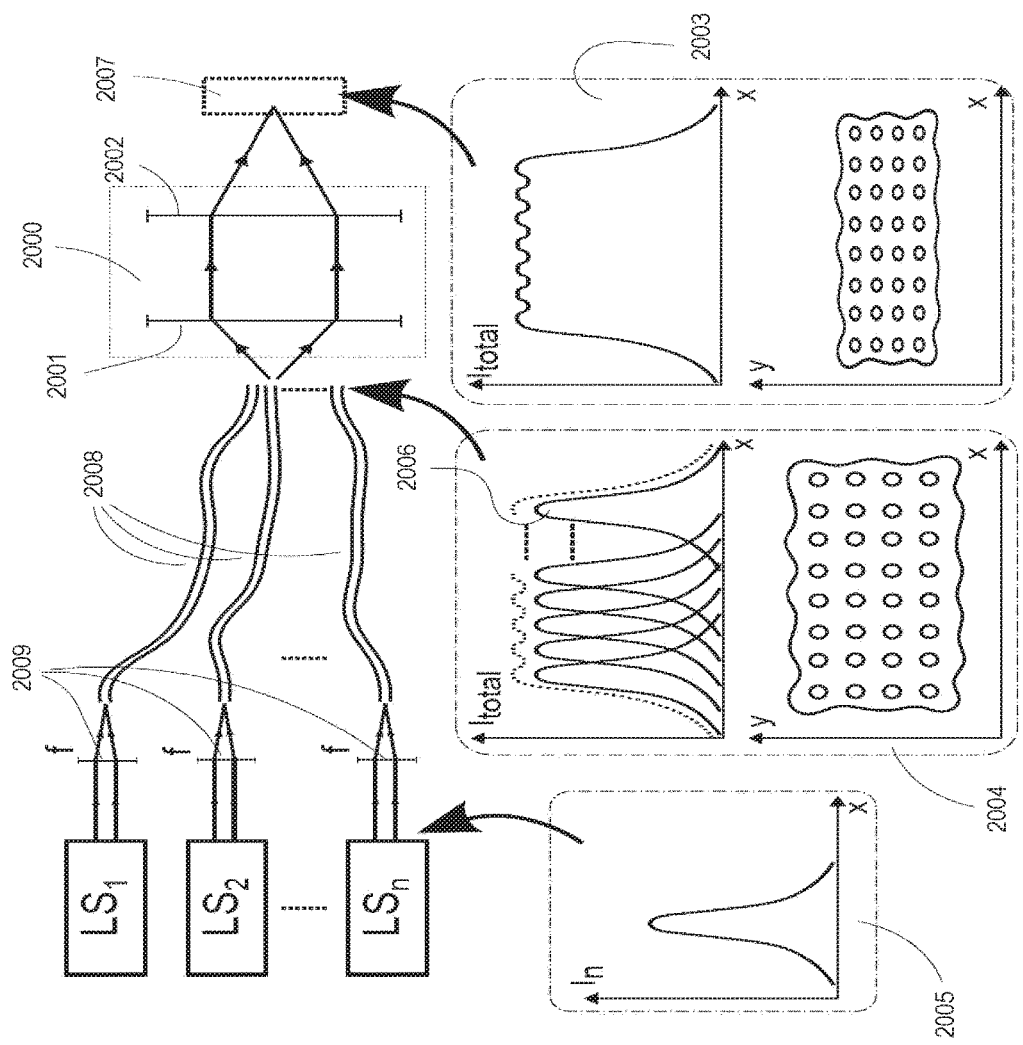
FIG. 20 details example optical components within the light module of FIG. 3 and also depicts example light profiles at each stage within the light module.

FIG. 20 shows example light profiles at various stages through the system illustrated in FIG. 19.

The light redistributor may controllably alter the nature and/or distribution of light using techniques that are not primarily subtractive. For example, the light redistributor may exploit interference of electro-magnetic waves (light), to modulate the distribution of light by controlling its phase characteristics and/or modulate the frequency of the light in order to change the apparent colour of light. Both of these examples show how light can be changed without converting energy from the light into wasted heat by absorbing the light.

In one embodiment one or more light sources LS 1 to LSn are coupled into one or more optical fibres 2008, for example using focusing lenses 2009. 2005 shows an example light profile of the rn light source. The combined output from the optical fibres 2008 are relayed onto the dynamically-addressable light redistributor 2007, for example using relay lens system 2000, comprising, for example, two focusing lenses 2001 and 2002. The combined effect of the two lenses 2001 and 2002 in 2000 may be to asymmetrically magnify the output profile from the optical fibres 2008. 2003 shows two example plots: at top the combined intensity across one spatial dimension of 2007 and at bottom contours of the light profile present on 2007 in two dimensions. 2004 shows an example of the same type of plots of the intensity and contours present at the output of 2008. Furthermore the top plot in 404 illustrates how the total intensity of the light profile may be made up from a plurality of light profiles for example 2006 from each light source LS1 to LSn.

Figure 21:
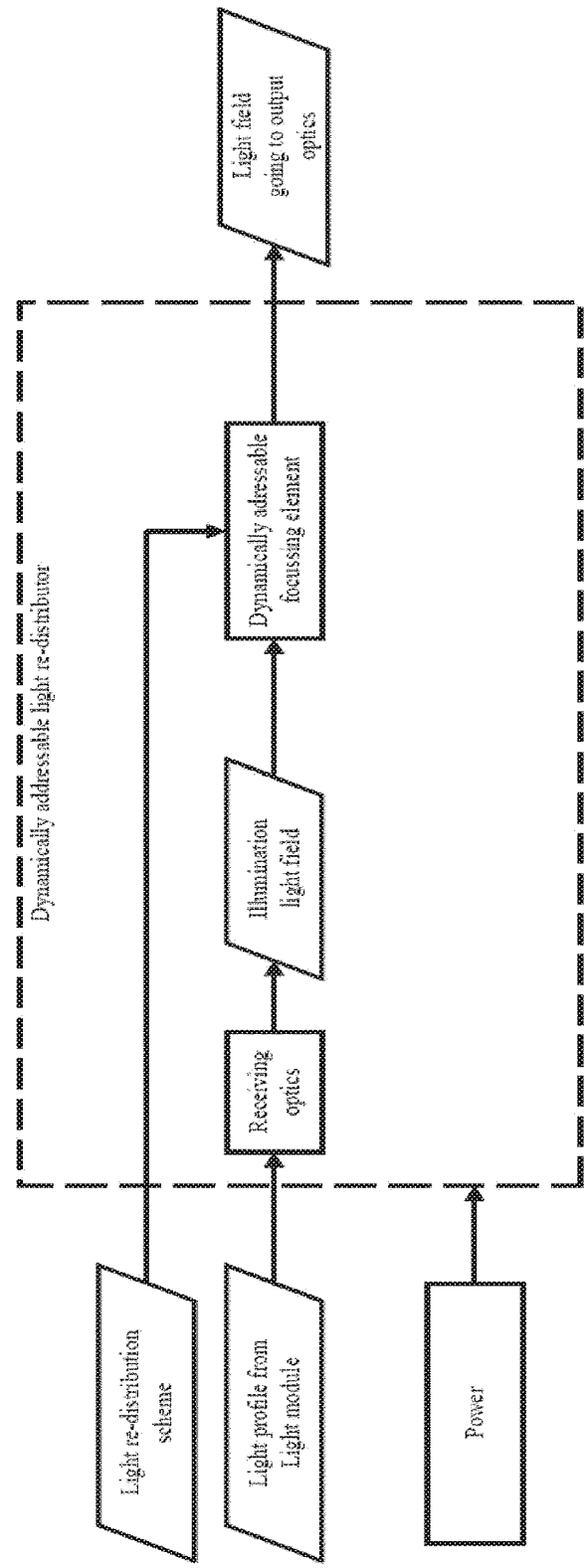
FIG. 21 is a block diagram of an example dynamically-addressable light redistribution module.

FIG. 21 schematically illustrates one type of dynamically-addressable light redistributor. The dynamically-addressable light redistributor comprises receiving optics, and a dynamically-addressable focusing element.

Examples of devices suitable for use as dynamically-addressable focusing elements in different embodiments include: transmissive 2D arrays of controllable liquid crystal compartments with the property that the compartments can be controlled to selectively retard the phase of light, effectively causing a change in path-length. The same type of device could be implemented in a reflective manner. A dynamically-addressable focusing element may also affect the polarization of light. Some devices may alter several light properties simultaneously.

In some other embodiments a dynamically-addressable focusing element comprises one or more scanning mirrors, such as a 2D or 3D microelectromechanical system (MEMS); and/or one or more deformable lenses or mirrors or other optical elements. A dynamically-addressable focusing element may also or in the alternative comprise one or more optical switches.

The receiving optics transforms an incoming light profile from the light module into an illumination light field that matches or approximately matches the size, shape and angular acceptance range of the dynamically-addressable focusing element. The receiving optics could, for example, comprise one or more of: a prism system, a lens, a free space optical path, an integrating rod or waveguide.

The dynamically-addressable focusing element is controlled by data that corresponds to a light re-distribution scheme. The data may describe a variation in light path-length across the device which, when implemented by or executed on the dynamically-addressable focusing element causes the formation of the desired output light-field.

Figure 22:
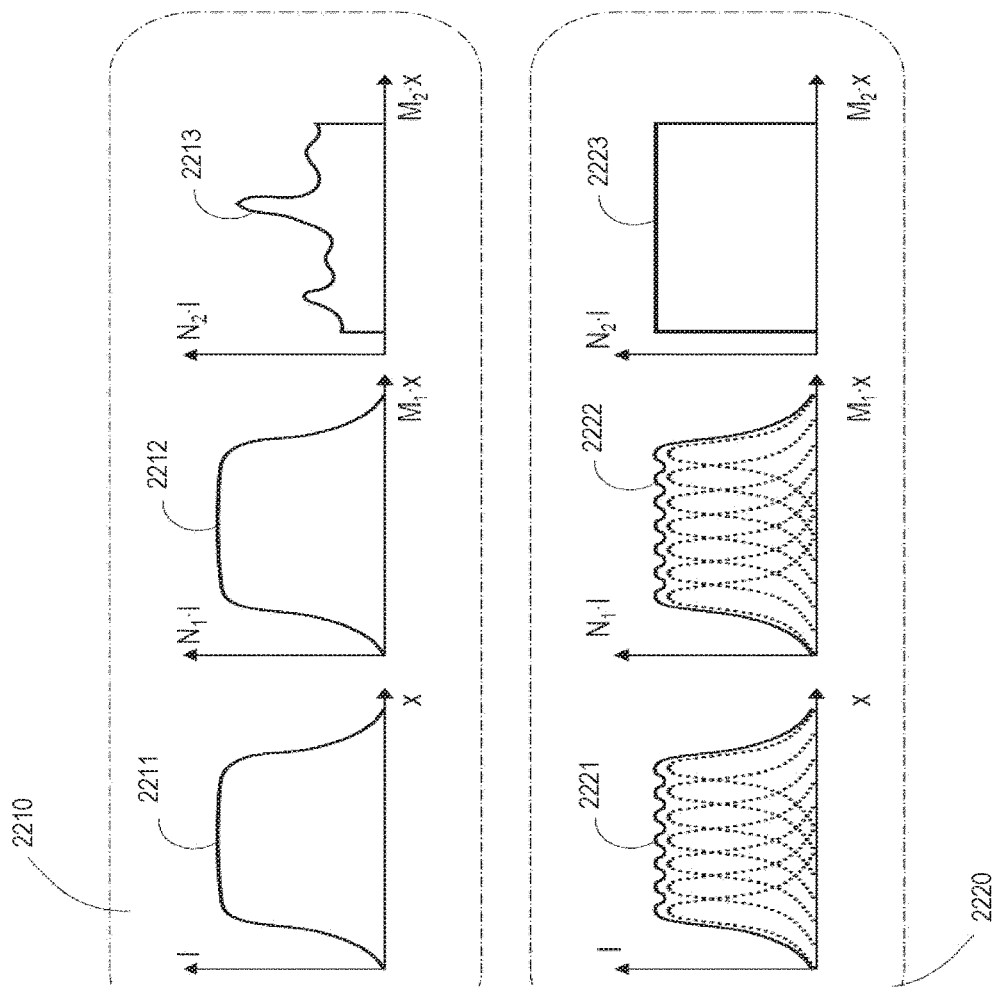
FIG. 22 shows two examples (top and bottom) of light profiles at the light module (left), at a dynamically-addressable focusing element (center) and at the system output.

FIG. 22 shows some examples of light profiles created in the light module and an example final system output light profile. FIG. 22 includes two examples of what the light fields may be at three stages of FIG. 21: an incoming light profile from the light module, the illumination light field present at the dynamically-addressable focusing element, and the light field going to the output optics. Example 1 illustrates the case where a fairly uniform input light field is transformed into an arbitrary and desired output light field. Example 2 illustrates the case where a non-uniform input light profile made up with light from an array of independent light sources is transformed into a uniform light field at the output.

FIG. 22 shows two example sets of light profiles at various stages of the Light Efficient Illuminator. In 2210, an application is shown in which the light profile 2211 at the output of the light module is transformed into an arbitrary light profile 2213 at the output of the light efficient illuminator. The arbitrary light profile 2213 may directly represent the target light field or target image. The light profile 2212 shows the light profile 2211 relayed and magnified onto the dynamically-addressable focusing element. MI and M2 represent the magnification of the optical system, resulting in the intensity scale factors NI and N2, respectively.

In 2220, an application is shown in which the light profile 2221 at the output of the light module is transformed into a uniform light profile 2223 at the output of the light efficient illuminator. The light profile 2222 shows the light profile 2221 relayed and magnified onto the dynamically-addressable focusing element. MI and M2 represent the magnification of the optical system, resulting in the intensity scale factors NI and N2, respectively.

Providing a module capable of yielding a wide range of output light fields is advantageous as such modules may be optimized for optical efficiency and may be applied in any of a wide range of applications as described above. Apparatus according to the invention may also be integrated directly into projectors, displays, lights etc.

Explanation of how to Use a Phase Modulator to Create a Desired Light Field, Description of Basic Arrangement.

Example phase modulation devices include:

Spatial light modulators (SLM), for example a ID or 2D array of pixels, in which the drive level addressed at a pixel correlates to the phase delay applied to the light impinging on that pixel, for example the drive levels between 0 and 65535 may correspond to the range of phase delay between 0 and $2\pi$ radians (one cycle of the wavelength of the light).

Such a spatial modulator can simultaneously change the state of polarization of the light (an example is a transmissive liquid-crystal display, or a reflective liquid crystal-on-Silicon display (LCoS)). Alternatively, such an SLM can be designed ONLY to affect the phase delay of that pixel, but not its polarization.

An acousto-optical modulator (AOM; also called a Bragg cell) can affect deflection angle of the incoming light, its phase, frequency and polarization characteristics.

A grating light valve (GLV); currently, these devices are ID addressable arrays where each pixel or element can vary the phase of the impinging light by mechanically varying the path length.

How to Use a Phase Modulator to Create a Desired Light Field:

A lens in the classical sense is a variable thickness piece of glass that retards the phase of the incident light differently across the lens surface, resulting in a focused or de-focused spot of light depending on the curvature or shape of the lens. A similar effect can be achieved by retarding the phase of the incoming light beam using a phase modulating device (PMD). For example, the effect of a lens can be achieved by addressing a varying phase pattern on the PMD, with for example 27r phase retardation in the centre of the PMD, falling off to 0 phase retardation on the edges of the PMD. Stronger lenses (lenses with a shorter focal distance) can be achieved by controlling the PMD to provide phase modulation in a pattern like that of a Fresnel-lens.

A PMD may be controlled to simulate the effects of other optical elements, such as prisms and gratings in a similar fashion, for example by applying a slowly varying amount of phase delay in one direction on the PMD.

Different effects may be combined on the PMD. An example is a phase-pattern that both focuses and shifts the incoming light profile. This may be achieved by controlling the PMD to alter the phases of light in a pattern that superimposes (adds) the respective phase delay patterns for a lens and a prism.

Several lenses side-by-side or super-imposed on the PMD can coarsely approximate an image. By suitably controlling a PMD to emulate the action of a number of lenses one can create a situation where an image or parts of an image are in focus anywhere along the direction of light propagation, for example in several planes.

More complex images or illumination profiles can be achieved by controlling the PMD to present a phase adjustment that is continuously-varying over the area of the PMD as opposed to controlling the PMD to emulate a combination of discrete optical surfaces such as lenses and/or prisms.

Example Arrangements for Light Sources

Types of Light Sources:

The light source for the system can for example be one or more lasers, arc-lamps, LEDs, or even the sun. The specific characteristics of a light-source can make it more desirable than others. For example, a laser might be preferable over a broad-band lamp due to its small beam size, limited optical spread (resulting in a very high intensity), limited etendue, its narrow spectral-band frequency distribution (and thereby pure colour), its polarization-, lifetime-, decay-, efficiency-, coherence and collimation characteristics.

Example Optics to Bring Light to/from Phase Modulation Device:

Light needs to be transported to and from the phase modulating device (PMD). It may also be desirable to have one or several of its characteristics changed, like its illumination profile, its magnification and shape, its polarization or frequency. It is sometimes preferable to have the incoming light profile match the shape of the PMD. Examples of elements or devices that can be used to achieve this include but are not limited to:

Beam expanders consisting of one or several physical lenses;
Single or bundled optical fibres;
Prisms;
Cylindrical lenses;
Micro-lens arrays;
Gratings;
Diffusers;
Polarization filters;
Apertures;
Wave-plates;
Integrating rods.

Different Light Sources Illuminating Different Areas of Modulator

In the case that several light sources are used to illuminate the PMD, the light profiles from these separate sources may overlap, partially overlap, or not overlap on the PMD.

It might be desirable to achieve a uniform combined light profile on the PMD. In that case, optical elements such as integration rods, micro-lens arrays, diffusers, or other light-shaping devices may be included to uniformly illuminate the PMD.

The intensity of one or more of these light sources may be independently adjusted in order to achieve a desired combined light profile on the PMD. As an example, one might want to have the incident light profile be brighter in the centre of the PMD than on its edges.

Alternatively, the total amount of light from one or more light sources incident on a region on the PMD over a fixed period of time can be adjusted by turning the light-sources on and off (pulse-width modulation, PWM) instead of adjusting the intensity of the light sources. The on-time relative to the off-time determines the overall amount of light incident on the PMD over a period of time. The duration of the on-pulses in the time period may vary, and they may be periodic, non-periodic or random; the total on-time may be more relevant to perceived brightness or colour by an observer.

The pulsed PWM approach may require a synchronization between the incident light sources and other elements in this optical system.

Example Projection Arrangements

The most simple projection system comprises a light source, some beam-shaping optics to partially or fully illuminate the PMD, and a phase-retardation pattern on the PMD.

In another embodiment, a plurality of light sources may illuminate the PMD.

In another embodiment, the output light field from the PMD may be relayed onto a spatial light modulator (SLM) for further refinement, for example by amplitude modulation.

In another embodiment, the output light field from the PMD may be presented onto one or more integration rods, each of which integrates all the light incident on it into a uniform output. This output in turn may be relayed onto different regions of the SLM for further refinement.

In some embodiments, it may be desirable to relay the output light-field from any of these system arrangements onto a projection screen or surface.

Different Focusing Arrangements

In one common application, it is desirable that the projection system form an image on a flat, a near-flat, or at most slightly curved surface. In other applications, it may be desirable to project onto one or several non-flat surfaces or screens, for example a curved screen or a rough surface like a brick-wall, or a building. In another application, one might wish to project onto a moving object, like a person or animal, or a vehicle moving either on land, in the air, on water or submerged under water. Such an application may require the synchronized capture and detection of that moving object. It may also be desirable to project images or patterns onto different objects within a volume, or to different points in a volume. For example, in a car head-light application, one may wish to illuminate an upcoming stop-sign very brightly, but an approaching vehicle with reduced intensity.

A phase-pattern present on a PMD can be arranged in such a way as to focus at different depths or with different effective focal lengths. The corresponding light field can include images or features that are in focus at one plane or point, and other images or features that are simultaneously or time-delayed in focus at another plane or point. In some embodiments, one can arrange the phase-pattern on the PMD so that the system is focus-free, or in focus at any distance.

Focus at any of these points or planes can be achieved using a phase pattern on the PMD exclusively ("dynamic lenses"), rather than with physical lenses. It can also be achieved using a combination of dynamic lenses on the PMD and physical lenses. It can also be achieved using only physical lenses.

How to Image in Colour.

In one embodiment, colour images are formed by mixing appropriate ratios of light of three differently perceived colours, for example red, green and blue everywhere in the target image. For example, in an image described by a pixellated 2D array, each pixel may have different amounts of red, green and blue contributions. In another embodiment, light of four or more differently perceived colours may be mixed for a similar effect.

In one application, the different colours can be supplied simultaneously but in parallel, for example by shining each of the primary colours onto its own SLM or PMD, and then recombining the different colours using a colour re-combiner, for example a cube made up from dichroic mirrors (a so-called "X-cube")—In another application, the three (or more) light sources may illuminate different areas of one PMD. Because of the steering-capability of the PMD(s), these three (or more) regions may be combined downstream in the optical system by applying the appropriate phase pattern on the PMD(s). The phase-patterns for the differently coloured regions will be determined individually in order to ensure that when they are combined, they form a colour-image as close as possible to the target-image.

In another application, each frame of the video is broken down into its separate colour channels, for example red, green and blue. The differently coloured light sources may illuminate one image-forming device (such as the PMD, or a conventional amplitude-modulating SLM) in sequence (so-called time-multiplexing). It is desirable for these sequential colour fields to be presented in fast succession, so that the human visual system perceives the resulting colour image without colour break-up or flicker. An example is to show a red colour field for the first image of a video sequence for 1/72th of a second, followed by the green colour field for the first image for the next 1/72th of a second, followed by the blue colour field for the first image for the third 1/72th of a second for an effective frame-rate of 24 Hz or 24 frames per second. This process is then repeated for the ensuing frames of the video or image sequence.

In one embodiment, time-multiplexing may be combined with beam-steering in the following manner. In the case of a three-primary imaging system (for example R, G, and B), each of the three colours may be time-multiplexed by different amounts, providing a different amount of integrated intensity of R, G, and B onto the display screen. For example, within one complete frame-duration, the on-time of the red colour field may be a much larger fraction of the total frame-duration than the green colour field on-time. This can be extended to a higher number of primary colour light sources.

In another embodiment, the different colours may be provided simultaneously off one imaging device per colour channel. Dimming of each colour channel independently may be achieved by multiplexing each colour channel.

In another application, broadband light or several combined narrowband light sources may be split apart using a diffraction grating or a prism (for static deflection), or a PMD (for dynamic deflection). The chromatically split light may be relayed onto a (second) PMD where several bands of colour may be processed independently in order to form a final colour image at the display screen.

In one or all of the above-mentioned applications, one might use integration rods to make the intensity profile of different regions more uniform before further processing.

Control Modalities

Examples of Control System Hardware

The control system hardware may comprise a data processor and computer readable data representing the sequence of light fields ("target images"). In some embodiments, it may be preferable to process the data in real-time, and in other embodiments the data may be pre-processed and stored on computer-readable media. In some applications, the data processing may be executed on a field-programmable gate-array (FPGA), an application-specific integrated circuit, or a general purpose possibly CPU-optimized or possibly GPU-optimized computer.

A PMD may be controlled to create any of an exceedingly broad range of output light fields. Determining what data to use to drive the PMD to yield a specific desired output light field may be done in a number of ways. In a more-computationally expensive but more exact mode one can apply a mathematical model of the inverse transformation provided by the entire optical system (including the PMD) to start with the desired output light field and calculate the PMD pixel settings corresponding to the desired output light field. A less-computationally intensive but less exact mode includes setting parameters for one or more optical elements (lenses, prisms, etc) that can be emulated by the PMD to yield an output light pattern that approximates the target light pattern. The parameters may, for example, include sizes, locations and optical strength.

In one embodiment, the applied phase pattern on the PMD is determined so that given the particular optical layout of this imaging system and a matching model of this system, the light applied to it will result in an image on the display screen that very closely matches the desired light-field (the "target-image") provided by the content-device (for example from a TV network, a DVD, a Blu-Ray disk, or from a streaming internet source). Such a phase-pattern can be achieved by an iterative optimization approach, where the difference between the current solution and the target-image is iteratively minimized until a completion criterion is satisfied.

In another embodiment, the applied phase pattern on the PMD is determined so that the resulting light-field output from the PMD only partially matches the target-image or target light-field. As an example, an approximation of the target-image may be formed by summing up a number of similar or dissimilar features each described by a set of feature parameters. The features can for example be a set of Gaussian intensity profiles placed at different positions, with different amplitudes and different full-width half-maxima. This may result in a low-pass filtered or blurred version of the target-image, but may also be executed at reduced computational cost. In this embodiment, a "refinement-stage" may be required, and the output light-field of this system may be relayed onto for example a secondary amplitude modulating spatial light modulator or another PMD. The purpose of the refinement stage in this situation would be to restore the finer details of the target image or light-field.

In another embodiment, one could simulate basic physical-optics devices such as lenses and prisms on the PMD in order to scale and translate regions or parts of an image. Scaling of a particular input light intensity profile may be obtained by simulating a lens on the PMD. This lens may have a circular or a two-dimensional cylindrical symmetry. Translating a particular input light intensity profile may be achieved by simulating a prism on the PMD, for example by gradually varying the phase delay across the PMD. A lens may be described simply by its curvature, and a prism may be described by its tilt relative to the optical axis. The result of applying a uniform light distribution onto a lens is to focus, or de-focus it. If the display screen is not positioned exactly at the focal distance of said lens, a round shape of uniform light is created if the lens has circular symmetry, and a rectangle is created if the lens has a cylindrical shape.

In some embodiments, one might wish to simultaneously scale and translate a region of the image. This can be achieved by superimposing the simulated patterns for a lens and a prism.

Should the desired lens or prism require an amount of phase retardation that the PMD is unable to provide, then one could utilize a Fresnel approach where an integer multiple of $2\pi$ is subtracted from the desired value. For example, a phase retardation of "$7\pi$" can have the same effect on the light-steering capabilities of a PMD as can a phase retardation value of $5\pi$. The equivalent mathematical function may be the modulus; in this example modulus (5ji, $2\pi$)=$\pi$.

Ways to Determine Areas;

In one embodiment, the light redistribution scheme describes a method to determine how one or more regions of light entering a light redistributor could be mapped to other regions in the light exiting the light redistributor. As an example, the scheme may describe how the light incident on a 10×10 pixel region could be redirected to a 30×5 pixel region, possibly translated to another part of the image. In this particular example, the incident light used to be illuminating only 100 pixels (10×10), but after the mapping illuminates 150 pixels (30×5). Since the illuminated area in this example has been increased by 50%, the resulting intensity has been reduced by one-third. The light redistribution scheme may analyze the target-image in order to arrive at how a particular region is to be mapped.

In another embodiment, a number of equally sized regions gets mapped to the same number of regions, but these regions may all be of different sizes. Such an approach can be utilized to create a low-resolution version of the target image or light-field. The high-resolution parts of the image will now have to be restored in a downstream modulation or "refinement" stage, for example by an amplitude modulating SLM.

In some embodiments, the amount of scaling and shifting that gets applied to the equally sized regions of the image correlates in a direct or indirect way to the total intensity of light required by the target image or light-field in that region.

In other embodiments, the target image is analyzed and a number of differently sized regions are mapped to the same number of equally sized regions. The output of this approach may be incident on an array of integration rods matching the size and shape of each region.

In another embodiment, differently sized areas may be mapped to another set of differently sized areas.

In another embodiment, one number of regions may be mapped to a different number of regions.

In some embodiments, it may be desirable to ensure that neighbouring regions on the input side are still neighbours on the output side, so as to avoid gaps of illumination between two or more regions and therefore incorrectly reduce or increase the luminance or brightness in that gap between the two regions. As an example, if the light distribution scheme dictates that one region be translated away from its neighbouring region, then it should also dictate that the neighbouring region be translated along with it, either by pure translation, or by scaling, or by a combination of the two.

In an example embodiment, light incident on each of a plurality of areas on a PMD is scaled and/or translated by causing the area of the PMD to emulate a lens, a prism, or a combination thereof. The output light field is made up of the scaled/translated light.

Some embodiments may include optical switches that may be operated to selectively direct light from one area of the image or light-field to a different area or a number of different areas of the image or light-field. Such optical switches may augment a PMD or replace a PMD in some embodiments. For example, optical switches may be applied to selectively direct light from a light source into one of a plurality of integrating rods or optical fibers. The intensity of light being carried in the integrating rods or optical fibers may be adjusted by setting optical switches to change which integrating rods or optical fibers carry light from which light sources.

Another embodiment uses one or more scanning lasers to provide a desired light field. For example, a laser beam can be scanned rapidly across an area, leaving the viewer with the impression that the whole area is illuminated with equal intensity. If the laser beam is a spot, a 2-or-more axis scan may be performed. If the laser beam has the shape of a line, a 1-or more axis scan may be performed. The beam may be widened by using for example a motorized focusing lens. The power density or light intensity of various regions of the image can be controlled by varying one or more of for example the scanning speed, the size of the area to be scanned, or the density of the scanning pattern.

Application Classes: Display, Projection, Illumination

Several classes of applications may apply the approaches described herein. These application classes include, but are not limited to light projectors that utilize a projector and a screen to form an image on a projection screen, displays such as televisions and control monitors and general illumination devices such as smart lamps and lighting. All applications share, that it is desirable to efficiently illuminate an object or form an image. Some applications might be static, but others can dynamically change the light pattern formed.

Display

Displays can include a projector that is mounted fixed to a surface to be illuminated. The projector can be controlled in such as way as to form an image on the surface by illuminating a reflective or partially reflective surface from the front. It can also be controlled as to form an image by rear-projecting onto a transmissive or partially transmissive surface from the rear. Additional optics can be used to allow varying the distance and angle between the screen and the projector, for example folding mirrors may be used to fold the optical path and place the projector very close to the screen. Lenses may be used to magnify, focus and/or distort the image to match the properties of the projection screen such as dimensions, curvature and surface properties.

Display—TV

Example use cases of such a display include a system to replace televisions and other displays. For example, a light efficient illuminator may be mounted to a retractable or fixed screen using optics that allow very close placement of the projector and screen. The entire system may be mounted to a wall, like a TV. The light efficient illuminator may be mounted at the bottom relative to the screen or at the top relative to the screen. The screen maybe flexible, retractable or solid. It maybe incorporated into a building structure, such as a ceiling or a wall.

Display—Billboards

Billboard displays, digital and static signs and advertising displays are other example display systems that may apply the invention. An example of a billboard is a digital display used to display a sequence of advertising patterns on the shoulder of a highway. The viewing angle of such a display may be optimized in a way that all or most of the light is reflected in the direction of oncoming traffic and not in other directions. A system replacing or upgrading existing paper-based billboards to display digital content may be desirable.

Display—Flight Simulators

Another example of display systems that may apply this invention are flight simulators, used for on ground flight training of airplane pilots. In such an application it may be desirable to achieve efficient image formation on a flat or curved screen or display features that are in focus on a volume rather than on a plane.

Projection Systems:

Projection systems a may include a projector and a screen that are aligned so that the projector forms an image on the screen. The screen maybe flat, curved or of arbitrary shape. The screen may have certain reflectance properties, such as a lambertian reflectance profile or a somewhat directional reflectance profile. The screen might be transparent, or partially transparent. It may also be perforated to allow air and other media to pass through it.

Projection Systems: Cinema and Home Cinema

An example of a projection system that may apply this invention are cinema projectors in which a projector mounted above and behind the audience forms an image on a flat or curved large front projection screen. In such a system it might be desirable to achieve very high peak brightness levels (luminance) for some or all parts of the image. An example of a high peak brightness might be a level above 48 $cd/m^2$. Another example of a high peak brightness might be a level above 200 $cd/m^2$. Another example of a very high peak brightness might be 1000 to 10000 $cd/m^2$. Generally a high peak brightness is significantly brighter that the level that a viewer might be adapted to in the viewing environment. In such a system it might also be desirable to achieve high contrast levels (dark compared to bright features). It might be desirable to achieve such contrast levels either sequentially or simultaneously. In such a system it might also be desirable to achieve very pure colours.

An example of a system with similar requirements is a home theatre projector for use in a non-public space and for a smaller audience.

Projection Systems: Planetariums

Another example of a projection system that may apply this invention is a projector in a planetarium. A desirable property of such a system might be that it produces very small and very bright highlights, such as stars within an overall dark or dim scene (the night sky). Another desirable property of such a system might be that the black level is close to or identical to pure black, which means that no or little light is present in dark areas of the scene. Another property of such a system might be that the image is in focus on a non-flat surface, such as the dome inside a planetarium.

Projection Systems: Portable and Personal Projection (Military, Mobile, Etc.)

Another example of a projection system that may apply this invention are portable, mobile or personal projectors. One desirable property of such a system might be that it is small in size and/or light in weight. Another desirable property of such a system might be that it uses little power and/or is an efficient system. Another desirable property of such a system might be that it can be operated from a portable power source such as a battery pack or a fuel cell or another type of small generator. Another desirable property of such a system might be that it does not need a well controlled environment, for example that it can form clearly readable images in a bright environment such as in sun lights. Another desirable property of such as system is that it is easy to setup, which might include that the systems turns on near instantly, that is it in focus on non-flat surfaces or that it undistorts the image, even if no calibrated projection screen is present. Another example of such a system overlays information on physical objects, for example instructions and locations of parts in a machine that requires fixing.

Projection Systems: Head-Up Display

Another example of a projection system that may apply this invention is a head-up display, a display that presents additional information within the field of view of a user, for example on a windshield in a car or on the windows of an airplane. In such a system it is desirable to be able to form an image that is clearly viewable in many viewing environments. For example a desirable property of such a system might be that it is not too bright (blinding) when driving at night, but bright enough to be visible during sunlight. Another desirable property of such a system might be that it is in focus on a non-flat surface. Another desirable property of such a system might be that the image projected by it may be of high quality such that artifacts (e.g. raised black level) related to the image projection do not interfere with the field of view it is overlaying.

Projection Systems: Architectural Structured Illumination and Large Venue Shows

Another example of a projection system that may apply this invention is a projector that forms an image on a building or on a different structure as part of an artistic light show. Another example is the projection onto a stadium floor and/or ceiling. In such a system it might be desirable to be able to form very bright highlights, that are significantly brighter that the surrounding light levels and therefore stick out. It might also be desirable for the system to be very efficient to lower cost of the installation, setup time and cooling requirement. It might also be desirable for such a system to be able to dynamically focus parts of an image or light field onto different planes or objects within a volume.

Illumination and Lighting

Illumination and lighting systems that may apply this invention can be used in applications in which it is desirable to statically or dynamically illuminate objects and not illuminate other objects. In some applications it might be desirable to use an illumination system with the capability to illuminate an entire scene or only parts of a scene simultaneously. Another desirable property of such a system might be that the illumination system closely or approximately resembles the spectral reflectance properties of the objects that are to be illuminated. In some applications the scene to be illuminated may first be analyzed by a camera or other imaging device.

Illumination and Lighting: Automotive

An example of a system that may apply this invention is dynamic or smart automotive headlights. It might be desirable to illuminate an upcoming road sign and the road itself brightly, but at the same time not blind upcoming traffic. It might also be desirable to illuminate the road ahead efficiently. Such a system could work in concert with a camera that analyses the scene ahead and provides a target light profile to the illumination system. Another desirable property of such a system might be that the illumination system closely or approximately resembles the spectral reflectance properties of the objects that are to be illuminated.

Illumination and Lighting: Theater Lighting

Another example of an illumination system based on this invention is a theater spot light. Commonly such spotlights create a bright spot that can be manually or automatically moved to follow for example an actor on a theater stage. It might be desirable to replace such a system with an illumination system that can illuminate the entire stage and create local spot lights dynamically. A desirable property of such a system might be that it efficiently illuminates one or more objects within the scene. A common data projector is an example of a system that can illuminate a large scene, but is not very efficient when illuminating only a partial scene or object, because light is blocked in regions in which illumination is not required. A system based on this invention may present an efficient alternative. Another desirable property of such a system might be the ability to focus light on objects that are at different distances from the illumination system.

Some light sources, such as lasers light sources, can produce coherent light, which is a desirable property in some embodiments. However, depending on the brightness requirement of the final system output light field, one might require several independent light sources inside the light module or a different type of light source, such as an LED or a broadband lamp. This might result in a non-coherent light profile impinging on a dynamically-addressable light redistributor.

Figure 23:
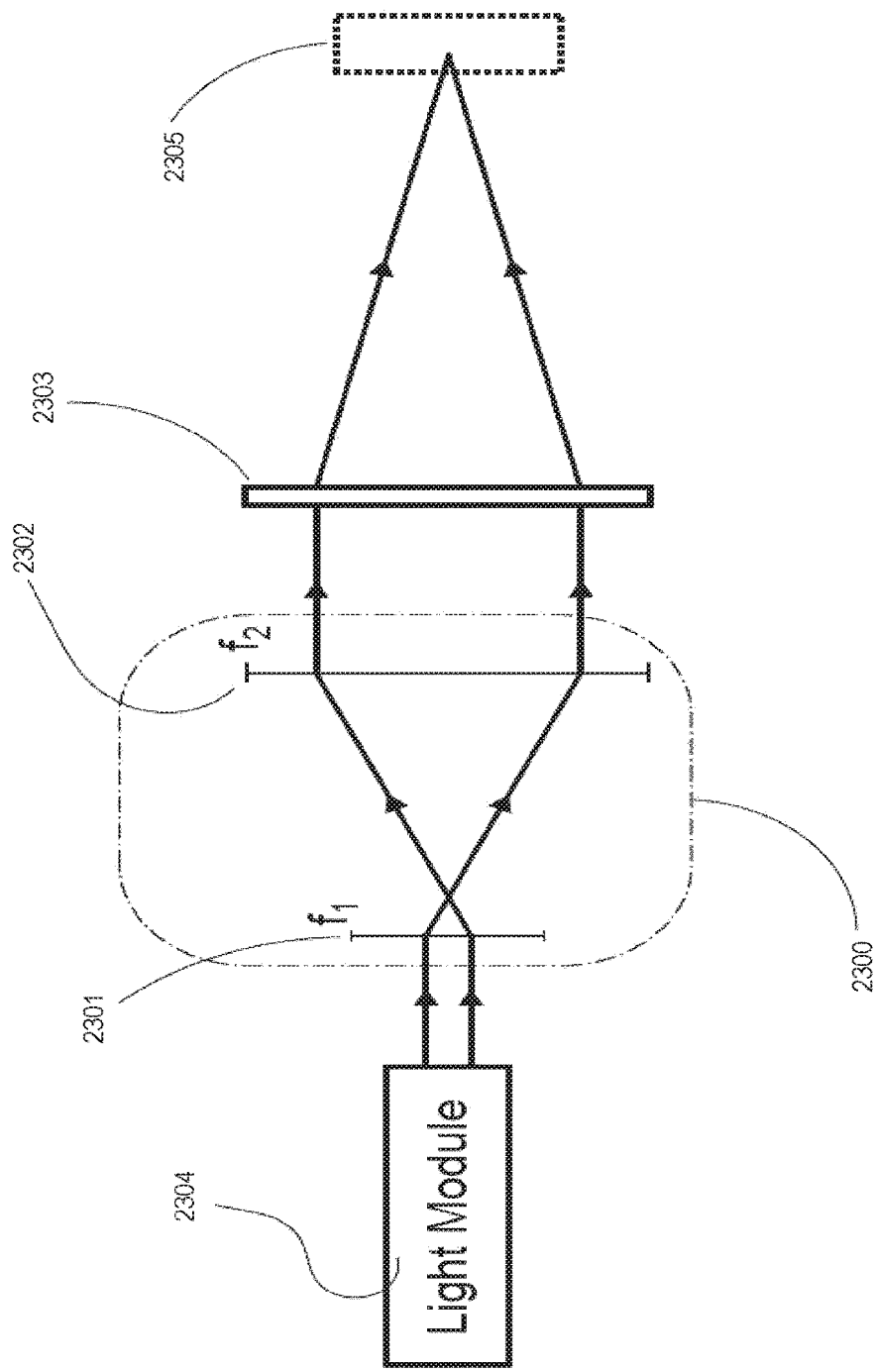
FIG. 23 illustrates example optics of a simple system that does not require (but is compatible with) coherent light.

FIG. 23 shows an example of a system that does not require coherent light. The output from light module 2304 is shaped and relayed onto a dynamically-addressable light redistributor 2303 using for example an optical module 2300 comprising for example two focusing lenses 2301 and 2302. The objective may be to form an image in the plane 2305, which might be a projection screen. Dynamically-addressable light redistributor 2303 may be configured, for example with a pre-determined phase pattern, to produce the desired light field at 2305.

In some embodiments an output light field may be required with higher uniformity than can be achieved with the available optics including the dynamically-addressable focusing element. In this case additional optics (such as integration rods, integrating chambers, optical fibres, etc.) may be provided to homogenize the intensity profile in one or more subsections of the light field. A coarse initial light field may be produced by the system (by an approach using coherent light or non-coherent light) and presented upon the input port of such additional optics.

Figure 24:
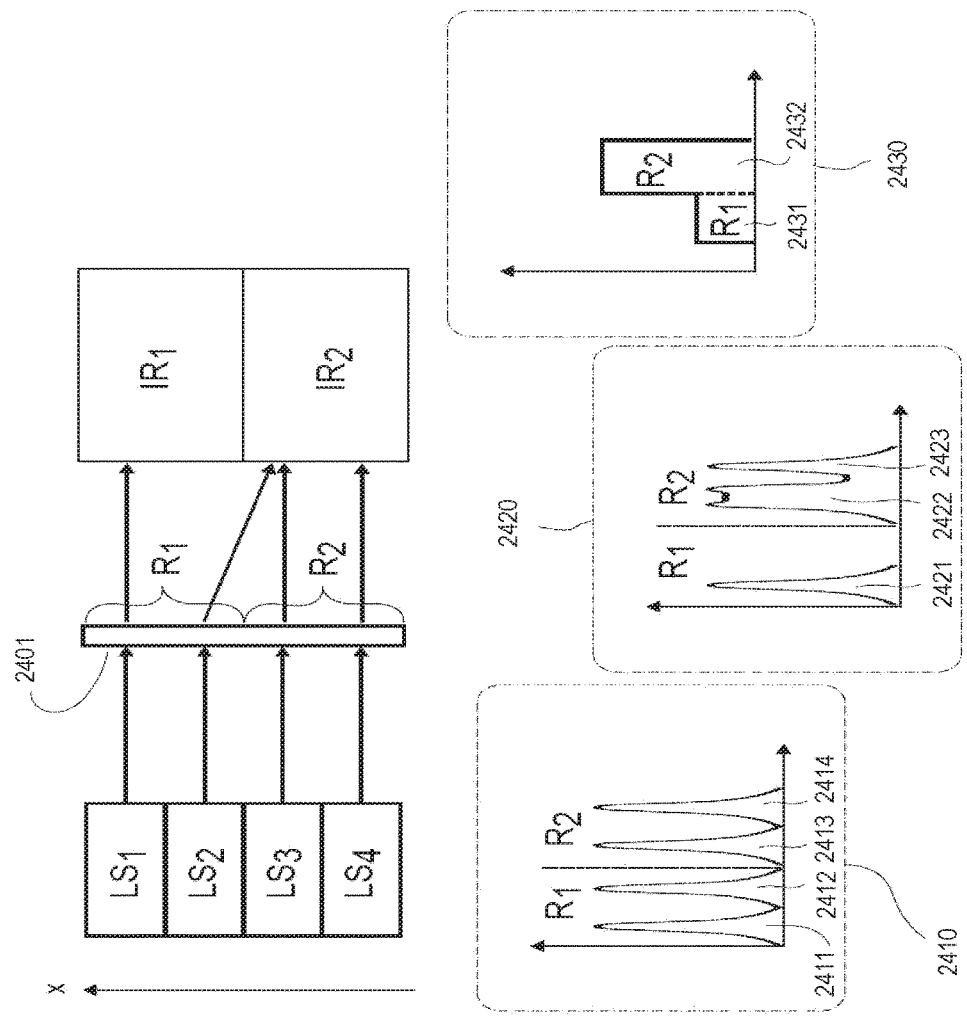
FIG. 24 illustrates example components of a system that re-distributes light and utilizes a clean-up stage (e.g. an array of integration rods) as well as showing example light profiles at each component.

FIG. 24 shows an example case in which a plurality of light sources are arranged to illuminate a dynamically-addressable focusing element 2401. The light re-distribution scheme driving the dynamically-addressable focusing element causes the dynamically-addressable focusing element to distribute an initial light field onto an array of integration rods. The output light field of the integration rod array is made up of uniform rectangular fields having intensities at least approximately equal to the total light present at the input port of each integration rod divided by the cross section area of the integrating rod.

For the sake of illustration dynamically-addressable focusing element 2401 has been sub-divided into two equally sized regions RI and R2. 2410, 2420 and 2430 illustrate example light profiles at various stages of this optical system. 2410 depicts light profiles 2411, 2412, 2413 and 2414 from LS1 to LS4. 2411 and 2412 are incident on RI, 2413 and 2414 are incident on R2. Region RI may be present on integration rod IRI and region R2 may be present on integration rod IR2. Dynamically-addressable focusing element 2401 re-distributes the incident light.

In this example the light from LS2 is re-distributed to integration rod IR2 along with the light from LS3 and LS4. The light from LS1 is present on integration rod IRI. 2420 depicts the light profile incident on IRI and IR2. 2421 is present on IRI and stems from LS1, 2422 is present on IR2 and stems from LS2 and LS3 and 2423 is present on IR2 and stems from LS4. 2430 shows the output light profile from the integration rod array, where 2431 shows the output from IRI and 2432 shows the output from IR2.

Figure 25:
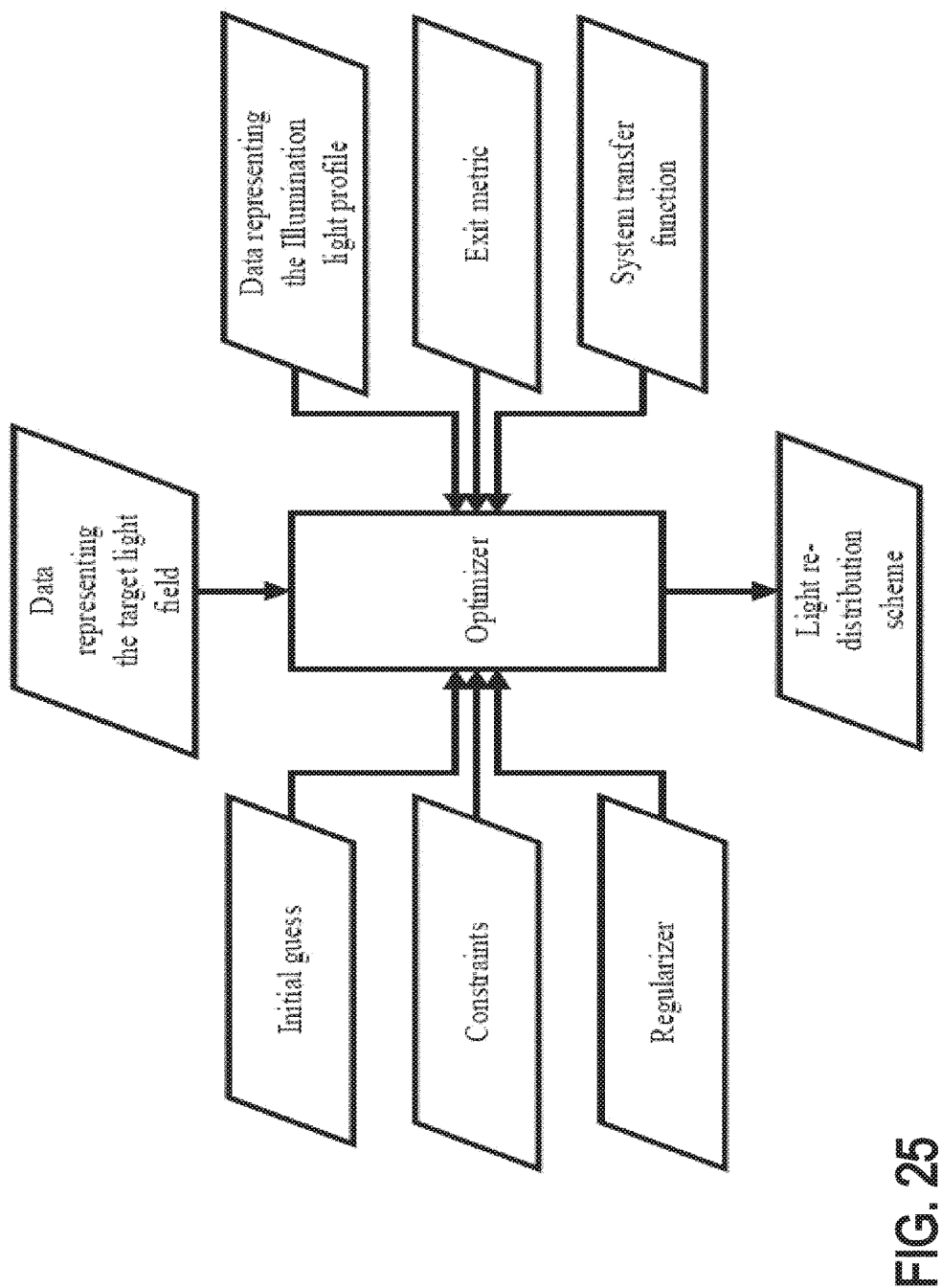
FIG. 25 is a block diagram illustrating operation of an optimization-based method for determining phase shifts to apply to different areas of a dynamically-addressable focusing element to create a target light field (or iterative program required to operate the system in 'exact mode').

FIG. 25 depicts an example framework of a program to be executed on the system processor. Its purpose is to compute a light re-distribution scheme (for example in form of a 2D array of phase retardation values) that, then be addressed onto the dynamically-addressable focusing element to, in combination with the input illumination profile and system optics cause an output light profile that closely matches the target light field.

FIG. 25 illustrates an iterative method to finding a solution using a minimization or optimization approach based on a forward model and its inverse. This example shows an iterative method "the optimizer" that finds a solution using a minimization or optimization approach based on a forward model and its inverse. An initial guess of the light re-distribution scheme as well as regularization terms may be utilized to converge towards a suitable solution in fewer iterations. System constraints may also be supplied. An exit metric, for example the maximum number of iterations, a residual, or a perceptual metric, determines when the program stops and outputs the current solution in form of a light re-distribution scheme.

In alternative embodiments a metric may determine when the current solution is ready to be applied to drive a PMD. After this occurs, the program may continue iterating to find a better solution. As better solutions are obtained they may be applied to drive the PMD. In an example embodiment, after a set number of iterations (e.g. 3, 4, 10, a few iterations) the current best phase pattern solution may be applied to the PMD while the computer/algorithm continues to calculate better solutions. After another few iterations a new (and better) solution may be available and can be addressed on the PMD. All this can happen within fractions of a frame of a video.

An example of a pair of a forward model and its inverse model is a two-dimensional Fourier transformation and a two-dimensional inverse Fourier transformation, which could be used as an approximate model for a coherent, collimated beam of light passing through a lens.

In another example, the forward model may describe the amount of deflection caused by a difference in phases or light path lengths of neighbouring regions on the PMD when illuminated by light, as well as the resulting intensity profile. Although an exact inverse system model may not exist, an iterative optimization approach may be used to solve for an approximate solution of the phase pattern to be addressed on the PMD.

Figure 26:
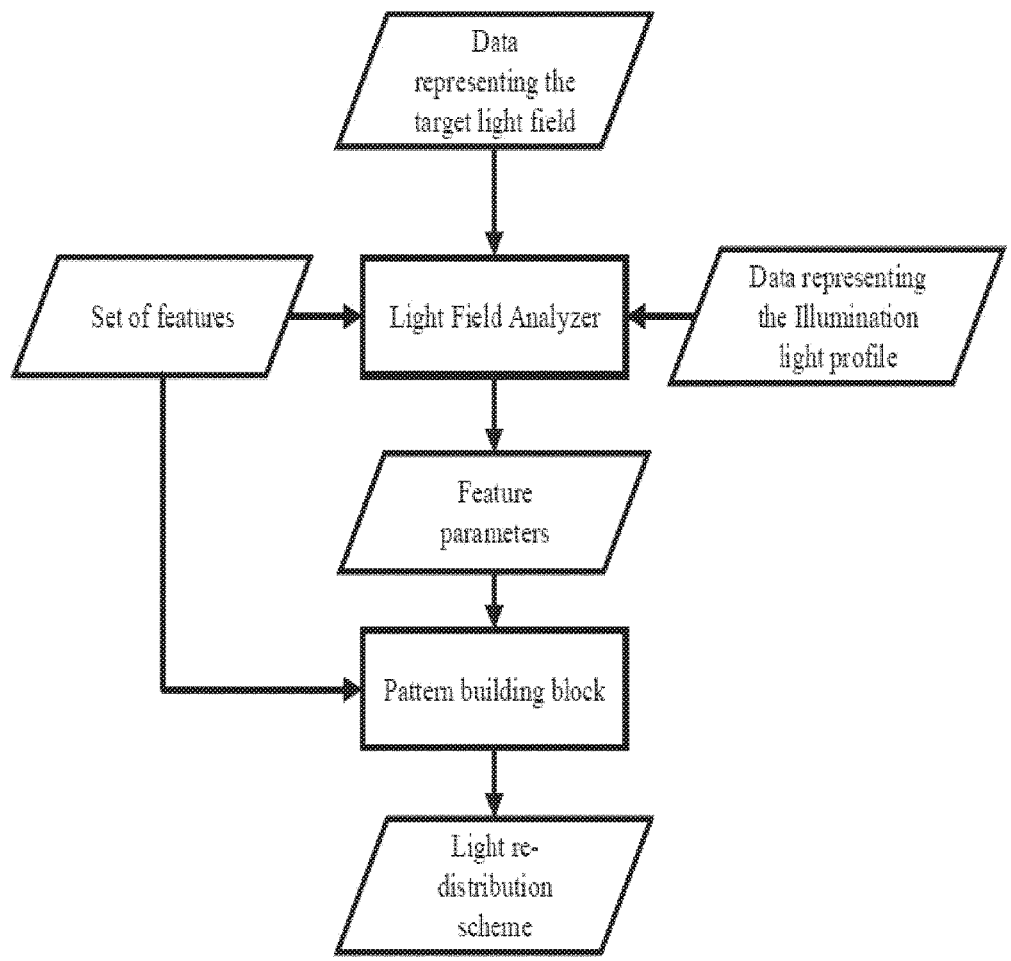
FIG. 26 is a block diagram illustrating a procedural method for creating an approximation to a target light field.

FIG. 26 depicts another example framework of a program that may be executed on the system processor. Its purpose is to compute a light re-distribution scheme (for example in the form of a 2D array of phase retardation values) that, when addressed onto the dynamically-addressable focusing element will, in combination with the input illumination profile and system optics cause an output light profile that closely matches the target light field or an output light field that may require further optical or other treatment to produce the desired target output light field.

The method of FIG. 26 creates an approximation of the full target light field using a number of component light fields that may be added together. Examples of such components may be rectangular shaped uniform light fields or Gaussian light fields.

This example shows a procedural approach (non-iterative) that has access to a set of features, such as virtual optical elements (described by for example their shapes, sizes and positions on a PMD and its resulting light field which can be either pre-computed or provided in functional form as well as description of parameters that may be varied by the program). Each such feature, when applied to the PMD results in a related output component light field. A light field analyzer compares such features, in particular the resulting output light fields to the target light fields and determines a set of feature parameters for a plurality of features. These are combined into a final light re-distributing scheme in the pattern building block.

As an example, one virtual optical element may produce a Gaussian intensity profile as its output. The peak-intensity and full-width half-maximum may be described directly when the virtual optical element is formed on the PMD. A superimposed set of such Gaussians may resemble the target light-field when relayed on a display screen.

Figure 27:
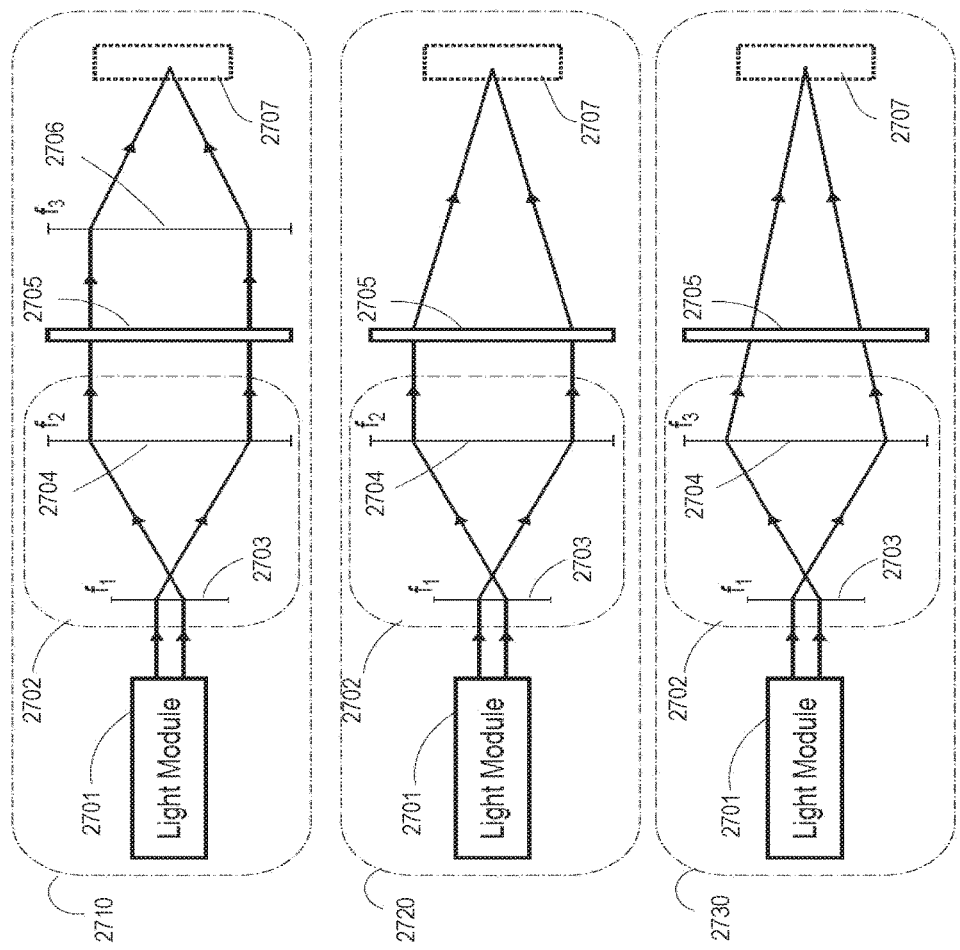
FIG. 27 shows three examples of an optical setup for use with coherent light.

FIG. 27 shows three examples of optics and the light field that may be used where coherent light is present on the dynamically-addressable focusing element and a system transfer function (forward model), such as can be described by a two dimensional Fourier transformation is desired. Example a) uses coherent and collimated light present on the dynamically-addressable focusing element followed by a field lens to focus light. Example b) achieves a similar result, however the field lens is represented as a path length varying pattern that can be superimposed with the desired light redistribution scheme. Example c) provides similar results, utilizing a slightly converging beam.

Common for all three implementations is that coherent or partially coherent light from a light module 2701 is expanded using expansion and beam shaping optics 1102 and the light is incident on the PMD 2705. 2702 may comprise two or more focusing elements 1103 and 1104. In 1110, the light incident on 2705 is collimated. The output light from 1105 is focused by focusing lens 2706 onto 2707 in the case when 2705 does not change phase or changes phase uniformly across the device.

In 2720, the light incident on 2705 is collimated. The output light from 2705 is focused onto 2707 in the case when the phase retardation pattern on 2705 resembles a lens or an approximation thereof.

In 2730, the light incident on 2705 is not collimated, but converging to focus at 2707 in the case when 2705 does not change phase or changes phase uniformly across the device.

In all three implementations, 2705 is configured in such a way as to produce an approximation of a desired target light field at 2707, for example at a projection screen.

Figure 28:
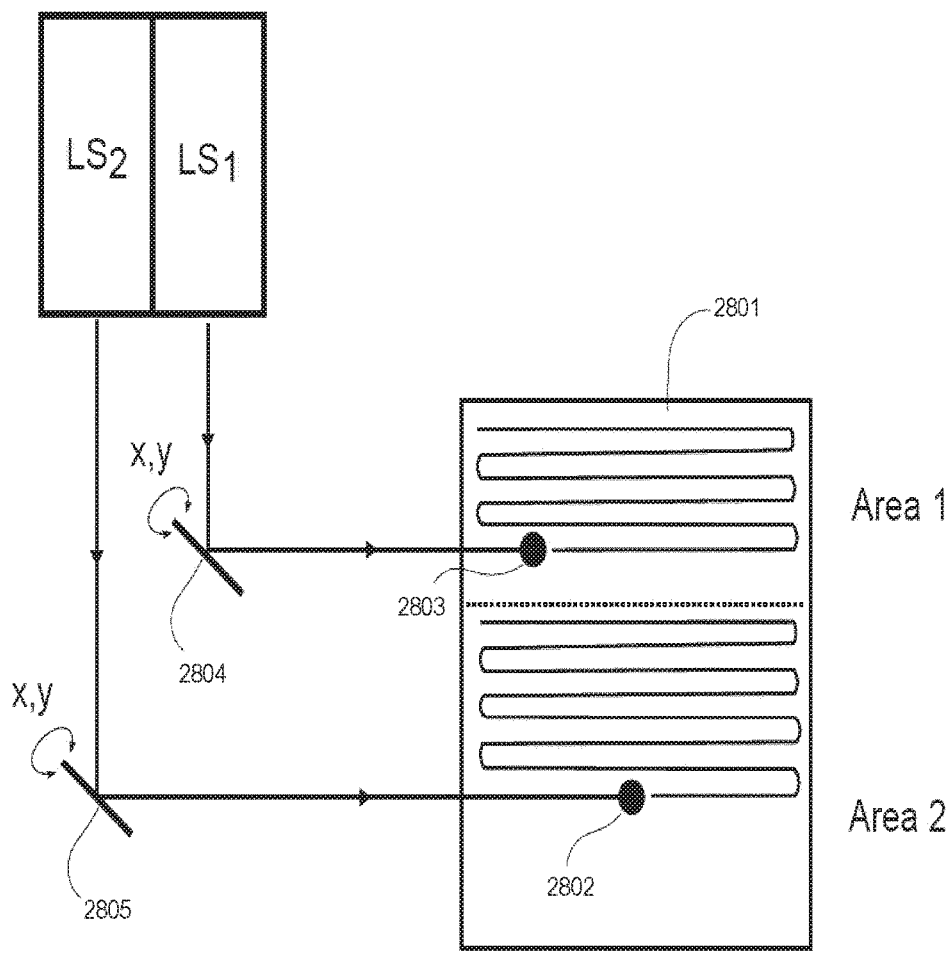
FIG. 28 shows example optics for a variable laser scanning approach.

FIG. 28 shows an example of variable scanning optics in which two laser beams or other light beams collectively scan an area. This scheme may be expended to any suitable number of light beams. Each light beam scans a region within the area. By altering the sizes of the scanned regions the luminance within each region may be varied. The dimensions of the scanned regions may be changed, for example, the scanned regions may be rectangular and the lengths and widths of the scanned regions may be changed, thereby altering the areas of the scanned regions. The scanning speed and pattern may remain fixed as the size and/or shape of a scanned region is changed or may be altered. For example, scanning speed may be reduced when the scanned region is smaller and increased when the scanned region is larger.

In the example implementation illustrated in FIG. 28 a plurality of light sources such as lasers LS1 and LS2 are used in conjunction with for example steerable MEMS mirrors that allow the beams to be scanned across different areas. In this example LS1 illuminates Area 1 and LS2 illuminates Area 2. Together, LS1 and LS2 illuminate the entire imaging area 1201.

LS1 provides a beam of light incident on a two-axis scanning mirror 1204 that scans the beam 2803 over Area 1. LS2 provides a beam of light incident on a two-axis scanning mirror 2805 that scans the beam 2802 over Area 2. The beams 2803 and 2802 may be scanned over the respective areas in a line-by-line fashion or any other desired path. In this example Area 1 is of a different size than Area 2. Therefore the scanning speed of 2802 maybe increased order to scan over Area 2 in the same time required for 2803 to scan Area 1. Provided that LS1 and LS2 are of same or similar intensities, the resulting average intensity of Area 1 may be higher than that of Area 2. Other scanning patterns, scan speeds, pattern densities, light source modulation or intensities may be utilized to achieve a similar effect.

In some embodiments, an image data processor divides the image into equal area sections, each section being illuminated by one light source each with a modulated amplitude according the requirements of the individual areas.

In some embodiments, the illumination comes in the form of a uniform field that covers its whole subsection. In some embodiments, the image sections comprise differently sized areas of equal light energy of one or more of the present frequencies in the image (colours), so that each sub-section and frequency may reach different peak amplitudes.

In some embodiments, the illumination comes in the form of a spot light source which is scanned across its subsection of the screen, for example using a laser and a mirror mounted on a rotational 2-axis mirror.

In some embodiments, the illumination comes in the form of a line light source which is scanned across its subsection of the screen, for example using a laser and a mirrors mounted on a rotational 1-axis mirror.

In some embodiments, each image subsection is illuminated with a sequence of random illumination patterns, each generated by an image data processor that ensures that the resulting image is in accordance with the input image data.

In some embodiments, the projection system comprises differently sized areas of equal light energy of one or more of the present frequencies in the image (colours). Each subsection goes through spatial light amplitude modulation, for example by an SLM.

In some embodiments, the projection system comprises differently sized areas of equal light energy of one or more of the present frequencies in the image (colours). Within each subsection, the scanning is done at variable speed, but with a constant intensity, so that the perceived subsection varies in intensity. A controller may be configured to ensure that each subsection while scanned at variable speeds within each subsection still completes to total subsections in the same amount of time.

In some embodiments the required scanning speed is high and instead of a motorized mirror, diffractive dynamic elements such as acousto-optical modulator or acousto-optical deflectors are applied to scan the light used.

Figure 29:
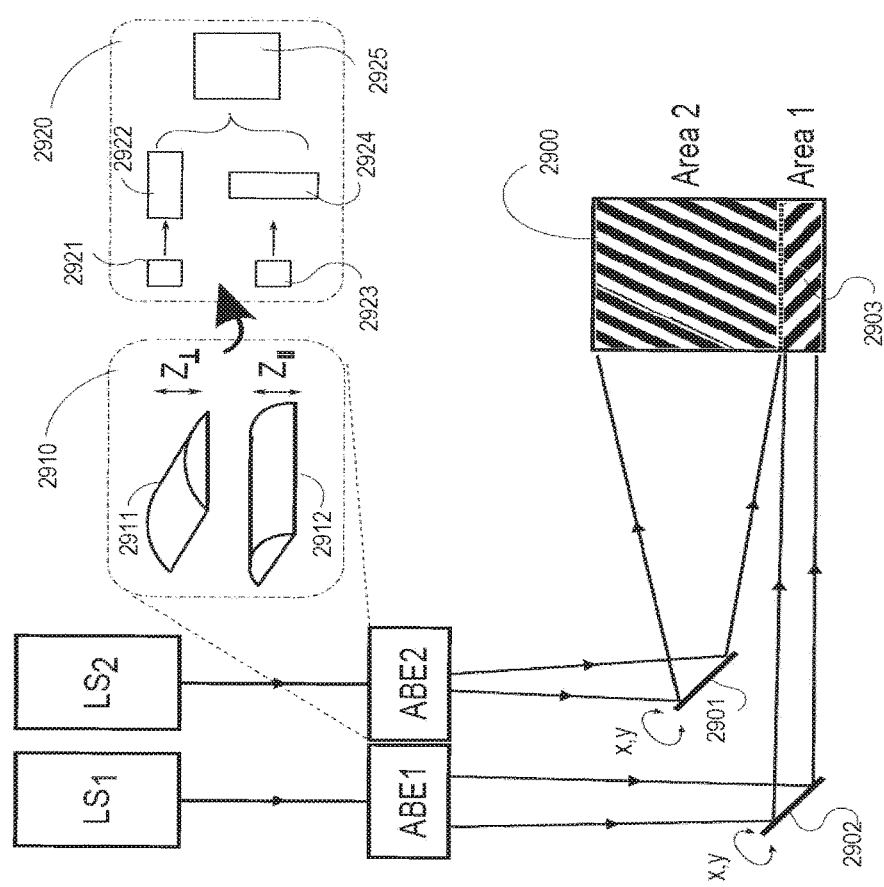
FIG. 29 shows example optics of another variable laser scanning approach (with dynamically focusable lenses or other optics).

FIG. 29 shows example variable laser scanning optics which is an alternative to the implementation depicted in FIG. 12. In FIG. 13, each light source is relayed onto a respective area not as a scanning beam, but as a complete field expanded using beam shaping and expansion optics.

Beam LS1 is shaped and expanded using the asymmetric beam expander ABE1 The expanded light profile is then steered using a two-axis scanning mirror 1302 onto Area 1 of the image. Similarly, LS2 is shaped and expanded using the asymmetric beam expander ABE2. The expanded light profile is then steered using a two-axis scanning mirror 1301 onto Area 2 of the image.

Asymmetric beam expander ABE2 is explained in 2910 and 2920. 2910 shows how the incident beam is expanded by different amounts in two perpendicular directions using the cylindrical lenses 2911 and 2912. In its default configuration, the input beam profile which may be in the form of a focused spot, will result in the output light profile being a square and uniform intensity beam. If a rectangular shape is required, one or both of the cylindrical lenses 2911 or 2912 may be moved by for example a motor along the optical axis of this system. Moving 2911 will change the square shape 2921 into shape 2922. Likewise, moving 2912 will change the square shape 2923 into shape 2924. If both lenses 2911 and 2912 are moved, the output light profile may be as depicted in 2925. In addition to shaping the individual beams, the output light profiles from ABE1 and ABE2 may be steered by 2901 and 2902 so that their combined illumination from 2900 and 2903 fills the complete image.

Figure 30:
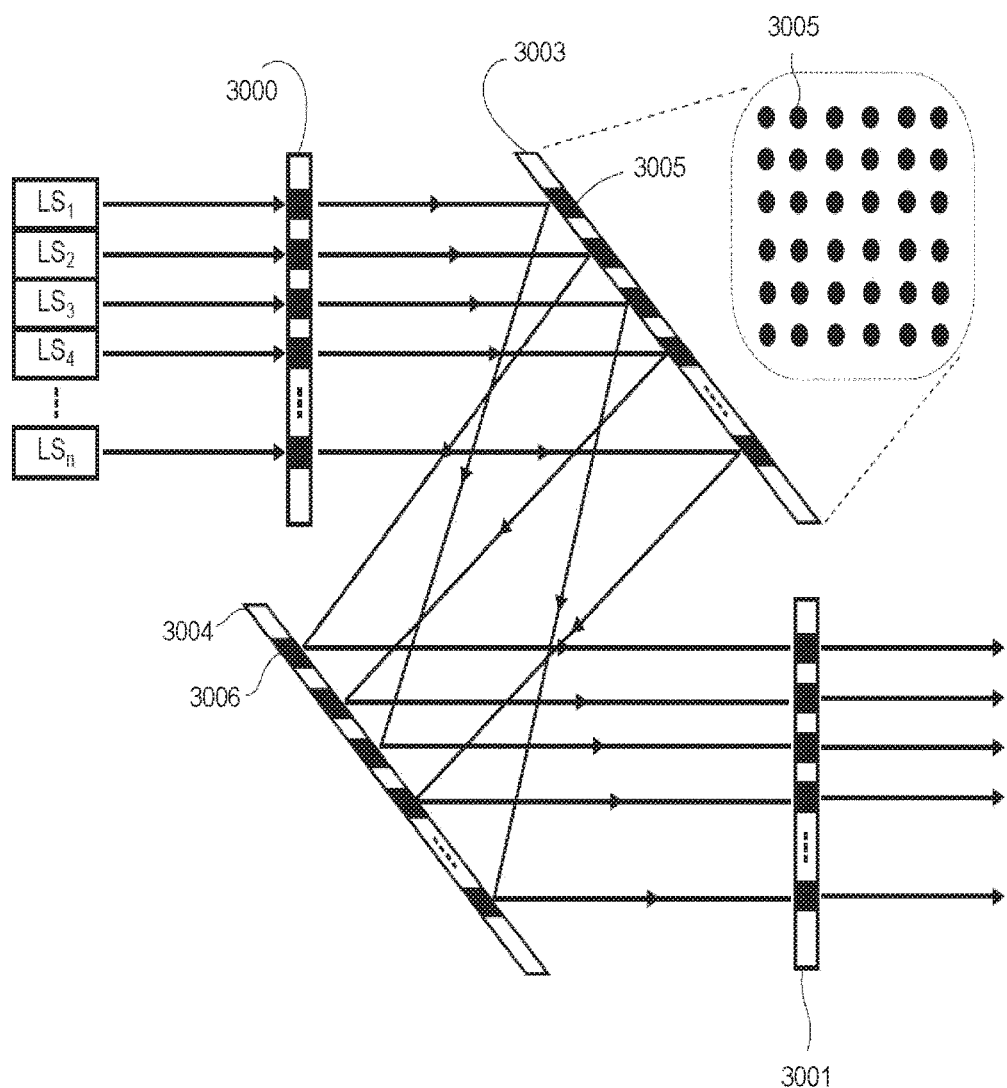
FIG. 30 is an example of an optical switch using MEMS (micro electromechanical systems).

FIG. 30 shows an example application of optical switches to remove light from a first area and direct that light to a second area. The first area becomes dimmer and the second area becomes brighter as a result.

In FIG. 30, a plurality of light sources LS1 to LSn provide input beams onto an array of input ports 3000, for example via optical fibres. The light from each input port is present on device 3003 comprising one or more elements such as 3005 that steers the light. 3005 could for example be a two-axis controllable mirror. This light can furthermore be relayed off a secondary device 3004 comprising one or more elements such as 3006 that steers the light towards an output array of output ports. In one embodiment, the input light beams provided by the light sources are collimated and remain collimated at the output port 3001.

Figure 31:
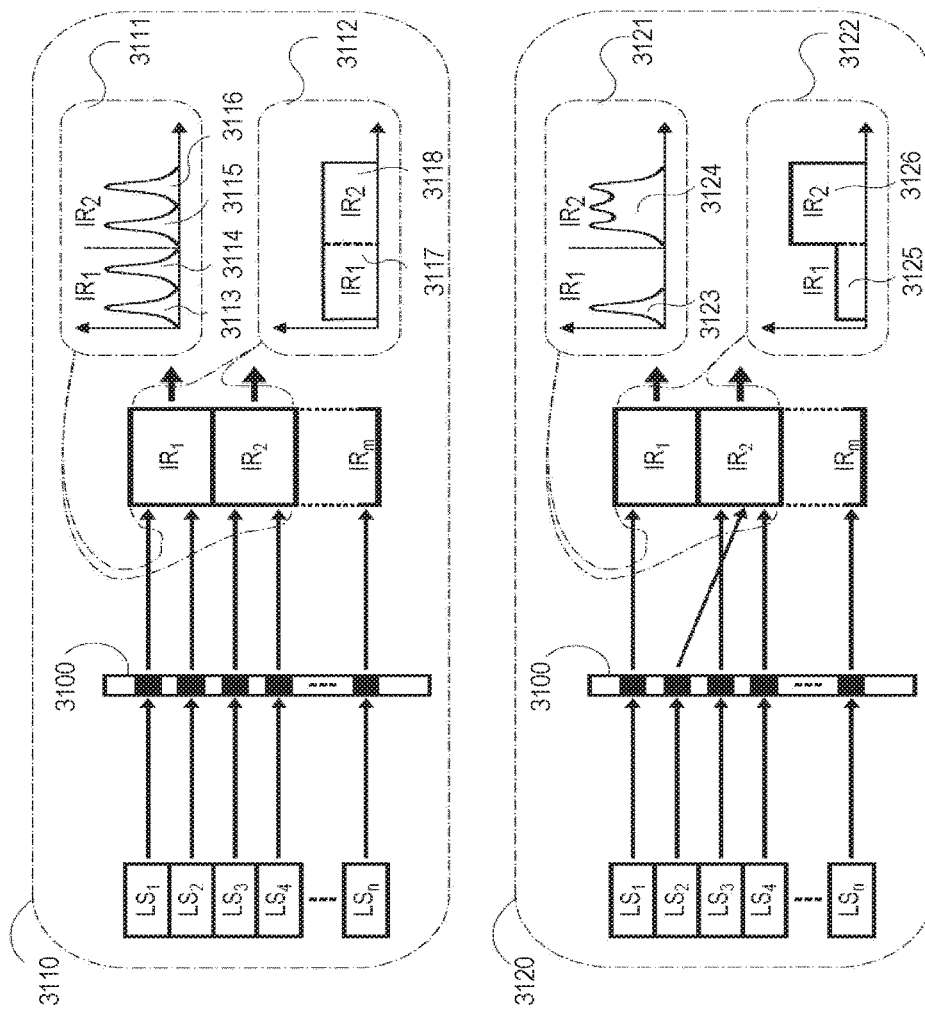
FIG. 31 is an example of how an optical switch or other light re-distributor can be used in concert with a clean-up module (e.g. an array of integrating rods).

FIG. 31 depicts an implementation of a light-efficient illuminator using optical switches and a clean-up module such as an array of integrating rods IR1, . . . , IRn 3110, a plurality of light sources LS1 to LSn provide input beams onto an array of input ports 3100, for example via optical fibres. These beams are further directed onto a clean-up module, for example an array of integration rods IRI to IRn. In this example, LS1 and LS2 are incident on IR1, LS3 and LS4 are incident on IR2 and so forth. 3111 shows the incident light profile on IR1 and IR2. 3113 is the light stemming from LS1. 3114 is the light stemming from LS2. 3115 is the light stemming from LS3. 3115 is the light stemming from LS4. The remaining integrating rods in this system can be described in a similar matter. 3112 shows the output light profile from integration rods IR1 and IR2, and illustrates how the non-uniform input profiles have been made uniform. The average intensity of 1517 is approximately that of the average intensity of 3113 and 3114 combined or integrated. The average intensity of 1518 is approximately that of the average intensity of 3115 and 3116 combined or integrated.

In 3120 shows the same system with steering. In this example, LS2 is steered away from IR1 and into IR2, thereby reducing the intensity output from IR1 and increasing that of IR2. 3121 shows the input light profiles onto IR1 and IR2. 3123 shows the input light profile from LS1 onto IR1. 3124 shows the combined light input from LS2, LS3 and LS4 onto IR2.

3122 shows the output light profile from integration rods IR1 and IR2. The average intensity of 3125 is approximately that of the average intensity of 3123. The average intensity of 3126 is approximately that of the average intensity of 3124 combined or integrated.

Figure 32:
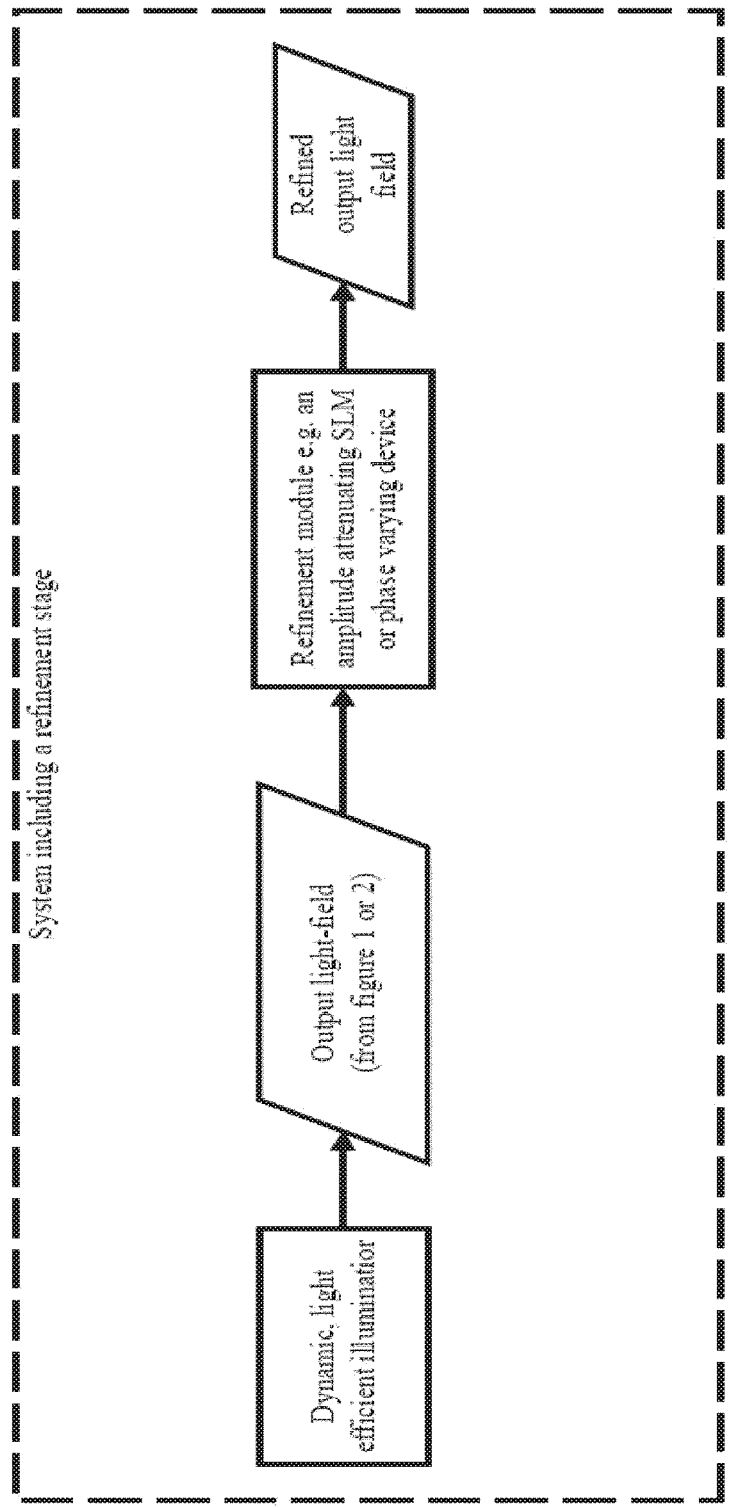
FIG. 32 is a block diagram of a system including a refinement module (e.g. a light efficient illuminator in combination with a spatial light modulator (SLM).

FIG. 32 illustrates an embodiment which applies a refinement module (for example a DMD) to fine tune a light field.

The output light field of a device as described herein may be used as a controllable light source to illuminate a refinement stage which may include an imaging device, like a DMD, an LCD, or an LCoS. The imaging device may comprise an amplitude modulating SLM, a PMD, a diffusive device, like a DMD, an LCD, or an LCoS. Refinement may provide a refined output that may improve the quality of the output light-field of the complete system. The refinement module may comprise a de-speckling module, a polarization-varying device, a colour-enhancing device etc.

The refined output light-field may be imaged or relayed onto a projection screen or the like in the usual manner. As shown in FIG. 32, a light-efficient illuminator may be combined with one or several refinement modules which may be arranged in serial and/or parallel configurations.

For example, the refinement module may provide high spatial frequency detail to the final light-field that can now be imaged or relayed onto a projection screen or the like on top of the output light-field from the light efficient illuminator.

Another use of the refinement module is to minimize visual artifacts introduced by the light efficient illuminator. In some implementations, these improvements may be executed in accordance with analysis of the light efficient illuminator output as well as models of the human visual system such as colour appearance models, visual difference predictors or other models.

In a preferred embodiment, the dynamic light efficient illuminator provides a first low quality version of the target light field, for example low spatial resolution colour image, as input to the refinement module. The refinement module may comprise a single spatial amplitude modulator of high spatial resolution relative to the colour image and provide luminance modulation only. The combined output may be different from the target light field in an absolute sense, but perceptually comparable.

Figure 33:
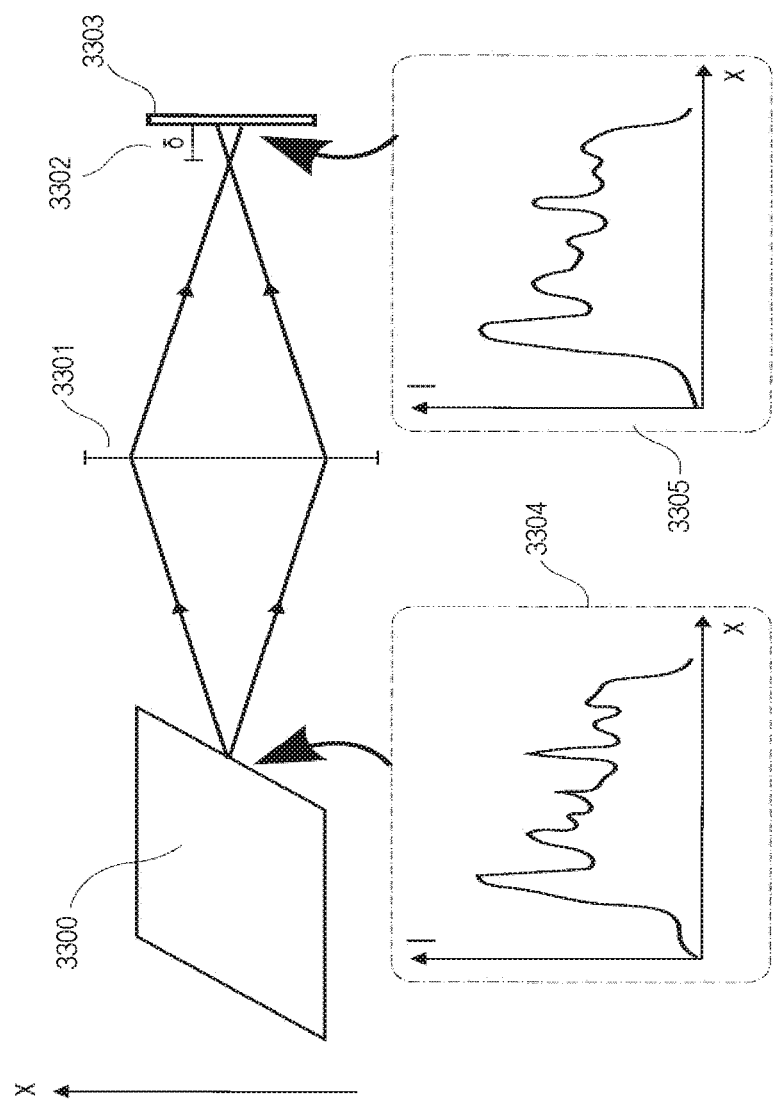
FIG. 33 shows example optics of a system including a refinement module. It also depicts example light profiles at the output of the light efficient illuminator and at the input of the imaging device (e.g. SLM).

FIG. 33 depicts an example optical implementation as well as light profiles present at various stages of a light efficient illuminator with a refinement module. The output light field 3300 from the light efficient illuminator is relayed onto the refinement module 3303 via for example a relay lens system 3301. 3304 shows an example output light profile produced by the light efficient illuminator. 3305 shows an example light profile incident on the refinement module 3303. In some embodiments it may be preferable not to focus the output of 3300 exactly onto 3303, but instead blur or spatially low-pass filter 3304 by moving 3303 by an amount 3302.

Figure 34:
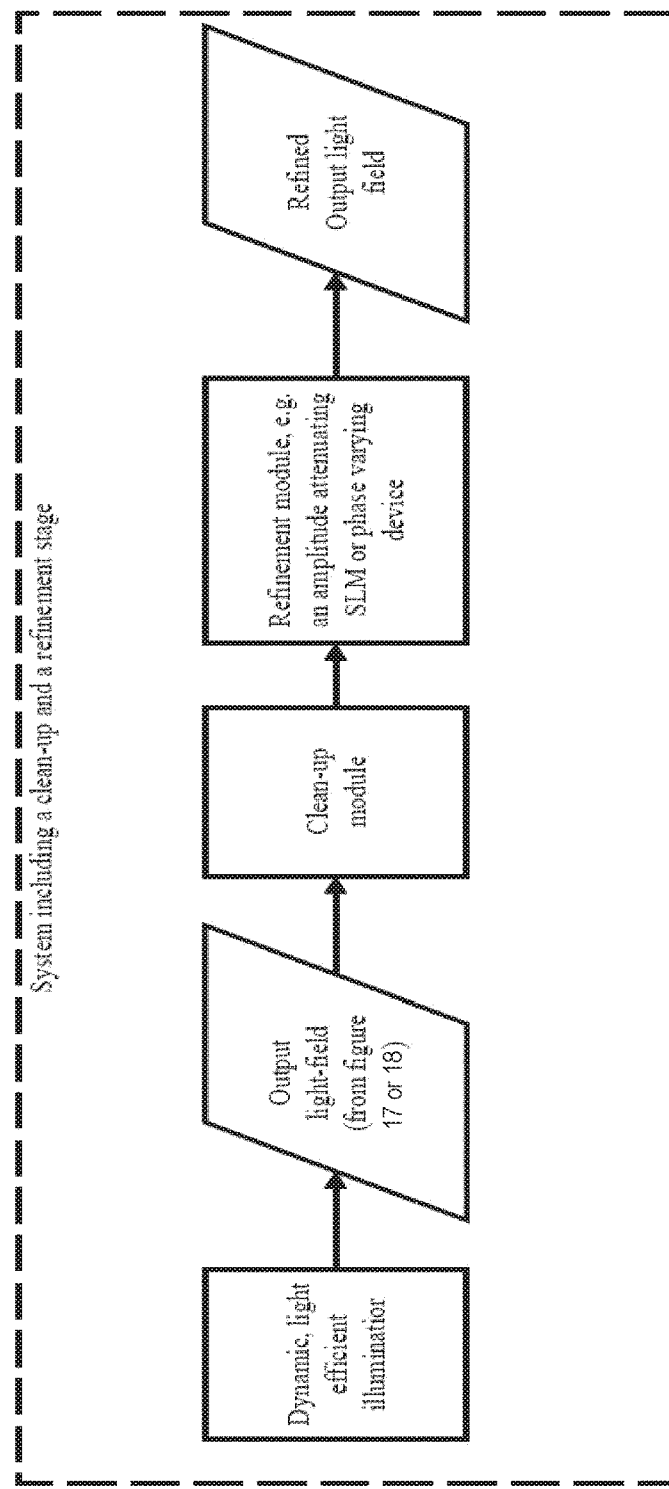
FIG. 34 is a block diagram of an illumination system including a clean-up stage and a refinement stage.

FIG. 34: illustrates an embodiment comprising a refinement module (for example a DMD) and a clean-up module (for example an integration rod array).

Certain applications may require that the output light field be of high fidelity, uniformity, or predictability. In some cases an output light field may include undesirable sharp spikes or other optical noise not specified for the target light field. One could reduce these issues by providing an array of homogenizing elements such as an array of independent integrating rods or a bundle of fibers or a number of optical waveguides between the illuminator and the refinement module. The spatially-varying output light-field is then reduced to a number of known intensity profile regions matching the number of homogenizing elements (e.g. fibers or integrating rods) used. The benefits of steering light into a number of integrating rods, fibres or regions may include enhanced contrast, improved black-levels, higher peak-intensities, and/or improved predictability of the output light profile. Additionally, as light that would otherwise pass through one homogenizing element can be redirected into another homogenizing element, the resulting peak luminance can in the best case be increased by approximately the number of regions (e.g. all or most of the light could be directed into one of the homogenizing elements). By contrast, in a system that does not redirect light but merely attenuates light to achieve desired luminance levels, the peak luminance is limited to the global luminance level that the system's light module can provide.

Figure 35:
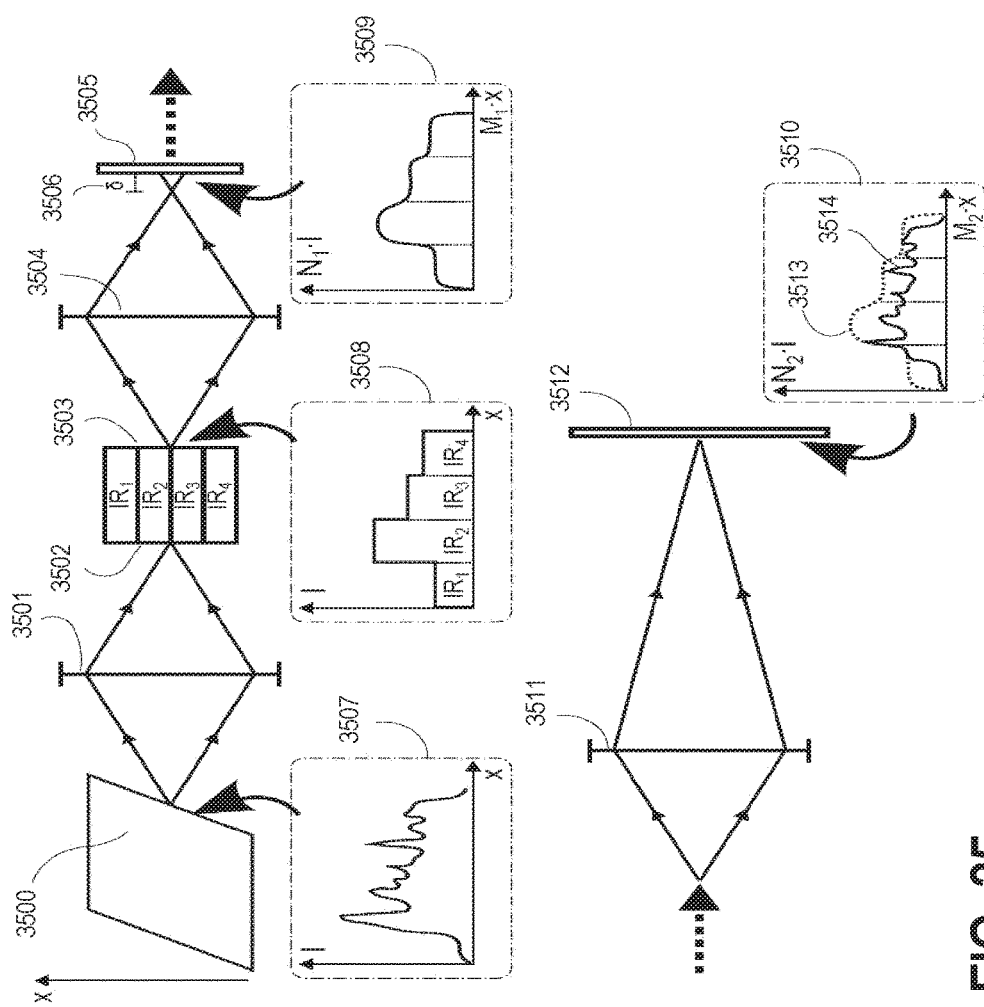
FIG. 35 shows example optics of a system including a clean-up stage and a refinement stage. It also depicts example light profiles at each stage.

FIG. 35 depicts an example implementation of a light-efficient illuminator combined with a clean-up module and a refinement module. The output of the light-efficient illuminator 3500 is relayed using for example a lens 3501 onto an array of integration rods 3502, IR1, IR2, IR3 and IR4. The output 3503 of the array of integration rods is further relayed onto 3505 using for example a lens 3504. 3505 represents the refinement module, for example in the form of an amplitude-modulating SLM. The output of 3505 is relayed onto for example a projection screen 3512 using for example a lens 3511. An example output light-field from 3500 is depicted in 3507. The light profile incident on 3505 may be blurred using a small offset 3506, turning the light profile 3508 at 3503 into 3509 at 3505. 3510 shows the final output light-field from the complete system, where 3513 represents a relayed version of 3509 modulated to 3514 by 3512.

Projection systems as described herein may comprise multiple stages of modulation. One or more stages may modulate phase of the light, and/or one or more other stages modulate the light's amplitude, and/or one or more other stages modulate the light's frequency, and/or one or more other stages modulate the light's polarization. For example, one projection system could have two spatial amplitude modulators, and one spatial phase modulator.

Such stages may be arranged to process light in a serial or parallel fashion, or a mix thereof. In the parallel case, different light fields can be combined by a beam-splitter or beam-combiner, for example a dichroic mirror in order to combine light of different frequencies, or a polarizing beam-splitter in order to combine light with different polarizations. For the serial case, the output of one stage is used as the input for the next stage. For example, one system can use a frequency modulator in parallel with a phase modulator, both of which are placed in series with a spatial amplitude modulator. The two parallel stages can be combined by a beam-combiner before they are relayed onto the spatial amplitude modulator which is placed in series with the parallel stage.

Figure 36:
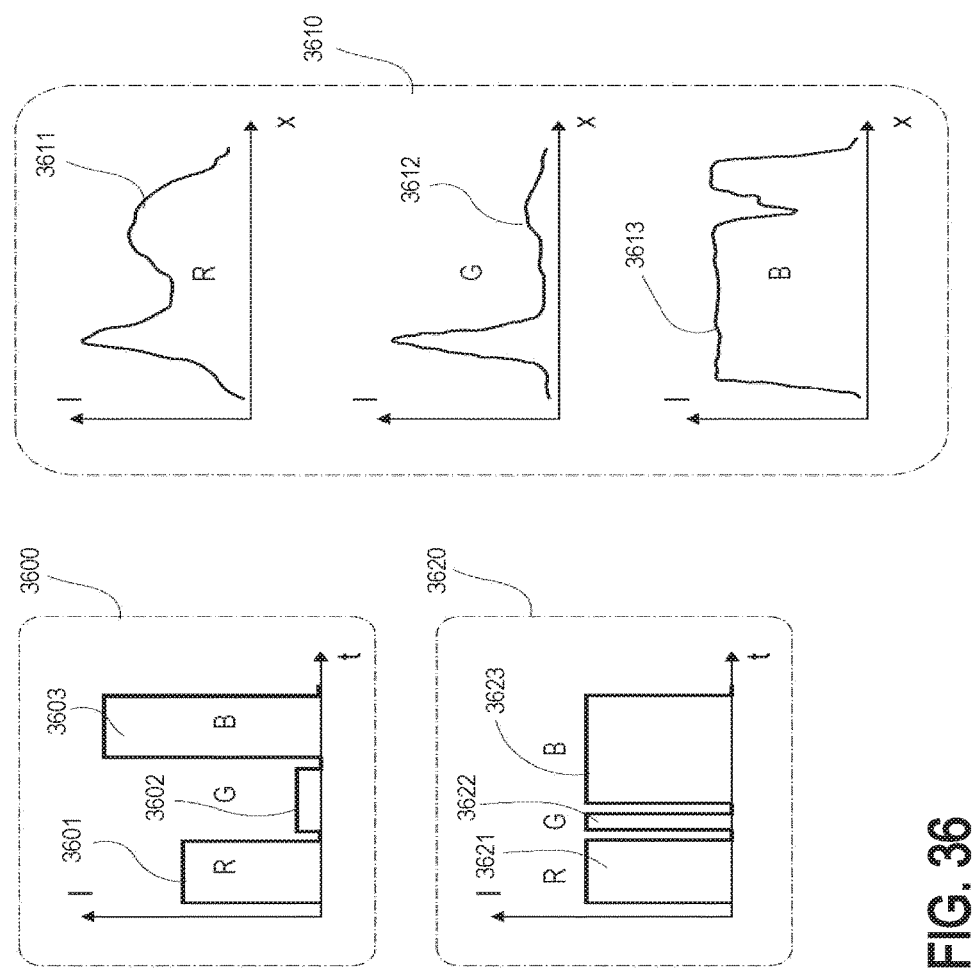
FIG. 36 shows intensity-time and intensity-location plots of a time-multiplexed or color field sequential system. Two example methods use two different timing schemes.

FIG. 36 shows intensity-time and intensity-location plots in a system employing a color field sequential scheme. 3610 indicates an example of a desired spatial cross-sectional light profile in a three-primary light-efficient illuminator made up from a red (3611), a green (3612) and a blue (3613) channel. Since the light-efficient illuminator achieves its target light profile by re-distributing light rather than exclusively amplitude-modulating light (by attenuation), the total amount of light required by each light source is proportional to the integrated light of each colour channel light profile, 3611, 3612, and 3613 respectively for R, G, and B. In this particular example, one can inspect the light profiles 3611, 3612 and 3613 and deduce that a lesser amount of green light is required, an intermediate amount of red light is required, and a largest amount of blue light is required.

The total amount of light for each color within one video frame in a color field sequential drive scheme can either be modulated at the source by reducing the intensity of individual light sources over a fixed period of time as depicted in 3600, or by a fixed intensity over varying amounts of time as depicted in 3620 or by a combination of these two schemes, not depicted here. In 3600 the intensity modulating approach is depicted for red by 3601, green by 3602 and blue by 3603. In 3620 the time modulating approach is depicted for red by 3621, green by 3622 and blue by 3623.

Interpretation of Terms

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, video projectors, displays (such as televisions), digital cinema projectors, media players, and other devices suitable for the purposes described herein.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

Hybrid GS-Based Imaging:

In an example embodiment, an adaptation of the Gerchberg-Saxton algorithm is used to generate a pattern on a PMD to produce an image in the far field. The Gerchberg-Saxton algorithm is an iterative approach to retrieving the phase of a pair of light fields. Given some target illumination profile, and a well-characterized input light profile, an iterative approach can be used to converge on a phase pattern that, when applied to the PMD, will approximate the target profile in the far field.

Figure 14A:
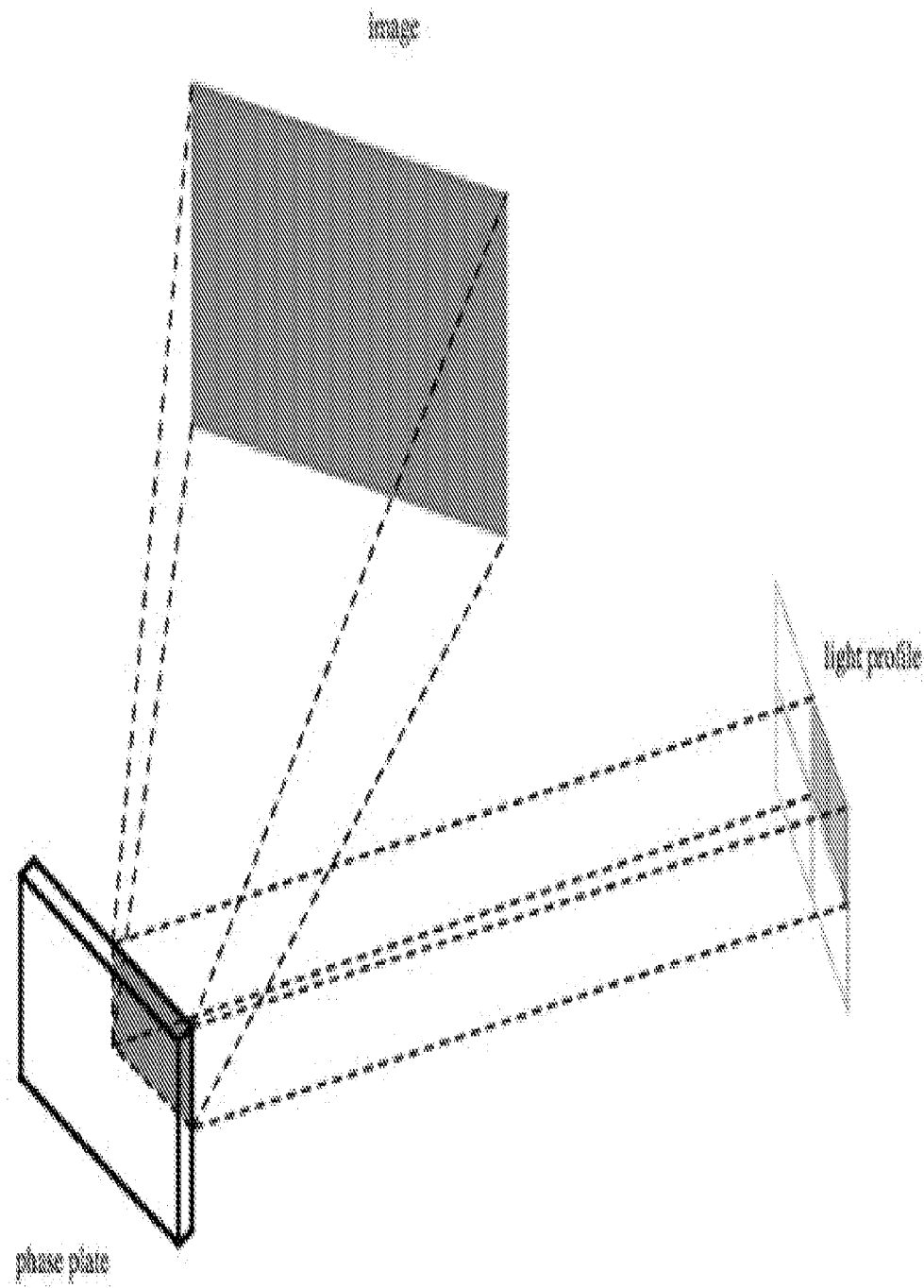
FIGS. 14A and 14B schematically illustrate different possible modes for controlling a dynamically-addressable focusing element to display an image.

An array of parallel beams is relayed onto an active area of the PMD, each covering a segment of the active area, and supplying light to form a sub-image in the far-field. This is illustrated in FIG. 14A. Misalignment caused by imperfect parallelism of the light beams may be corrected by superimposing a prism on the modulation pattern applied to a corresponding area of the PMD to shift a sub-image corresponding to that area into alignment so that each sub-image is overlaid correctly at the image location.

Segmented Approach

Figure 14B:
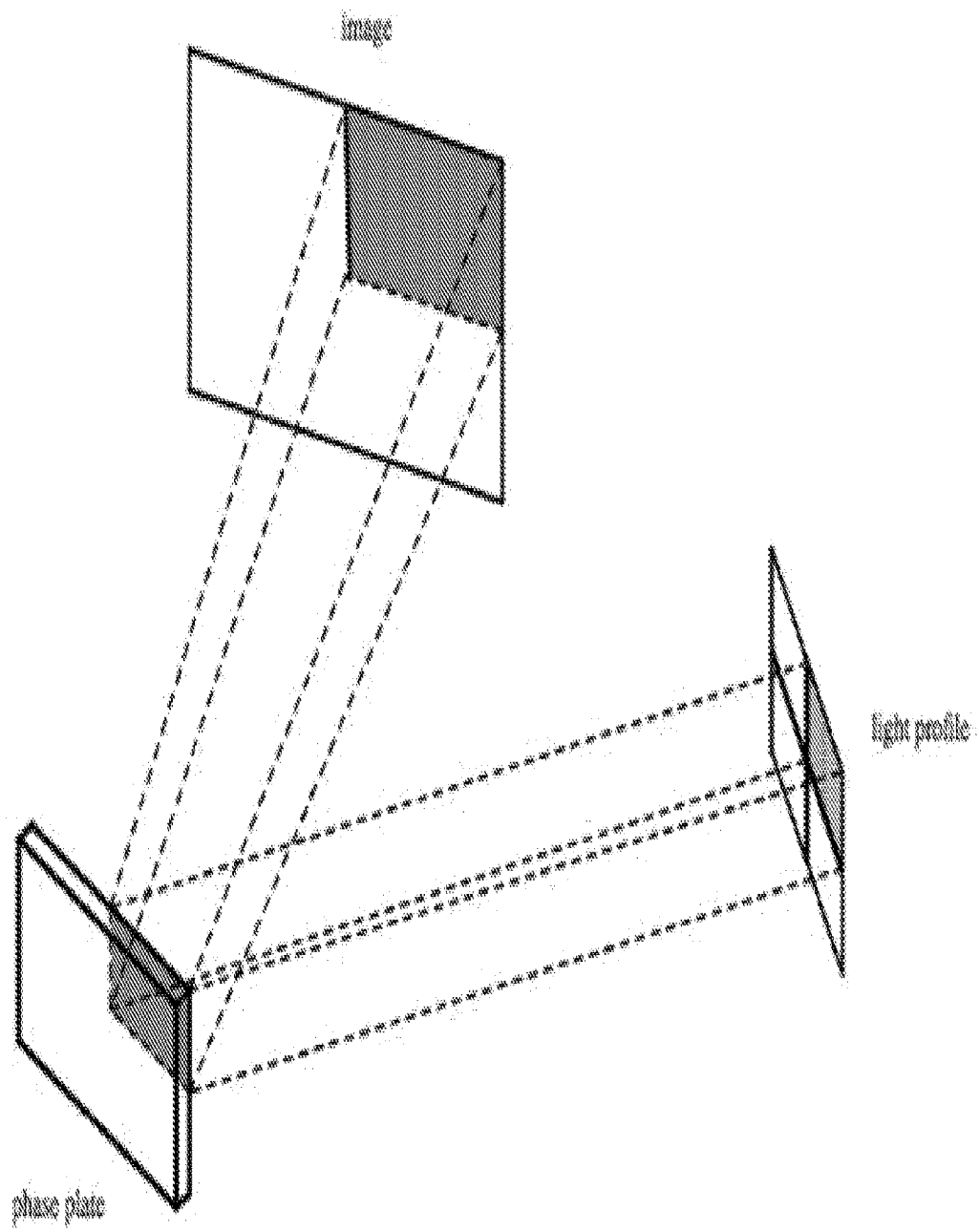

In this approach, a phase pattern is calculated for the PMD with the image divided up into segments, corresponding to incoming beams. This pattern can be calculated using a similar approach to the one described above. In this approach, light field re-distribution using a PMD is restricted to local redistribution within the image segment, such that light from a single beam is only re-directed within the corresponding image segment, as illustrated in FIG. 14B. As described above, a prism may be superimposed on the phase pattern in each image segment as required, for fine alignment adjustment.

Lensing

A PMD may be controlled to simulate the effects of other optical elements, such as prisms and gratings in a similar fashion, for example a prism may be provided by applying a slowly varying amount of phase delay in one direction on the PMD.

Different effects may be combined on the PMD. An example is a phase-pattern that both focuses and shifts the incoming light profile. This may be achieved by controlling the PMD to alter the phases of light in a pattern that superimposes (adds) the respective phase delay patterns for a lens and a prism.

This approach can be used to in conjunction with an input light field made up of tiled, non-overlapping patches of light, to shift and scale individual light patches, or small sections of patches to approximate an image.

Free-Form Lensing

Several lenses side-by-side or super-imposed on the PMD can coarsely approximate an image. More complex images or illumination profiles can be achieved by controlling the PMD to present a phase adjustment that is continuously-varying over the area of the PMD. Such a phase-pattern can be achieved by an iterative optimization approach, where the difference between the current solution and the target-image is iteratively minimized until a completion criterion is satisfied.

The optimizer finds a solution using a minimization or optimization approach based on a forward model and its inverse. An initial guess of the light re-distribution scheme as well as regularization terms may be utilized to converge towards a suitable solution in fewer iterations. System constraints may also be supplied. An exit metric, for example the maximum number of iterations, a residual, or a perceptual metric, determines when the program stops and outputs the current solution in form of a light re-distribution scheme.

An optimization approach can be applied where the incoming light is in the form of a 2D array of parallel beams. The input light distribution may be characterized and provided as input to the algorithm, and a lens surface must be calculated that transforms the input light distribution into the desired image in the focal plane.

Lensless Algorithms

Another approach calculates a phase pattern that produces a target light field in a specified focal plane some distance from the PMD, instead of in the far-field. This algorithm can yield a desired output light pattern without additional lenses in the light path. Such lensless algorithms can be used with a well-characterized tilled array of non-overlapping beams. The phase pattern to be provided on a PMD may be generated based on the incoming light distribution.

Shifting to Dump for Local Dimming

Dynamic dimming of some light sources, including laser diodes or LEDs, whether by pulsing or by dynamically varying current, can adversely affect light source stability and lifetime. The dynamic shifting approach used to algorithmically correct beam alignment can be used to shift an entire beam into a beam dump to achieve a global dimming effect if the scene calls for it, without pulsing or modifying source input power.

Diode Property Diversity for Artifact Mitigation

Strategically combining light sources with different properties can be used for minimizing the appearance of certain undesirable artifacts. Artifacts such as speckle can occur for example, when using coherent, monochromatic light to display an image. Combining multiple beams form an overall image can result in a reduction in algorithm noise, image speckle, and screen speckle when compared to imaging with a single source. Furthermore, if light sources are selected to have slightly different wavelengths, or configured for varying input angles, an averaging effect may minimize the appearance of certain image artifacts.

Example Application in a Projection System

Figure 15:
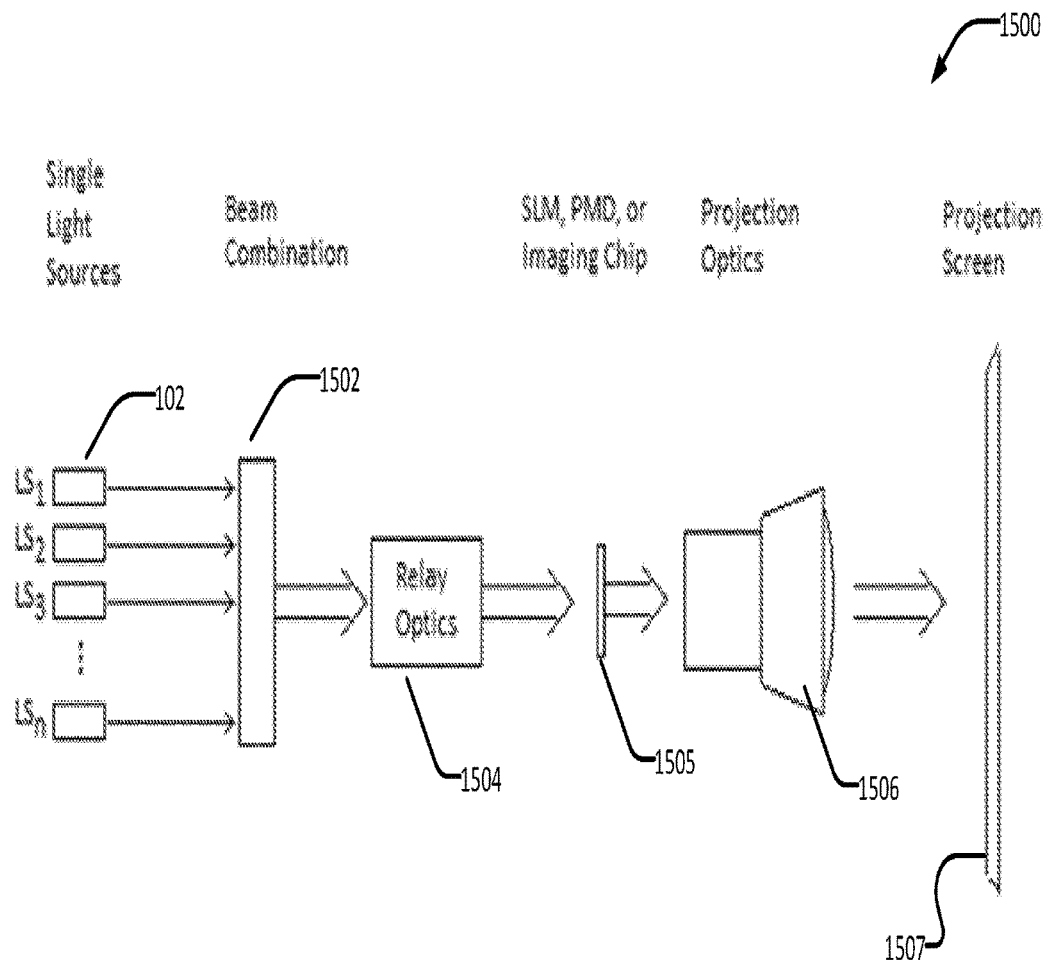
FIG. 15 is a block diagram illustrating an example projector.

FIG. 15 shows a light projection system 1500 according to an example embodiment. Light beams from an array of light sources 102 are combined at 1502 into a 2D array of non-overlapping, parallel, collimated beams, and relayed by relay optics 1504 onto a spatial light modulator 1505. A computer sends a control signal to the spatial light modulator, which alters the incoming light field to achieve a target illumination profile. The output of this spatial light modulator is then relayed through projection optics 1506, and focused onto a surface, in this case, a projection screen 1507.

Example Application to Stereolithoqraphy

Stereolithography 3D printers use UV, IR or visible light to cure a resin. Such systems may include a resin bath and a 2D scanning laser beam that cures one layer (Z-Axis) at a time. Upon completion of each layer the partially completed model is lowered by one step into the bath and the next layer is "written". This process typically takes some time to complete, for example 10 minutes per layer or 6 hours for an entire 3D model.

Some approaches replace the visible light source within a projection system with a UV light source, and then, instead of scanning in a 2D fashion to create a layer, expose the entire layer at once. There are two limitations using this technique: first the intensity that a typical projector can create is limited, and hence the layer needs to be exposed for a longer time, secondly, the contrast of a typical projector is limited, and as such areas in which resin is not supposed to be cured, will receive a small amount of light, which may be enough to cure resign and effectively limit the resolution at which a model can be printed.

Using a light re-direction projection approach, for example as discussed herein, to project light to imagewise expose a layer in a 3D printer can result in improvements in both higher printing speed (because local intensity is higher) and higher accuracy (because there is limited or no light leakage).

Example Embodiment

Figures 16A, 16B:
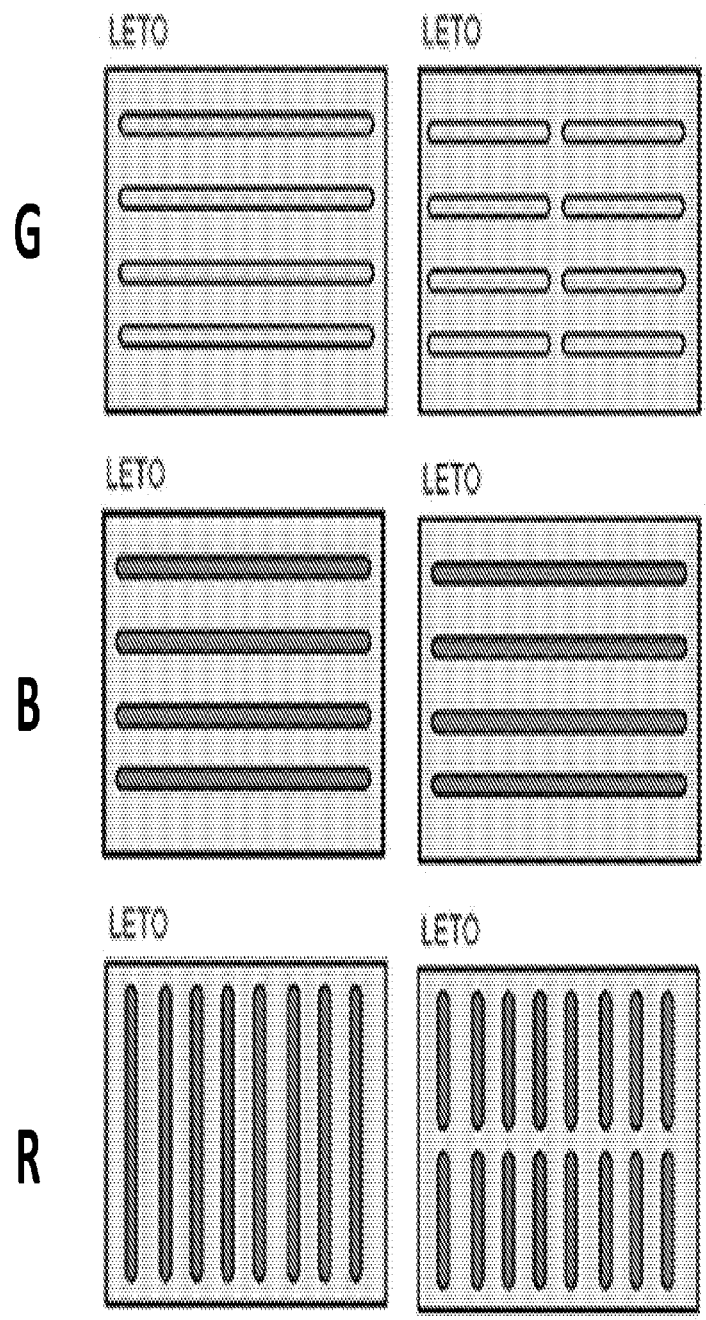
FIGS. 16A and 16B schematically illustrate possible color imaging modes and ways to scale up or down optical power in a projector.

FIGS. 16A and 16B provide illustrations of how embodiments as described herein may be applied to display color images or other light patterns and also how optical power may be scaled up (either by changing modes within one projector or between different projectors). Some embodiments perform color imaging by generating and modulating light of three colors (e.g. red, green and blue). These colors may be generated and modulated in parallel (e.g. using different PMDs) or displayed in a time-multiplexed manner (e.g. the same PMD may modulate different colors of light in different time periods).

Light emitters of different colors may have different optical power outputs. also, certain imaging or illumination applications may need different optical power levels for different colors. The desire to use light emitters of different colors that may have different optical power outputs and or the need for different optical power levels in different colors for certain applications may be accommodated in various ways. In some embodiments the number of light emitters of different colors is different. An optical system for each color may tile the active area of a PMD or other dynamically-addressable focusing element with a number of light patches corresponding to the number of light sources being used for that color. Additionally, the arrangement of patches of light may differ among different colors. For example, for some colors the active area of a PMD may be covered by a single row or column of patches of light while for other colors the active area of the PMD may be covered by an array or patches of light having plural rows and plural columns.

Furthermore, the overall optical power available may be increased by increasing the number of light emitters. This may be done for a single-color projector or for any one or more colors in a multi-color projector. FIGS. 16A and 16B illustrate two possible arrangements one (FIG. 16A) for a lower power projector and another (FIG. 16B) for a higher power projector. In this non-limiting example embodiment the number of red and green light emitters is doubled in FIG. 16B. The same number of blue light emitters provides adequate optical power in both embodiments (of course the number of blue light emitters could also be increased if desired). FIGS. 16A and 16B could represent different projectors or different operating modes of a single projector.

In some example embodiments like FIGS. 16A and 16B light is supplied by laser diodes, the fast axis of the laser diodes are collimated. The beams diverges along the slow axis in order to fill the active area of a PMD. In other embodiments, the patches of light that collectively illuminate the active area of the PMD may be of different shapes or may be arranged to provide different tilings of the PMD active area.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed sequentially (in series), these processes or blocks may instead be performed in parallel, or may be performed at different times.

Where a component (e.g. a light emitter, mirror, lens, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A light source configured to supply light for a light projector comprising:
    a plurality of individual lasers spaced in an arrangement, each of the lasers is operable to emit a corresponding beam of light;
    a plurality of lenses, each associated with one of the individual lasers and positioned to collimate light from the corresponding laser;
    one or more mirrors associated with each individual laser positioned to redirect the beams of collimated light to provide an aligned and non-overlapping pattern of parallel light beams that are spaced more closely than the spacing between the individual lasers in the arrangement;
    one or more optical elements positioned to receive the aligned and non-overlapping pattern of parallel light beams from the mirrors to create a uniform light profile; and
    a dynamically addressable phase modulating device having an active area divided into a number of elements that are positioned to receive the uniform light profile, wherein the elements of the dynamically addressable phase modulating device are individually controllable to adjust the phase of the light received by the element.

2. The light source according to claim 1, wherein individual lasers are arranged in a two-dimensional array and spaced by a length and a width that are both larger than a length and a width of the pattern of parallel light beams produced by the mirrors.

3. The light source according to claim 2, wherein the one or more mirrors comprise a first set of parallel knife-edge mirrors and a second set of parallel knife-edge mirrors oriented transversely relative to the knife-edged mirrors of the first set of knife-edged mirrors.

4. The light source according to claim 1, wherein the one or more optical elements positioned to create a uniform light profile include an integration rod.

5. The light source according to claim 1, wherein the one or more optical elements positioned to create a uniform light profile include a single optical fiber.

6. The light source according to claim 1, wherein the one or more optical elements positioned to create a uniform light profile include a bundled optical fiber.

7. The light source according to claim 1, wherein the one or more optical elements positioned to create a uniform light profile include a grating.

8. The light source according to claim 1, wherein the one or more optical elements positioned to create a uniform light profile include a diffuser.

9. The light source according to claim 1, wherein the one or more optical elements positioned to create a uniform illumination profile include a micro-lens array.

10. The light source according to claim 1, wherein the one or more optical elements positioned to create a uniform light profile include an aperture.

11. The light source according to claim 1, wherein the lasers are configured to emit polarized light and the lasers and mirrors are arranged such that polarization directions of the light beams in the array of collimated parallel light beams are substantially the same.

12. The light source according to claim 1, wherein the path lengths of the light beams from each of the lasers in the array of lasers to the elements of the phase modulating device are substantially equal.

13. The light source according to claim 1, further comprising control electronics to control the intensities of light produced by the plurality of lasers.

14. The light source according to claim 1, wherein the lasers comprise laser diodes.

15. The light source according to claim 13, wherein the laser diodes are provided by at least one laser diode bar comprising a plurality of spaced-apart laser diodes.

16. The light source according to claim 1, wherein the lenses act only on one axis and the light beams are divergent on a second axis orthogonal to the one axis.

17. The light source according to claim 1, wherein the lasers have fast and slow axes on which the emitted light beams diverge differently and the lenses collimate the light beams on both the fast and slow axes.

18. The light source according to claim 1, further comprising a spatial light modulator illuminated by light that has interacted with an element of the phase modulating device.

19. The light source according to claim 18, wherein the spatial light modulator comprises an LCD panel.

20. The light source according to claim 18, wherein the spatial light modulator comprises a digital micro-mirror device (DMD).

21. The light source according to claim 18, wherein the spatial light modulator comprises a liquid crystal on silicon (LCoS) device.

22. The light source according to claim 18, wherein the spatial light modulator comprises a transmissive LCD chip.

23. The light source according to claim 1, wherein the lasers are configured to emit light of different wavelengths.

24. The light source according to claim 1, wherein the light source includes lenses, optical elements and a dynamically addressable phase modulating device for use with lasers that emit one of red, green or blue laser light for color imaging.

25. The light source of claim 1, wherein the dynamically addressable phase modulating device is configured to receive one of red, green or blue laser light in a time-multiplexed manner for color imaging.

26. A light source to supply light for a light projector, comprising:
a plurality of laser diodes arranged into a two-dimensional array having rows and columns, wherein each laser diode is operable to emit a corresponding beam of light;
a plurality of lenses, each associated with one of the laser diodes and positioned to collimate light from the corresponding laser diode;
a first set of mirrors and a second set of mirrors, wherein the first and second sets of mirrors are positioned to redirect the beams of collimated light to provide a two-dimensional array of parallel light beams that is smaller than the size of the two-dimensional array of laser diodes and is sized to match a size of a phase modulating device;
one or more optical elements positioned to receive the array of parallel light beams and create a uniform illumination profile; and
a dynamically addressable phase modulating device having an active area that is divided into a number of elements that are positioned to the uniform illumination profile, wherein the elements of the dynamically addressable phase modulating device are individually controllable to adjust the phase of the light received by the element.

27. The light source according to claim 26, wherein the one or more optical elements positioned to create a uniform illumination profile include an integration rod.

28. The light source according to claim 26, wherein the one or more optical elements positioned to create a uniform illumination profile include a single optical fiber.

29. The light source according to claim 26, wherein the one or more optical elements positioned to create a uniform illumination profile include a bundle of optical fibers.

30. The light source according to claim 26, wherein the one or more optical elements positioned to create a uniform illumination profile include a grating.

31. The light source according to claim 26, wherein the one or more optical elements positioned to create a uniform illumination profile include a diffuser.

32. The light source according to claim 26, wherein the one or more optical elements positioned to create a uniform illumination profile include a micro-lens array.

33. The light source according to claim 26, wherein the one or more optical elements positioned to create a uniform illumination profile include an aperture.

34. The light source according to claim 26, further comprising a spatial light modulator illuminated by light that has interacted with an element of the phase modulating device.

35. The light source according to claim 34, wherein the spatial light modulator comprises an LCD panel.

36. The light source according to claim 34, wherein the spatial light modulator comprises a digital micro-mirror device (DMD).

37. The light source according to claim 34, wherein the spatial light modulator comprises a liquid crystal on silicon (LCoS) device.

38. The light source according to claim 34, wherein the spatial light modulator comprises a transmissive LCD chip.

39. The light source according to claim 26, wherein the lasers are configured to emit light of different wavelengths.

40. The light source according to claim 26, wherein the light source includes lenses, optical elements to create a uniform illumination profile and a dynamically addressable phase modulating device for use with lasers that emit one of red, green or blue laser light for color imaging.

41. The light source of claim 26, wherein the dynamically addressable phase modulating device is configured to receive one of red, green or blue laser light in a time-multiplexed manner for color imaging.

* * * * *